United States Patent
Affinito et al.

(10) Patent No.: US 10,629,947 B2
(45) Date of Patent: Apr. 21, 2020

(54) ELECTROCHEMICAL CELL

(75) Inventors: John D. Affinito, Tucson, AZ (US);
Yuriy V. Mikhaylik, Tucson, AZ (US);
Chariclea Scordilis-Kelley, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 900 days.

(21) Appl. No.: 12/862,528

(22) Filed: Aug. 24, 2010

(65) Prior Publication Data
US 2011/0177398 A1     Jul. 21, 2011

Related U.S. Application Data

(63) Continuation-in-part of application No. 12/535,328, filed on Aug. 4, 2009, now Pat. No. 9,105,938, and a
(Continued)

(51) Int. Cl.
*H01M 10/0525* (2010.01)
*H01M 10/0567* (2010.01)
(Continued)

(52) U.S. Cl.
CPC ....... *H01M 10/0525* (2013.01); *H01M 4/134* (2013.01); *H01M 4/136* (2013.01);
(Continued)

(58) Field of Classification Search
USPC ................................................. 429/231.95
See application file for complete search history.

(56) References Cited

U.S. PATENT DOCUMENTS 1,956,243 A    4/1934   Mceachron et al.
3,716,409 A    2/1973   Cairns et al.
(Continued)

FOREIGN PATENT DOCUMENTS

CA     2332452 A1    11/1999
CA     2532270 A1    11/1999
(Continued)

OTHER PUBLICATIONS

Psoma et al., Comparative Assessment of Different Sacrificial Materials for releasing SU-8 Structures, Rev. Adv. Mater. Sci. 10, 2005, 149-155; 7 pages total.*
(Continued)

*Primary Examiner* — Ula C Ruddock
*Assistant Examiner* — Anna Korovina
(74) *Attorney, Agent, or Firm* — Wolf, Greenfield & Sacks, P.C.

(57) ABSTRACT

Electrochemical cells including components and configurations for electrochemical cells, such as rechargeable lithium batteries, are provided. The electrochemical cells described herein may include a combination of components arranged in certain configurations that work together to increase performance of the electrochemical cell. In some embodiments, such combinations of components and configurations described herein may minimize defects, inefficiencies, or other drawbacks that might otherwise exist inherently in prior electrochemical cells, or that might exist inherently in prior electrochemical cells using the same or similar materials as those described herein, but arranged differently.

58 Claims, 9 Drawing Sheets

Related U.S. Application Data continuation-in-part of application No. 12/727,862, filed on Mar. 19, 2010, now abandoned.

(60) Provisional application No. 61/086,329, filed on Aug. 5, 2008, provisional application No. 61/161,529, filed on Mar. 19, 2009, provisional application No. 61/237,903, filed on Aug. 28, 2009, provisional application No. 61/236,322, filed on Aug. 24, 2009.

(51) Int. Cl.
| | |
|---|---|
| H01M 4/134 | (2010.01) |
| H01M 4/36 | (2006.01) |
| H01M 4/136 | (2010.01) |
| H01M 10/42 | (2006.01) |
| H01M 10/0569 | (2010.01) |
| H01M 4/40 | (2006.01) |
| H01M 10/44 | (2006.01) |
| H01M 4/38 | (2006.01) |
| H01M 4/02 | (2006.01) |

(52) U.S. Cl.
CPC .......... *H01M 4/366* (2013.01); *H01M 4/382* (2013.01); *H01M 4/405* (2013.01); *H01M 10/0567* (2013.01); *H01M 10/0569* (2013.01); *H01M 10/4235* (2013.01); *H01M 10/44* (2013.01); *H01M 2004/021* (2013.01)

(56) References Cited

U.S. PATENT DOCUMENTS

| | | | |
|---|---|---|---|
| 3,833,421 A | 9/1974 | Rubischko et al. | |
| 3,907,579 A | 9/1975 | Ravault | |
| 3,951,689 A | 4/1976 | Ludwig | |
| 3,957,532 A | 5/1976 | Settle et al. | |
| 4,002,492 A | 1/1977 | Rao | |
| 4,011,374 A | 3/1977 | Kaun | |
| 4,056,885 A | 11/1977 | Rao | |
| 4,063,005 A | 12/1977 | Mamantov et al. | |
| 4,169,120 A | 9/1979 | Miller | |
| 4,184,013 A | 1/1980 | Weddigen et al. | |
| 4,235,528 A | 11/1980 | Yano et al. | |
| 4,330,601 A | 5/1982 | Dey | |
| 4,339,325 A | 7/1982 | Solomon et al. | |
| 4,384,029 A * | 5/1983 | Kordesch | H01M 10/283 429/169 |
| 4,410,609 A | 10/1983 | Peled et al. | |
| 4,477,545 A * | 10/1984 | Akridge | H01M 4/08 29/623.1 |
| 4,517,265 A | 5/1985 | Belanger et al. | |
| 4,556,618 A | 12/1985 | Shia | |
| 4,652,506 A | 3/1987 | Belanger et al. | |
| 4,664,991 A | 3/1987 | Perichaud et al. | |
| 4,677,415 A | 6/1987 | Howng | |
| 4,683,178 A | 7/1987 | Stadnick et al. | |
| 4,690,840 A | 9/1987 | Gauthier et al. | |
| 4,739,018 A | 4/1988 | Armand et al. | |
| 4,770,956 A | 9/1988 | Knodler | |
| 4,794,060 A | 12/1988 | Belanger et al. | |
| 4,833,048 A | 5/1989 | Dejonghe et al. | |
| 4,917,974 A | 4/1990 | Dejonghe et al. | |
| 4,954,371 A | 9/1990 | Yializis | |
| H858 H | 12/1990 | Leonard et al. | |
| 5,114,804 A * | 5/1992 | Stiles | H01M 10/0413 29/623.5 |
| 5,126,082 A | 6/1992 | Frank | |
| 5,162,175 A | 11/1992 | Visco et al. | |
| 5,194,341 A | 3/1993 | Bagley et al. | |
| 5,278,005 A | 1/1994 | Yamauchi et al. | |
| 5,290,414 A * | 3/1994 | Marple | 204/252 |
| 5,314,765 A | 5/1994 | Bates et al. | |
| 5,324,599 A | 6/1994 | Oyama et al. | |
| 5,328,946 A | 7/1994 | Tuminello et al. | |
| 5,366,829 A | 11/1994 | Saidi | |
| 5,387,479 A | 2/1995 | Koksbang | |
| 5,415,954 A | 5/1995 | Gauthier | |
| 5,433,917 A | 7/1995 | Srivastava et al. | |
| 5,434,021 A | 7/1995 | Fauteux et al. | |
| 5,441,831 A | 8/1995 | Okamoto et al. | |
| 5,460,905 A | 10/1995 | Skotheim | |
| 5,462,566 A * | 10/1995 | Skotheim | 29/623.1 |
| 5,487,959 A | 1/1996 | Koksbang | |
| 5,510,209 A * | 4/1996 | Abraham | H01M 12/08 429/231.95 |
| 5,516,598 A | 5/1996 | Visco et al. | |
| 5,528,920 A | 6/1996 | Bouchard et al. | |
| 5,529,860 A | 6/1996 | Skotheim et al. | |
| 5,538,812 A | 6/1996 | Lee et al. | |
| 5,532,083 A | 7/1996 | McCullough | |
| 5,569,520 A | 10/1996 | Bates | |
| 5,582,623 A | 12/1996 | Chu | |
| 5,601,947 A | 2/1997 | Skotheim et al. | |
| 5,614,331 A | 3/1997 | Takeuchi et al. | |
| 5,620,792 A | 4/1997 | Challener | |
| 5,648,187 A | 7/1997 | Skotheim et al. | |
| 5,681,615 A | 10/1997 | Affinito et al. | |
| 5,686,201 A | 11/1997 | Chu | |
| 5,690,702 A | 11/1997 | Skotheim et al. | |
| 5,693,432 A | 12/1997 | Matsumoto | |
| 5,698,339 A | 12/1997 | Kawakami et al. | |
| 5,716,736 A | 2/1998 | Zhang et al. | |
| 5,723,230 A | 3/1998 | Naoi et al. | |
| 5,731,104 A | 3/1998 | Ventura et al. | |
| 5,783,330 A | 6/1998 | Naoi et al. | |
| 5,786,092 A | 7/1998 | Lorenzo et al. | |
| 5,792,575 A | 8/1998 | Naoi et al. | |
| 5,800,939 A | 9/1998 | Mishina et al. | |
| 5,814,420 A | 9/1998 | Chu | |
| 5,824,434 A | 10/1998 | Kawakami et al. | |
| 5,834,135 A * | 11/1998 | Pendalwar | H01M 2/1653 252/62.2 |
| 5,834,137 A | 11/1998 | Zhang et al. | |
| 5,837,401 A | 11/1998 | Gauthier et al. | |
| 5,882,812 A * | 3/1999 | Visco et al. | 429/50 |
| 5,882,819 A | 3/1999 | Naoi et al. | |
| 5,895,732 A | 4/1999 | Clough | |
| 5,919,587 A * | 7/1999 | Mukherjee et al. | 429/213 |
| 5,961,672 A | 10/1999 | Skotheim et al. | |
| 5,989,467 A | 11/1999 | Daws et al. | |
| 5,998,063 A | 12/1999 | Kobayashi et al. | |
| 6,019,801 A | 2/2000 | Gauthier et al. | |
| 6,020,412 A | 2/2000 | Muschelewicz et al. | |
| 6,025,094 A | 2/2000 | Visco et al. | |
| 6,030,720 A | 2/2000 | Chu et al. | |
| 6,066,417 A | 5/2000 | Cho et al. | |
| 6,110,417 A | 8/2000 | Sugikawa | |
| 6,110,621 A | 8/2000 | Sandi et al. | |
| 6,117,583 A | 9/2000 | Nilsson et al. | |
| 6,117,590 A | 9/2000 | Skotheim et al. | |
| 6,120,930 A * | 9/2000 | Rouillard et al. | 429/66 |
| 6,136,468 A | 10/2000 | Mitchell, Jr. et al. | |
| 6,143,216 A | 11/2000 | Loch et al. | |
| 6,153,337 A | 11/2000 | Carlson et al. | |
| 6,156,395 A | 12/2000 | Zhang et al. | |
| 6,165,645 A | 12/2000 | Nishimura et al. | |
| 6,168,694 B1 | 1/2001 | Huang et al. | |
| 6,183,901 B1 | 2/2001 | Ying et al. | |
| 6,194,099 B1 * | 2/2001 | Gernov et al. | 429/213 |
| 6,200,704 B1 | 3/2001 | Katz et al. | |
| 6,201,100 B1 * | 3/2001 | Gorkovenko et al. | 528/388 |
| 6,202,591 B1 | 3/2001 | Witzman et al. | |
| 6,203,947 B1 | 3/2001 | Peled et al. | |
| 6,214,061 B1 | 4/2001 | Visco et al. | |
| 6,225,002 B1 | 5/2001 | Nimon et al. | |
| 6,238,819 B1 | 5/2001 | Cahill et al. | |
| 6,245,455 B1 * | 6/2001 | Kohno | H01M 4/64 429/101 |
| 6,268,695 B1 | 7/2001 | Affinito | |
| 6,276,355 B1 | 8/2001 | Zhang et al. | |
| 6,277,514 B1 | 8/2001 | Ying et al. | |
| 6,284,412 B1 | 9/2001 | Minakata et al. | |
| 6,306,545 B1 | 10/2001 | Carlson et al. | |

(56) References Cited

U.S. PATENT DOCUMENTS

| | | | |
|---|---|---|---|
| 6,328,770 B1 | 12/2001 | Gozdz | |
| 6,358,643 B1 | 3/2002 | Katz et al. | |
| 6,365,032 B1 | 4/2002 | Shiepe et al. | |
| 6,391,069 B1 | 5/2002 | Gozdz et al. | |
| 6,395,423 B1 | 5/2002 | Kawakami et al. | |
| 6,402,795 B1 | 6/2002 | Chu et al. | |
| 6,403,261 B2 | 6/2002 | Mitkin et al. | |
| 6,413,284 B1 | 7/2002 | Chu et al. | |
| 6,413,645 B1 | 7/2002 | Graff et al. | |
| 6,413,667 B1 | 7/2002 | Gozdz | |
| 6,468,692 B1 | 10/2002 | Nemoto et al. | |
| 6,508,921 B1 | 1/2003 | Mu et al. | |
| 6,517,968 B2 | 1/2003 | Johnson et al. | |
| 6,517,590 B1 | 2/2003 | Gauthier et al. | |
| 6,528,211 B1 | 3/2003 | Nishimura et al. | |
| 6,537,701 B1 | 3/2003 | Nimon et al. | |
| 6,544,688 B1* | 4/2003 | Cheng | 429/245 |
| 6,558,438 B1 | 5/2003 | Satoh et al. | |
| 6,558,847 B1 | 5/2003 | Kawakami et al. | |
| 6,570,325 B2 | 5/2003 | Graff et al. | |
| 6,585,869 B2 | 7/2003 | Shiepe et al. | |
| 6,680,013 B1 | 1/2004 | Stein et al. | |
| 6,682,853 B2 | 1/2004 | Kimijima et al. | |
| 6,689,177 B2 | 2/2004 | Sugiyama et al. | |
| 6,706,449 B2 | 3/2004 | Mikhaylik et al. | |
| 6,723,140 B2 | 4/2004 | Chu et al. | |
| 6,733,924 B1 | 5/2004 | Skotheim et al. | |
| 6,753,036 B2 | 6/2004 | Jankowski et al. | |
| 6,770,187 B1 | 8/2004 | Putter et al. | |
| 6,797,428 B1 | 9/2004 | Skotheim et al. | |
| 6,806,001 B1 | 10/2004 | Benczur-Uermoessy et al. | |
| 6,819,082 B2 | 11/2004 | Yang | |
| 6,835,493 B2 | 12/2004 | Zhang et al. | |
| 6,844,110 B2 | 1/2005 | Enomoto et al. | |
| 6,852,139 B2 | 2/2005 | Zhang et al. | |
| 6,854,312 B2 | 2/2005 | Laliberte et al. | |
| 6,886,240 B2 | 5/2005 | Zhang et al. | |
| 6,913,998 B2 | 7/2005 | Jankowski et al. | |
| 6,914,111 B2 | 7/2005 | Mukoyama et al. | |
| 6,936,381 B2 | 8/2005 | Skotheim et al. | |
| 6,951,699 B2 | 10/2005 | Yata et al. | |
| 6,991,662 B2 | 1/2006 | Visco et al. | |
| 7,019,494 B2* | 3/2006 | Mikhaylik | 320/148 |
| 7,029,796 B2 | 4/2006 | Choi et al. | |
| 7,087,344 B2 | 8/2006 | Kaneta | |
| 7,129,005 B2 | 10/2006 | Wensley et al. | |
| 7,141,281 B2 | 11/2006 | Hirota et al. | |
| 7,157,185 B2 | 1/2007 | Marple | |
| 7,204,862 B1 | 4/2007 | Zhang et al. | |
| 7,235,330 B1* | 6/2007 | Fujimoto | H01M 4/134 |
| | | | 429/218.1 |
| 7,241,535 B2 | 7/2007 | Kim et al. | |
| 7,244,530 B2 | 7/2007 | Hambitzer et al. | |
| 7,247,408 B2 | 7/2007 | Skotheim et al. | |
| 7,250,233 B2 | 7/2007 | Choi et al. | |
| 7,252,689 B2 | 8/2007 | Fujino et al. | |
| 7,354,675 B2 | 4/2008 | Molter | |
| 7,354,680 B2 | 4/2008 | Mikhaylik | |
| 7,358,012 B2 | 4/2008 | Mikhaylik | |
| 7,361,431 B2 | 4/2008 | Kim et al. | |
| 7,553,584 B2 | 6/2009 | Chiang et al. | |
| 7,553,590 B2 | 6/2009 | Mikhaylik | |
| 7,579,112 B2 | 8/2009 | Chiang et al. | |
| 7,629,083 B2 | 12/2009 | Cho et al. | |
| 7,642,001 B2 | 1/2010 | Yata et al. | |
| 7,646,171 B2 | 1/2010 | Mikhaylik | |
| 7,691,530 B2 | 4/2010 | Kim et al. | |
| 7,695,861 B2* | 4/2010 | Kolosnitsyn et al. | 429/188 |
| 7,736,800 B2 | 6/2010 | Lee | |
| 7,749,655 B2 | 7/2010 | Doh et al. | |
| 7,771,870 B2 | 8/2010 | Affinito et al. | |
| 7,785,730 B2 | 8/2010 | Affinito et al. | |
| 7,842,418 B2 | 11/2010 | Miyahisa et al. | |
| 7,842,421 B2 | 11/2010 | Mikhaylik | |
| 8,066,913 B2 | 11/2011 | Kikuya et al. | |
| 8,076,024 B2 | 12/2011 | Affinito et al. | |
| 8,087,309 B2 | 1/2012 | Kelley et al. | |
| 8,105,717 B2 | 1/2012 | Skotheim et al. | |
| 8,129,048 B2 | 3/2012 | Hirakawa et al. | |
| 8,137,525 B1 | 3/2012 | Harreld et al. | |
| 8,158,278 B2 | 4/2012 | Tsutsumi et al. | |
| 8,163,409 B2 | 4/2012 | Fujikawa et al. | |
| 8,197,971 B2 | 6/2012 | Skotheim et al. | |
| 8,338,034 B2 | 12/2012 | Affinito et al. | |
| 8,415,054 B2 | 4/2013 | Skotheim et al. | |
| 8,415,071 B2 | 4/2013 | Tanaka et al. | |
| 8,916,284 B2 | 12/2014 | Jang et al. | |
| 8,936,870 B2 | 1/2015 | Affinito et al. | |
| 9,012,049 B2 | 4/2015 | Fetzer et al. | |
| 9,040,197 B2 | 5/2015 | Affinito et al. | |
| 9,105,938 B2 | 8/2015 | Scordilis-Kelley et al. | |
| 9,118,085 B2 | 8/2015 | Ikeda | |
| 9,177,689 B2 | 11/2015 | Paulsen et al. | |
| 9,209,428 B2 | 12/2015 | Jung et al. | |
| 9,219,268 B2 | 12/2015 | Guen et al. | |
| 9,287,540 B2 | 3/2016 | Huang | |
| 9,287,551 B2 | 3/2016 | Kang et al. | |
| 9,306,197 B2 | 4/2016 | Byun et al. | |
| 9,306,252 B2 | 4/2016 | Kristofek et al. | |
| 9,391,344 B2 | 7/2016 | Kwon et al. | |
| 9,399,404 B2 | 7/2016 | Ose et al. | |
| 9,548,492 B2 | 1/2017 | Affinito et al. | |
| 9,673,474 B2 | 6/2017 | Nakaishi | |
| 9,780,404 B2 | 10/2017 | Scordilis-Kelley et al. | |
| 9,853,271 B2 | 12/2017 | Iwase et al. | |
| 10,312,545 B2 | 6/2019 | Scordilis-Kelley et al. | |
| 10,320,027 B2 | 6/2019 | Scordilis-Kelley et al. | |
| 2001/0000485 A1* | 4/2001 | Ying | H01M 2/16 |
| | | | 429/228 |
| 2001/0005561 A1 | 6/2001 | Yamada et al. | |
| 2001/0014420 A1 | 8/2001 | Takeuchi et al. | |
| 2001/0024749 A1 | 9/2001 | Michot et al. | |
| 2001/0034934 A1 | 11/2001 | Xu et al. | |
| 2001/0041294 A1 | 11/2001 | Chu et al. | |
| 2002/0006552 A1 | 1/2002 | Ishida et al. | |
| 2002/0012846 A1 | 1/2002 | Skotheim et al. | |
| 2002/0018933 A1 | 2/2002 | Valentin et al. | |
| 2002/0071989 A1 | 6/2002 | Verma | |
| 2002/0119351 A1 | 8/2002 | Ovshinsky et al. | |
| 2002/0182508 A1 | 12/2002 | Nimon et al. | |
| 2002/0187398 A1 | 12/2002 | Mikhaylik et al. | |
| 2002/0192557 A1 | 12/2002 | Choi et al. | |
| 2003/0073000 A1 | 4/2003 | Lee et al. | |
| 2003/0082446 A1 | 5/2003 | Chiang et al. | |
| 2003/0099884 A1 | 5/2003 | Chiang et al. | |
| 2003/0108785 A1 | 6/2003 | Wu et al. | |
| 2003/0113622 A1 | 6/2003 | Blasi et al. | |
| 2003/0113624 A1 | 6/2003 | Kim et al. | |
| 2003/0124416 A1* | 7/2003 | Kaneta | 429/66 |
| 2003/0129500 A1* | 7/2003 | Gan et al. | 429/332 |
| 2003/0180611 A1 | 9/2003 | Mikhaylik et al. | |
| 2003/0222048 A1 | 12/2003 | Asakawa et al. | |
| 2003/0224234 A1 | 12/2003 | Steele et al. | |
| 2003/0228518 A1* | 12/2003 | Marple | 429/221 |
| 2004/0037771 A1 | 2/2004 | Meissner et al. | |
| 2004/0047798 A1 | 3/2004 | Oh et al. | |
| 2004/0072066 A1 | 4/2004 | Cho et al. | |
| 2004/0081887 A1 | 4/2004 | Sugiyama et al. | |
| 2004/0118698 A1 | 6/2004 | Lu et al. | |
| 2004/0131944 A1 | 7/2004 | Visco et al. | |
| 2004/0142244 A1 | 7/2004 | Visco et al. | |
| 2004/0175621 A1 | 9/2004 | Iriyama et al. | |
| 2004/0191607 A1 | 9/2004 | Tomoki et al. | |
| 2004/0197641 A1 | 10/2004 | Visco et al. | |
| 2004/0214088 A1 | 10/2004 | Lee et al. | |
| 2004/0234851 A1 | 11/2004 | Kim et al. | |
| 2005/0008935 A1 | 1/2005 | Skotheim et al. | |
| 2005/0008938 A1* | 1/2005 | Cho et al. | 429/246 |
| 2005/0042515 A1 | 2/2005 | Hwang et al. | |
| 2005/0048371 A1 | 3/2005 | Nagayama et al. | |
| 2005/0051763 A1 | 3/2005 | Affinito et al. | |
| 2005/0061047 A1 | 3/2005 | Laliberte et al. | |
| 2005/0079420 A1 | 4/2005 | Cho et al. | |
| 2005/0100793 A1 | 5/2005 | Jonghe et al. | |

(56) References Cited

U.S. PATENT DOCUMENTS

| | | | |
|---|---|---|---|
| 2005/0100794 A1* | 5/2005 | Chamberlain et al. | 429/247 |
| 2005/0130041 A1 | 6/2005 | Fensore, III | |
| 2005/0131126 A1 | 6/2005 | Yang et al. | |
| 2005/0147886 A1 | 7/2005 | Mikhaylik | |
| 2005/0156575 A1 | 7/2005 | Mikhaylik | |
| 2005/0158535 A1 | 7/2005 | Zhang et al. | |
| 2005/0175903 A1* | 8/2005 | Kim | H01M 4/02 429/246 |
| 2005/0175904 A1 | 8/2005 | Gorkovenko | |
| 2005/0186469 A1 | 8/2005 | De Jonghe et al. | |
| 2005/0196677 A1 | 9/2005 | Lee et al. | |
| 2005/0208353 A1 | 9/2005 | Johnson | |
| 2005/0234177 A1 | 10/2005 | Zaghib et al. | |
| 2005/0266990 A1 | 12/2005 | Iwasaki et al. | |
| 2006/0024579 A1 | 2/2006 | Kolosnitsyn et al. | |
| 2006/0051677 A1 | 3/2006 | Matsushima et al. | |
| 2006/0057464 A1 | 3/2006 | Kim et al. | |
| 2006/0115579 A1 | 6/2006 | Mukherjee et al. | |
| 2006/0115735 A1* | 6/2006 | Yasuda | H01M 4/0452 429/233 |
| 2006/0194096 A1 | 8/2006 | Valle et al. | |
| 2006/0222954 A1 | 10/2006 | Skotheim et al. | |
| 2006/0234117 A1 | 10/2006 | Fujikawa et al. | |
| 2006/0238203 A1 | 10/2006 | Kelley et al. | |
| 2006/0246354 A1 | 11/2006 | Lee et al. | |
| 2007/0065701 A1 | 3/2007 | Cable et al. | |
| 2007/0117007 A1 | 5/2007 | Visco et al. | |
| 2007/0141449 A1 | 6/2007 | Kim | |
| 2007/0172739 A1 | 7/2007 | Visco | |
| 2007/0200101 A1* | 8/2007 | Asao et al. | 252/500 |
| 2007/0207370 A1 | 9/2007 | Kwak et al. | |
| 2007/0212583 A1 | 9/2007 | Johnson | |
| 2007/0221265 A1 | 9/2007 | Affinito et al. | |
| 2007/0224502 A1* | 9/2007 | Affinito et al. | 429/209 |
| 2007/0289495 A1 | 12/2007 | Cray et al. | |
| 2008/0014501 A1 | 1/2008 | Skotheim et al. | |
| 2008/0070087 A1 | 3/2008 | Johnson | |
| 2008/0100264 A1 | 5/2008 | Kolosnitsyn et al. | |
| 2008/0187663 A1 | 8/2008 | Affinito | |
| 2008/0213672 A1 | 9/2008 | Skotheim et al. | |
| 2008/0246580 A1 | 10/2008 | Braun et al. | |
| 2008/0318128 A1 | 12/2008 | Simoneau et al. | |
| 2009/0053607 A1 | 2/2009 | Jeong et al. | |
| 2009/0077794 A1 | 3/2009 | Hirakawa et al. | |
| 2009/0098457 A1 | 4/2009 | Kwon et al. | |
| 2009/0159853 A1 | 6/2009 | Sengupta et al. | |
| 2009/0200986 A1 | 8/2009 | Kopera et al. | |
| 2009/0311604 A1 | 12/2009 | Nazar et al. | |
| 2010/0035128 A1 | 2/2010 | Scordilis-Kelley et al. | |
| 2010/0068623 A1 | 3/2010 | Braun et al. | |
| 2010/0104948 A1 | 4/2010 | Skotheim et al. | |
| 2010/0129699 A1 | 5/2010 | Mikhaylik et al. | |
| 2010/0143823 A1 | 6/2010 | Tanaka et al. | |
| 2010/0239914 A1 | 9/2010 | Mikhaylik et al. | |
| 2010/0285360 A1 | 11/2010 | Kozinsky et al. | |
| 2010/0291442 A1 | 11/2010 | Wang et al. | |
| 2011/0008531 A1 | 1/2011 | Mikhaylik et al. | |
| 2011/0014524 A1 | 1/2011 | Skotheim et al. | |
| 2011/0045346 A1 | 2/2011 | Chiang et al. | |
| 2011/0059361 A1 | 3/2011 | Wilkening et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0200868 A1 | 8/2011 | Klaassen | |
| 2011/0206992 A1 | 8/2011 | Campbell et al. | |
| 2011/0250485 A1 | 10/2011 | Tsukuda | |
| 2011/0256450 A1 | 10/2011 | Campbell et al. | |
| 2012/0043940 A1 | 2/2012 | Affinito et al. | |
| 2012/0048729 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0276449 A1 | 11/2012 | Skotheim et al. | |
| 2013/0017441 A1 | 1/2013 | Affinito et al. | |
| 2013/0095380 A1 | 4/2013 | Affinito et al. | |
| 2013/0216915 A1 | 8/2013 | Affinito et al. | |
| 2013/0224601 A1 | 8/2013 | Burnside et al. | |
| 2013/0252103 A1 | 9/2013 | Mikhaylik et al. | |
| 2013/0316072 A1 | 11/2013 | Scordilis-Kelley et al. | |
| 2015/0129332 A1 | 5/2015 | Seto et al. | |
| 2015/0180084 A1 | 6/2015 | Scordilis-Kelley et al. | |
| 2016/0126541 A1 | 5/2016 | Goto et al. | |
| 2016/0218398 A1 | 7/2016 | Yonehara et al. | |
| 2017/0141402 A1 | 5/2017 | Affinito et al. | |
| 2018/0048018 A1 | 2/2018 | Scordilis-Kelley et al. | |
| 2018/0269520 A1 | 9/2018 | Scordilis-Kelley et al. | |
| 2019/0006699 A1 | 1/2019 | Jones et al. | |

FOREIGN PATENT DOCUMENTS

| | | | |
|---|---|---|---|
| CA | 2310697 A1 | 12/2000 | |
| CA | 2404507 A1 | 10/2001 | |
| CN | 1121264 A | 4/1996 | |
| CN | 1430304 A | 7/2003 | |
| CN | 1534811 A | 10/2004 | |
| CN | 1574427 | 2/2005 | |
| CN | 1874027 A | 12/2006 | |
| CN | 101026247 | 8/2007 | |
| DE | 199 16 043 A1 | 10/2000 | |
| DE | 101 28 970 A1 | 12/2002 | |
| EP | 0 700 109 A1 | 3/1999 | |
| EP | 0700109 * | 3/1999 | H01M 10/42 |
| EP | 1 178 555 A2 | 2/2002 | |
| EP | 1 144 730 B1 | 9/2002 | |
| EP | 1 171 387 B1 | 11/2005 | |
| EP | 0 700 109 B1 | 10/2006 | |
| EP | 1 717 879 A1 | 11/2006 | |
| EP | 1 059 681 B1 | 1/2007 | |
| EP | 1 194 976 B1 | 2/2007 | |
| EP | 1 768 202 A1 | 3/2007 | |
| EP | 0 851 522 B1 | 9/2009 | |
| EP | 1 137 091 B1 | 5/2011 | |
| EP | 1 137 093 B1 | 12/2011 | |
| EP | 1 083 618 B1 | 4/2013 | |
| EP | 2 104 163 B1 | 6/2014 | |
| EP | 2 471 140 B1 | 2/2015 | |
| EP | 3 051 621 A1 | 8/2016 | |
| EP | 2 713 432 B1 | 8/2017 | |
| EP | 2 144 312 B1 | 9/2017 | |
| GB | 1011353 A | 11/1965 | |
| GB | 1 396 062 A | 5/1975 | |
| JP | S58-164169 A | 9/1983 | |
| JP | 59-130070 A | 7/1984 | |
| JP | 63-126156 | 5/1988 | |
| JP | 4-028172 | 1/1992 | |
| JP | 4-253159 | 9/1992 | |
| JP | H04-294071 A | 10/1992 | |
| JP | 05-325978 A | 12/1993 | |
| JP | 6-030246 | 2/1994 | |
| JP | H06-124700 A | 5/1994 | |
| JP | H07-017197 A | 1/1995 | |
| JP | H08-267943 A | 10/1996 | |
| JP | 09-147868 A | 6/1997 | |
| JP | 09-279357 | 10/1997 | |
| JP | H10-55823 A | 2/1998 | |
| JP | H10-214638 A | 8/1998 | |
| JP | H11-114481 A | 4/1999 | |
| JP | H11-121045 A | 4/1999 | |
| JP | 11-176423 | 7/1999 | |
| JP | H11-219731 A | 8/1999 | |
| JP | 2000-040506 A | 2/2000 | |
| JP | 2000-268873 A | 9/2000 | |
| JP | 2001-093577 A | 4/2001 | |
| JP | 2001-143757 | 5/2001 | |
| JP | WO 0131722 A1 * | 5/2001 | H01M 4/134 |
| JP | 2002-363898 A | 12/2002 | |
| JP | 2003-193110 A | 7/2003 | |
| JP | 2003-297431 A | 10/2003 | |
| JP | 2003-303579 A | 10/2003 | |
| JP | 2003-303588 A | 10/2003 | |
| JP | 2004-213902 A | 7/2004 | |
| JP | 2005-056701 A | 3/2005 | |
| JP | 2005-063848 A | 3/2005 | |

(56) References Cited

FOREIGN PATENT DOCUMENTS

| | | |
|---|---|---|
| JP | 2005-199190 A | 7/2005 |
| JP | 2005-251429 A | 9/2005 |
| JP | 2005-310836 A | 11/2005 |
| JP | 2005-353452 A | 12/2005 |
| JP | 2006-143478 A | 6/2006 |
| JP | 2006-155900 A | 6/2006 |
| JP | 2006-216565 A | 8/2006 |
| JP | 2006-236685 A | 9/2006 |
| JP | 2006-310033 A | 11/2006 |
| JP | 2006-310281 A | 11/2006 |
| JP | 2006-313737 A | 11/2006 |
| JP | 2006-318892 A | 11/2006 |
| JP | 2007-234338 A | 9/2007 |
| JP | 2007-257850 A | 10/2007 |
| JP | 2009-076260 A | 4/2009 |
| JP | 2009-104902 A | 5/2009 |
| JP | 2010-009856 A | 1/2010 |
| JP | 2010-055755 A | 3/2010 |
| KR | 1020030027395 A | 4/2003 |
| KR | 10-0436712 B1 | 6/2004 |
| KR | 1020040090150 A | 10/2004 |
| KR | 10-0484642 B1 | 4/2005 |
| WO | WO 95/26055 A1 | 9/1995 |
| WO | WO 97/01870 A1 | 1/1997 |
| WO | WO 97/044840 | 11/1997 |
| WO | WO 99/05743 A1 | 2/1999 |
| WO | WO 99/19931 A1 | 4/1999 |
| WO | WO 99/33125 A1 | 7/1999 |
| WO | WO 99/33130 A1 | 7/1999 |
| WO | WO 99/57770 A1 | 11/1999 |
| WO | WO 01/33651 | 5/2001 |
| WO | WO 01/039302 | 5/2001 |
| WO | WO 01/039303 | 5/2001 |
| WO | WO 01/97304 | 12/2001 |
| WO | WO 02/071989 | 9/2002 |
| WO | WO 05/038953 | 4/2005 |
| WO | WO 2007/028972 A1 | 3/2007 |
| WO | WO 2007/075867 A2 | 7/2007 |
| WO | WO 2007/097172 A1 | 8/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2012/027457 A2 | 3/2012 |
| WO | WO 2012/174393 A1 | 12/2012 |

OTHER PUBLICATIONS

[No Author Listed] Product Data Lists: Lithium metal, battery grade from LectroMax120 Anode Material for FMC Corporation. 2009. 2 pages.

[No Author Listed] Product Data Lists: Lithium metal, battery grade from Chemtall Foote Corporation. 2008. 2 pages.

Anonymous, Low aluminum content lithium alloy for disulfide nonaqueous battery. Research Disclosure Journal. 1994. Research Disclosure No. 364044. 2 pages.

Affinito et al., "A New Class of Ultra-Barrier Materials," 47th Annual Technical Conference Proceedings (2004) ISSN 0737-5921.

Affinito et al., "High Rate Process for Deposition of Plasma Polymerized Films from High Molecular Weight/Low Vapor Pressure Liquid or Solid Monomer Precursor," 2nd International Symposium on Plasma Polymerization/Deposition: Fundamental and Applied Aspects (1999).

Affinito et al., "High rate vacuum deposition of polymer electrolytes," J. Vac. Sci. Technol., A 14(3) (1996).

Alamgir et al., "Room Temperature Polymer Electrolytes," Lithium Batteries, New Materials, Developments and Perspectives, Chapter 3, pp. 93-136, Elsevier, Amsterdam (1994).

Bae, J-S et al., "Study on diffusion and flow of benzene, n-hexane and CC14 in activated carbon by a differential permeation method," Chemical Engineering Science, 57 (2002) 3013-3024.

Bunshah, Rointan F., Ed. Handbook of Deposition Technologies for Films and Coatings. Second Edition. New Jersey: Noyes Publications, 1994. 198-223, 706-719.

Campbell et al., Electrodeposition of Mesoporous Nickel onto Foamed Metals Using Surfactant and Polymer Templates. J Porous Mater. 2004;11(2):63-69.

Cheon et al., Capacity fading mechanisms on cycling a high-capacity secondary sulfur cathode. J Electrochem Soc. Oct. 29, 2004;151(12):A2067-73.

Cheon et al., Rechargeable lithium sulfur battery: II. Rate capability and cycle characteristics. J Electrochem Soc. May 5, 2003;150(6):A800-05.

Cunningham et al., Phase Equilibria in Lithium-Chalcogen Systems. J Electrochem Soc. 1972;119:1448-50.

Do., H.D. et al., "A new diffusion and flow theory for activated carbon from low pressure to capillary condensation range", Chemical Engineering Journal, 84 (2001) 295-308.

Doherty et al., Colloidal Crystal Templating to Produce Hierarchically Porous LiFePO4 Electrode Materials for High Power Lithium Ion Batteries. Chem Mater. 2009;21(13):2895-2903.

Dominey, "Current State of the Art on Lithium Battery Electrolytes," Lithium Batteries, New Materials, Developments and Perspectives, Chapter 4, pp. 137-165, Elsevier, Amsterdam (1994).

Garboczi, Permeability, diffusivity, and microstructural parameters: A critical review. Cement and Concrete Res. Jul. 1990;20(4):591-601.

Gireaud, L., et al. "Lithium metal stripping/plating mechanism studies: A metallurgical approach," Electrochemistry Communications, 8 (2006) 1639.

Gonzenbach et al., Macroporous ceramics from particle-stabilized wet foams. J Am Ceram Soc. 2007;90(1):16-22.

Graff et al., "Mechanisms of vapor permeation through multilayer barrier films: Lag time versus equilibrium permeation," Journal of Applied Physics, 96(4) (2004).

Gregg, S.J., et al, Adsorption, Surface Area and Porosity, Second Edition, New York: Academic Press, 1982. 2-287.

Hirai, T., et al. "Influence of electrolyte on lithium cycling efficiency with pressurized electrode stack," J. Electrochem. Soc., 141 (1994) 611.

Ji et al., A highly ordered nanostructured carbon-sulphur cathode for lithium-sulphur batteries. Nature Mater. May 17, 2009;8(6):500-06.

Kim et al., Correlation between positive-electrode morphology and sulfur utilization in lithium-sulfur battery. J Power Sources. May 20, 2004;132(1-2):209-12.

Kulinowski et al., Porous metals from colloidal templates. Adv Mater. 2000;12(11): 833-38.

Kwan, K. S., et al., "Effect of penetrant size, shape, and chemical nature on its transport through a thermoset adhesive. II. Esters," Polymer, 44 (2003) 3071-3083.

Lordgooei, M. et al., "New General Pore Size Distribution Model by Classical Thermodynamics Application: Activated carbon", J. of Environmental Engineering, Apr. 2001, 281-287.

Mikhaylik et al., 380 Wh/kg Rechargeable Li/S Batteries Operating at 90% of Sulfur Utilization. 206th Meeting of the Electrochemical Society. Honolulu, Hawaii. Oct. 3-8, 2004. Abst. 443.

Mikhaylik et al., Polysulfide Shuttle Study in the Li/S Battery System. J Electrochem Soc. 2004;151:A1969-76.

Miyahara, M., et al., "Determination of adsorption equilibria in pores by molecular dynamics in a unit cell with imaginary gas phase," J. Chem. Phys., 106 (19), May 15, 1997, 8124-8134.

Peer, Tef_methy_ethyl. Accessed online at peer.tamu.edu/curriculum_modules/properties/module_3/Tef_methyl_ethyl.htm. Last accessed May 31, 2013. 1 page.

Probst et al., Structure and electrical properties of carbon black. Carbon. Feb. 2002;40(2):201-5.

Rauh et al., A Lithium/Dissolved Sulfur Battery with an Organic Electrolyte. J Electrochem Soc. 1979;126:523-27.

Ravikrishna et al., Low-temperature synthesis of porous hydroxyapatite scaffolds using polyaphron templates. J Sol-Gel Sci Techn. Apr. 2006;38(2):203-10.

(56) References Cited

OTHER PUBLICATIONS

Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Saito et al., "Improvement in Lithium Cycling Efficiency by Using Additives in Lithium Metal," *Journal of Power Sources*, 1997, vol. 68, pp. 476-479.
Sakka et al., Fabrication of porous ceramics with controlled pore size by colloidal processing. Sci Technol Adv Mater. Nov. 2005;6(8):915-20.
Shim et al., The Lithium/Sulfur Rechargeable Cell. Effects of Electrode Composition and Solvent on Cell Performance. J Electrochem Soc. 2002;149:A1321-25.
Shin et al., Characterization of N-Methyl-N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Steele, W.A. et al., "Simulation studies of sorption in model cylindrical micropores," *Advances in Colloid and Interface Science*, 76-77 (1998) 153-178.
Steele, W.A., "The Physical Adsorption of Gases on Solids", *Advances in Colloid and Interface Science*, 1 (1967) 3-78.
Storck, S. et al., "Characterization of micro- and mesoporous solids by physisorption methods and pore-size analysis", *Applied Catalysis A: General*, 174 (1998) 137-146.
Wang et al., Electrochemical characteristics of sulfur composite cathode materials in rechargeable lithium batteries. J Power Sources. Nov. 15, 2004;138(1-2):271-73.
Wang et al., Sulfur-carbon nano-composite as cathode for rechargeable lithium battery based on gel electrolyte. Electrochem Comm. 2002;4(6):499-502.
Woo et al., Preparation and characterization of three demensionally ordered macroporous $Li_4Ti_5O_{12}$ anode for lithium batteries. Electrochimica Acta. 2007;53(1):79-82.
Yuan et al., Improvement of cycle property of sulfur-coated multi-walled carbon nanotubes composite cathode for lithium/sulfur batteries. J Power Sources. Apr. 15, 2009;189(2):1141-46.
Zhang et al., Dual-scale porous electrodes for solid oxide fuel cells from polymer foams. Adv Mater. 2005;17(4):487-91.
Zhang et al., Novel Nanosized Adsorbing Composite Cathode Materials for the Next Generational Lithium Battery. Journal of Wuhan University of Technology-Mater. Sci. Ed. 2007;22(2):234-39.
Zhang et al., Three-dimensional ordered macroporous platinum-based electrode for methanol oxidation. Chinese Sci Bulletin. Jan. 2006;51(1):19-24.
Zhao et al., "A solid-state electrolyte lithium phosphorous oxynitride film prepared by pulsed laster deposition," Thin Solid Films, vol. 415, Issues 1-2, pp. 108-113 (Aug. 1, 2002).
Zheng et al., Electrochemical properties of rechargeable lithium batteries with sulfur-containing composite cathode materials. Electrochem Solid-State Lett., May 12, 2006; 9(7):A364-A367.
Zheng et al., Novel nanosized adsorbing sulfur composite cathode materials for the advanced secondary lithium batteries. Electrochimica Acta. Jan. 5, 2006;51(7):1330-35.
Zhuang et al., "The Reaction of lithium with carbon dioxide studied by photoelectron spectroscopy," Surface Science, 418, pp. 139-149 (1998).
Chen et al., Recent advances in lithium-sulfur batteries. J Power Sources. Dec. 1, 2014;267:770-83.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
Lai et al., Synthesis and Electrochemical Performance of Sulfur/Highly Porous Carbon Composites. J. Phys. Chem. C 2009, 113, 4712-4716.
Takeuchi et al., Preparation of electrochemically active lithium sulfide-carbon composites using spark-plasma-sintering process. Journal of Power Sources 195 (2010) 2928-2934.
Wang et al., Polymer lithium cells with sulfur composites as cathode materials. Electrochimica Acta 48 (2003) 1861-1867.
Huggins, Lithium alloy negative electrodes. Journal of Power Sources. 1999;81-82:13-19.
Kim, Recent Developments in Anode Materials for Li Secondary Batteries. Journal of the Korean Electrochemical Society. 2008;11(3):211-22.
Yang et al., Small particle size multiphase Li-alloy anodes for lithium-ion-batteries. Solid State Ionics. 1996;90:281-7.
U.S. Appl. No. 16/390,412, filed Apr. 22, 2019, Scordilis-Kelley et al.

* cited by examiner

ELECTROCHEMICAL CELL

RELATED APPLICATIONS

The present application is a continuation-in-part of U.S. patent application Ser. No. 12/535,328, filed on Aug. 4, 2009 and entitled "Application of Force In Electrochemical Cells", which claims priority to U.S. Patent Apl. Ser. No. 61/086,329, filed on Aug. 5, 2008 and entitled "Application of Force In Electrochemical Cells", each of which is hereby incorporated by reference in its entirety.

The present application is also a continuation-in-part of U.S. patent application Ser. No. 12/727,862, filed on Mar. 19, 2010 and entitled "Cathode for Lithium Battery", which claims priority to U.S. patent application Ser. No. 61/161,529, filed on Mar. 19, 2009 and entitled "Cathode for Lithium Battery", each of which is hereby incorporated by reference in its entirety.

The present application also claims priority to U.S. patent Apl. Ser. No. 61/237,903, filed on Aug. 28, 2009 and entitled "Electrochemical Cells Comprising Porous Structures Comprising Sulfur" and U.S. patent Apl. Ser. No. 61/236,322, filed Aug. 24, 2009 and entitled, "Release System for Electrochemical Cells", each of which is hereby incorporated by reference in its entirety.

FIELD OF INVENTION

The present invention relates to electrochemical cells, and more specifically, to components and configurations for electrochemical cells including rechargeable lithium batteries.

SUMMARY OF THE INVENTION

Electrochemical cells, and more specifically, components and configurations for electrochemical cells including rechargeable lithium batteries are generally described. The subject matter of the present invention involves, in some cases, interrelated products, alternative solutions to a particular problem, and/or a plurality of different uses of one or more systems and/or articles.

In one aspect, an electrochemical cell is described. The electrochemical cell can comprise, in some embodiments, a first electrode comprising a first base electrode material layer comprising a first active electrode species, a second base electrode material layer comprising the first active electrode species, at least one protective layer positioned between the first and second base electrode material layers, a current collector, and a release layer, wherein the current collector is positioned between the release layer and the first base electrode material layer. In some embodiments, the electrochemical cell can also comprise a second electrode comprising a second active electrode species; a polymer gel layer positioned between the first and second electrodes; and an electrolyte, wherein the electrochemical cell is constructed and arranged to apply, during at least one period of time during charge and/or discharge of the cell, an anisotropic force with a component normal to a surface of the first electrode.

The electrochemical cell can comprise, in some cases, an anode comprising a first base electrode material layer comprising lithium as an active electrode species; a second base electrode material layer comprising lithium as an active electrode species; a first multi-layered structure comprising a polymer layer and a lithiated single-ion conductive layer positioned between the first and second base electrode material layers; a second multi-layered structure comprising a polymer layer and a lithiated single-ion conductive layer positioned between the second base electrode material layer and an electrolyte; a cathode comprising sulfur as an active electrode species; and an electrolyte comprising an N—O additive, wherein the electrochemical cell is constructed and arranged to apply, during at least one period of time during charge and/or discharge of the cell, an anisotropic force with a component normal to a surface of the first electrode.

In some embodiments, the electrochemical cell can comprise an anode comprising a first base electrode material layer comprising lithium as an active electrode species, a second base electrode material layer comprising lithium as an active electrode species, and at least one protective layer positioned between the first and second base electrode material layers. In some cases, the electrochemical cell can also comprise a cathode comprising a base electrode material layer comprising sulfur as an active electrode species, wherein the base electrode material layer of the cathode comprises a sulfur loading of at least 1.2 mg S/cm$^2$ and a thickness of less than or equal to about 100 microns.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control. All patents and patent applications disclosed herein are incorporated by reference in their entirety for all purposes.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
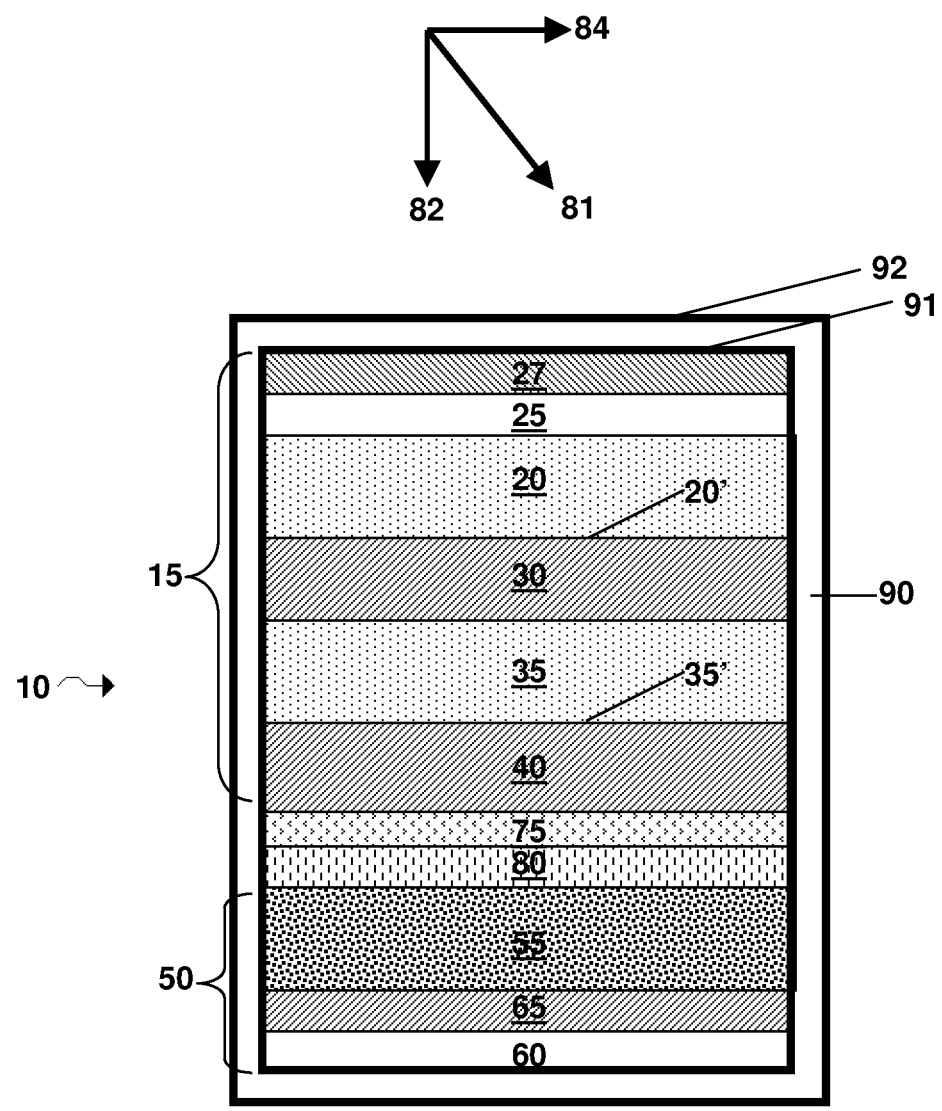
FIG. 1 is a schematic diagram of an electrochemical cell, according to one set of embodiments.

Electrochemical cells including components and configurations for electrochemical cells, such as rechargeable lithium batteries, are provided. The electrochemical cells described herein may include a combination of components arranged in certain configurations that work together to increase performance of the electrochemical cell. In some embodiments, such combinations of components and configurations described herein may minimize defects, inefficiencies, or other drawbacks that might otherwise exist inherently in prior electrochemical cells, or that might exist inherently in prior electrochemical cells using the same or similar materials as those described herein, but arranged differently.

There has been considerable interest in recent years in developing high energy density batteries with lithium containing anodes. Lithium metal is particularly attractive as the anode of electrochemical cells because of its extremely light weight and high energy density, compared for example to certain anodes, such as lithium intercalated carbon anodes, where the presence of non-electroactive materials increases weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells.

Lithium battery systems generally include a cathode which is electrochemically lithiated during the discharge. In this process, lithium metal is converted to lithium ion and transported through electrolyte to the battery's cathode where it is reduced. In a lithium/sulfur battery, lithium ion forms one of a variety of lithium sulfur compounds, at the cathode. Upon charging, the process is reversed, and lithium metal is plated, from lithium ion in the electrolyte, at the anode. In each discharge cycle, a significant number (e.g., 15-30%) of available Li may be electrochemically dissolved in the electrolyte, and nearly this amount can be re-plated at the anode upon charge. Typically, slightly less lithium is re-plated at the anode at each charge, as compared to the amount removed during each discharge; a small fraction of the metallic Li anode typically may be lost to insoluble electrochemically inactive species during each charge-discharge cycle.

This process is stressful to the anode in many ways, and can lead to premature depletion of Li and reduction of the battery cycle life. During this cycling, the Li anode surface can become roughened (which can increase the rate of field-driven corrosion) and Li surface roughening can increase proportionally to the current density. Many of the inactive reaction products associated with overall Li loss from the anode upon cycling can also accumulate on the increasingly roughened Li surface and may interfere with charge transport to the underlying metallic Li anode. In the absence of other degradation processes in other parts of the battery, the per-cycle Li anode loss alone can eventually render the cell inactive. Accordingly, it is desirable to minimize or inhibit Li-loss reactions, minimize the Li surface roughness/corrosion rate, and prevent any inactive corrosion reaction products from interfering with charge transport across the Li anode surface. Especially at higher current density (which is commercially desirable) these processes can lead to quicker cell death.

The separation of a lithium anode from the electrolyte of a rechargeable lithium battery or other electrochemical cell can be desirable for a variety of reasons, including the prevention of dendrite formation during recharging, reaction of lithium with the electrolyte, and cycle life. For example, reaction of a lithium anode with the electrolyte may result in the formation of resistive film barriers on the anode, which can increase the internal resistance of the battery and lower the amount of current capable of being supplied by the battery at the rated voltage.

While a variety of techniques and components for protection of lithium and other alkali metal anodes are known, especially in rechargeable batteries, these protective coatings present particular challenges. Since lithium batteries function by removal and re-plating of lithium from a lithium anode in each charge/discharge cycle, lithium ion must be able to pass through any protective coating. The coating must also be able to withstand morphological changes as material is removed and re-plated at the anode.

Other challenges associated with lithium/sulfur cells also exist, some of which are described in more detail below. Despite the various existing approaches proposed for forming lithium anodes, interfacial and/or protective layers, electrolytes, sulfur cathodes, and other components, improvements are needed. Such improvements are provided in more detail below.

While much of the description herein is directed to lithium cells (especially lithium metal/sulfur cells), it should be understood that embodiments described herein can be applied to other types of electrochemical cells as well.

Examples of electrochemical cells, components, and configurations are now provided.

FIG. 1 shows an example of an electrochemical cell including various components according to one set of embodiments. As shown in this exemplary embodiment, electrochemical cell 10 includes an anode 15 comprising a first base electrode material layer 20 comprising an electroactive material. The base electrode material layer may be positioned adjacent a current collector 25. Certain anodes may include a release layer 27 which may be useful during fabrication of the anode, as described in more detail below.

In certain embodiments, the base electrode material layer may be protected by a first multi-layered structure 30, which can include, for example, one or more single-ion conductive layers and/or one or more polymer layers (not shown). The multi-layered structure may, in some embodiments, act as an effective barrier to protect the electroactive material from reaction with certain species in the electrolyte. As shown in the illustrative embodiment of FIG. 1, anode 15 also includes a second base electrode material layer 35 separated from the first base electrode material layer. This second layer of electroactive material may shield the first base electrode material layer from damage during charge and/or discharge, thereby increasing the cycle life of the electrochemical cell.

A second multi-layered structure 40 may be used to protect second base electrode material layer 35.

Electrochemical cell 10 may further include a cathode 50 comprising a base electrode material layer 55 comprising an electroactive material. Base electrode material layer 55 may be positioned adjacent a current collector 60, in some embodiments via a primer layer 65 which may facilitate adhesion between the base electrode material layer and the current collector. In certain embodiments, the cathode is constructed and arranged to be structurally stable during the application of a force to the electrochemical cell. This application of force may enhance the performance of the electrochemical cell, as described in more detail below.

An electrolyte may be positioned between the anode and the cathode. The electrolyte can function as a medium for the storage and transport of ions, and in the special case of solid electrolytes and gel electrolytes, these materials may additionally function as a separator between the anode and the cathode. In some embodiments, an electrochemical cell may include a heterogeneous electrolyte comprising a first electrolyte solvent and a second electrolyte solvent. The first and second electrolyte solvents may be partitioned during cycling, such that the first electrolyte solvent resides predominately at the anode during the cycle life of the electrochemical cell. In some embodiments, the first electrolyte solvent resides predominately at a polymer layer 75 adjacent the anode. The second electrolyte solvent may reside predominately at an optional polymer layer 80 adjacent the cathode and/or in pores of the base electrode material layer 55 of the cathode. As described in more detail below, the use of a heterogeneous electrolyte, and especially the partitioning of a heterogeneous electrolyte into different portions of the cell, can reduce the level of exposure of a component of the cell to a species that may be otherwise harmful to that component.

The various components shown in FIG. 1 will now be described in more detail. It should be understood that not all components shown in FIG. 1 need be present in the electrochemical cells described herein. Furthermore, electrochemical cells may include additional components that are not shown in FIG. 1. An electrochemical cell may also include other configurations and arrangements of components besides those shown in FIG. 1.

Figure 2:
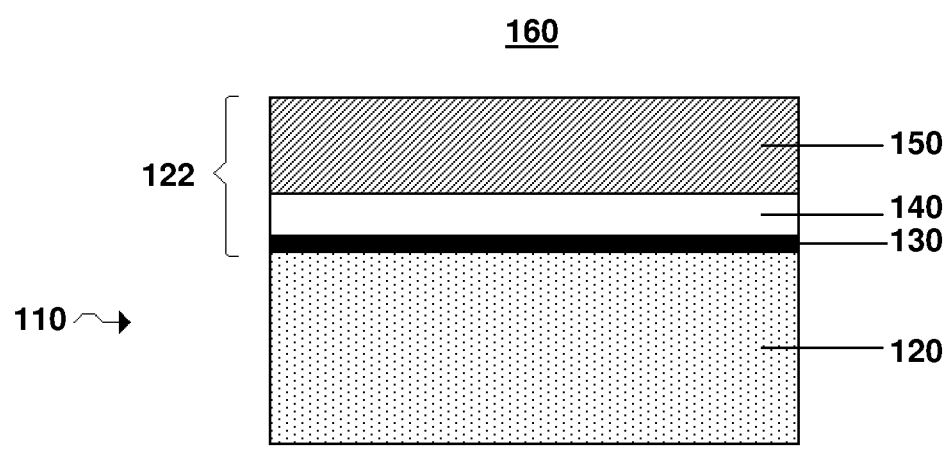
FIG. 2 is a schematic diagram of an anode including a multi-layered protective structure, according to one set of embodiments.

FIG. 2 shows one example of an anode including a multi-layered anode stabilization structure that may be included in electrochemical cells described herein, such as the electrochemical cell shown in FIG. 1 (e.g., anode 15 of FIG. 1 may be in the form of anode 110 shown in FIG. 2). In the embodiment illustrated in FIG. 2, anode 110 includes a base electrode material layer 120 (e.g., comprising an electroactive material such as lithium) and a multi-layered structure 122. In some cases herein, the anode is referred to as an "anode based material," "anode active material,' or the like, and the anode along with any protective structures are referred to collectively as the "anode." All such descriptions are to be understood to form part of the invention. In this particular embodiment, multi-layered structure 122 includes a single-ion conductive material 150, a polymeric layer 140 positioned between the base electrode material and the single-ion-conductive material, and a separation layer 130 (e.g., a layer resulting from plasma treatment of the electrode) positioned between the electrode and the polymeric layer. Multi-layered structures can allow passage of lithium ions and may impede the passage of other components that may otherwise damage the anode. Advantageously, multi-layered structures can reduce the number of defects and thereby force a substantial amount of the surface of the base electrode material to participate in current conduction, impede high current density-induced surface damage, and/or act as an effective barrier to protect the anode from certain species (e.g., electrolyte and/or polysulfides), as discussed in greater detail below.

Anode 120 can comprise a base electrode material such as lithium metal, which can serve as the anode active material. The lithium metal may be in the form of, e.g., a lithium metal foil or a thin lithium film that has been deposited on a substrate, as described below. The lithium metal may also be in the form of a lithium alloy such as, for example, a lithium-tin alloy or a lithium aluminum alloy.

In most embodiments described herein, lithium rechargeable electrochemical cells (including lithium anodes) are described; however, it is to be understood that any analogous alkali metal battery (alkali metal anode) can be used. Furthermore, in some embodiments, non-lithium based anodes can be used. Additionally, although rechargeable electrochemical cells are primarily disclosed herein, non-rechargeable (primary) electrochemical cells are intended to benefit from the invention as well.

In some embodiments, alloys may be incorporated into the anode, and may enhance the performance of the cell. For example, an alloy may be incorporated into an electroactive layer of the cell and may advantageously increase the efficiency of cell performance. Some electrochemical cells (e.g., rechargeable batteries) may undergo a charge/discharge cycle involving deposition of metal (e.g., lithium metal) on the surface of the anode upon charging and reaction of the metal on the anode surface, wherein the metal diffuses from the anode surface, upon discharging. In some cases, the efficiency and uniformity of such processes may affect cell performance. The use of materials such as alloys in an electroactive component of the cell have been found, in accordance with aspects described herein, to increase the efficiency of such processes and to increase the cycling lifetime of the cell. For example, the use of alloys may reduce the formation of dendrites on the anode surface and/or limit surface development.

Lithium metal alloys having the formula Li—Z may function well in an electrochemical cell when low amounts of Z are present, i.e., the cell may efficiently undergo charge-discharge cycling and/or may reduce or prevent formation of lithium dendrites or other compositions that may form on the surface of an electrode. The additive, Z, may be any suitable material capable of forming an alloy with lithium (or other suitable electroactive metal). The term "alloy" is given its ordinary meaning in the art, and refers to a combination (e.g., solid, solid solution) of two or more elements, wherein at least one element is a metal, and wherein the resulting material has metallic properties.

In one specific set of embodiments, Z is a metal. In other embodiments, Z is a different material. In some cases, Z may be a semiconductor. Materials suitable for use as Z include, for example, a Group 1-17 element, a Group 2-14 element, or a Group 2, 10, 11, 12, 13, 14, 15 element. Suitable elements from Group 2 of the Periodic Table may include beryllium, magnesium, calcium, strontium, barium, and radium. Suitable elements from Group 10 may include, for example, nickel, palladium, or platinum. Suitable elements from Group 11 may include, for example, copper, silver, or gold. Suitable elements from Group 12 may include, for example, zinc, cadmium, or mercury. Elements from Group 13 that may be used in the present invention may include, for example, boron, aluminum, gallium, indium, or thallium. Elements from Group 14 that may be used in the present invention may include, for example, carbon, silicon, germanium, tin, or lead. Elements from Group 15 that may be used in the present invention may include, for example, nitrogen, phosphorus, or bismuth. In some cases, Z is Al, Mg, Zn, or Si. In some cases, Z is Al. In other cases, Z is Mg.

Where Z is a metal, it is to be understood that one or more metals can be used. Similarly, where Z is a semiconductor, one or more semiconducting materials can be used. Additionally, metals and semiconductors can be mixed. That is, Z can be a single metal, a single semiconductor, or one or more metals or one or more semiconductors mixed. Non-limiting examples of suitable metals are listed above, and suitable components of semiconductors are listed above. Those of ordinary skill in the art are well aware of semiconductors that can be formed from one or more of the elements listed above, or other elements.

In certain cases, Z is a nonmetal. For example, Z may be N, O, or C. In some instances, N, O, C, or other nonmetals that may form an alloy with lithium are in the form of a gas (e.g., $N_2$, $O_2$, and $CO_2$) prior to forming an alloy with lithium. In embodiments where Z is a nonmetal, the Li—Z metal alloy may have a primary phase consisting essentially of Li and a secondary phase consisting essentially of $Li_xZ_y$, and Z, wherein the secondary phase is substantially non-electrically conducting.

In the following discussion, reference will be made to material (e.g., "Z") "substantially uniformly dispersed throughout a bulk portion of" a material, such as an anode (e.g., a base electrode material layer) or another electrode. "Substantially uniformly dispersed," in this context, means that, upon viewing a cross-sectional portion of any such material, where the cross-section may comprise the average makeup of a number of random cross-sectional positions of the material, investigation of the material at a size specificity on the order of grains, or atoms, reveals essentially uniform dispersement of Z in the bulk material. For example, a photomicrograph, scanning electron micrograph, or other similar microscale or nanoscale investigative process will reveal essentially uniform distribution. "A bulk portion" of a material includes at least 50% of a cross-sectional dimension of the material. In certain embodiments, a bulk portion may comprise at least 60%, 70%, 80%, 90%, or 95% of a cross-sectional dimension of the material. Those of ordinary skill in the art, with this description, will understand clearly the meaning of these terms.

Those of ordinary skill in the art can also determine the degree of dispersion of a first material (e.g., Z) in a second material (e.g., lithium) by diffusion calculations based on parameters such as the type of materials, concentration/amounts and thicknesses of the materials, temperature, the time allowed for diffusion, etc. Generally, a very thin layer of a first material on a second material will facilitate faster dispersion of the first material into the second material (e.g., to form a uniformly dispersed layer of the two materials), compared to a thicker layer of the first material on the second material. The degree of dispersion also depends on the method of fabricating the materials. For instance, physical mixing and/or co-deposition of a first and a second material may form substantially uniformly dispersed materials prior to charge or discharge of the cell, whereas in certain embodiments involving layers of materials, the materials are not uniformly dispersed until after a certain charge/discharge cycle. The latter may occur because charge and/or discharge of the cell can also facilitate dispersion. For instance, a first material is more likely to be uniformly dispersed within a second material after $20^{th}$ discharge than after $1^{st}$ discharge of the cell.

As mentioned, Z may be substantially uniformly dispersed throughout a bulk portion of an electrode, e.g., prior to assembly of the alloy onto a substrate or prior to $X^{th}$ discharge, as described herein. In other embodiments, however, Z is not substantially uniformly dispersed throughout a bulk portion of an electrode. For instance, Z may form a gradient within the alloy or Z may be in the form of a layer on top of a bulk portion of the electrode.

Accordingly, in some embodiments, Z is substantially uniformly dispersed throughout a bulk portion of the anode (e.g., a base electrode material layer) prior to $10^{th}$ discharge. In some cases, Z is substantially uniformly dispersed throughout a bulk portion of the anode prior to $5^{th}$ discharge, or, in some cases, prior to $3^{rd}$ discharge, or in other cases, prior to $1^{st}$ discharge. In yet other cases, Z is substantially uniformly dispersed throughout a bulk portion of the anode prior to $15^{th}$, $20^{th}$, or $25^{th}$ discharge.

It is also to be understood that "prior to $X^{th}$ discharge", or "having been discharged less than X times" or the like, means at a time or times prior to a point where a rechargeable electrochemical device has been charged and discharged no more than X times, where charge means essentially full charge, and discharge means, on average of all discharges, at least 75% discharge.

In some cases, Z may be a metal or semiconductor that is present, in an electrode, in an amount greater than 25 ppm, 50 ppm, 100 ppm, 200 ppm, 300 ppm, 400 ppm or 500 ppm, but less than or equal to 1 wt %, 2 wt %, 5 wt %, 10 wt %, 12 wt %, 15 wt %, or wt % of the alloy or electrode. As used herein, "wt %" means percent by total weight of the alloy or electrode itself, absent current collector, electrolyte and other materials.

As noted, certain electrochemical cells utilizing electrodes described herein exhibit surprising performance characteristics. In one embodiment, a rechargeable cell has a discharge capacity of at least 1000, 1200, 1600, or 1800 mAh at the end of the cell's $15^{th}$, $25^{th}$, $30^{th}$, $40^{th}$, $45^{th}$, $50^{th}$, or $60^{th}$ cycle. The discharge capacity may be at least 2%, 5%, 7%, 10%, or 15% greater than that of a second rechargeable cell of essentially identical composition and dimension but comprising a Li anode without Z. In one set of embodiments, a rechargeable cell, including one of those described above or otherwise, is established such that there is a potential difference between its anode and that of the "second rechargeable cell" discussed above that is less than 5, 10, or 15 mV.

Another measure of some of the surprising performance characteristics of certain electrodes described herein includes energy density (which can be expressed as Watt Hours Per Kilogram (Wh/kg) or energy per size, as expressed as Watt Hours Per Liter (Wh/l)). Various energy density and energy per size characteristics exhibited by cells prior to $X^{th}$ discharge, where X is any of the numbers described herein, include, for example, at least 200, at least 250, at least 300, at least 350, at least 400, at least 450, or at least 500 Wh/kg.

In one set of embodiments, the Li—Z alloy has a primary phase consisting essentially of Li and a secondary phase consisting essentially of $Li_xZ_y$, the secondary phase being substantially non-electrically conducting. Where a multiple phase arrangement such as that described immediately above exists, the phase is typically usually distinguishable by SEM or other suitable technique and at least one of the phases has an average cross-sectional dimension in the range of, for example, 0.1-100 microns, 0.5-50 microns, or, in some cases, 0.5-10 microns. Especially in connection with these embodiments, Z, in addition to being in one or more of the materials described above, can be nitrogen, oxygen, or carbon.

Additional arrangements, components, and advantages of alloys are described in more detail in U.S. patent application Ser. No. 11/821,576, filed Jun. 22, 2007, entitled "Lithium Alloy/Sulfur Batteries", published as U.S. Pub. No. 2008/0318128, which is incorporated herein by reference in its entirety.

In certain embodiments, the thickness of the anode may vary from, e.g., about 2 to 200 microns. For instance, the anode may have a thickness of less than 200 microns, less than 100 microns, less than 50 microns, less than 25 microns, less than 10 microns, or less than 5 microns. The choice of the thickness may depend on cell design parameters such as the excess amount of lithium desired, cycle life, and the thickness of the cathode electrode. In one embodiment, the thickness of the anode active layer is in the range of about 2 to 100 microns (e.g., about 5 to 50 microns, about 5 to 25 microns, or about 10 to 25 microns).

The layers of an anode may be deposited by any of a variety of methods generally known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Deposition of the layers may be carried out in a vacuum or inert atmosphere to minimize side reactions in the deposited layers which could introduce impurities into the layers or which may affect the desired morphology of the layers. In some embodiments, anode active layers and the layers of multi-layered structures are deposited in a continuous fashion in a multistage deposition apparatus.

Specifically, methods for depositing an electroactive material such as lithium onto a substrate include methods such as thermal evaporation, sputtering, jet vapor deposition, and laser ablation. Alternatively, where the anode comprises a lithium foil, or a lithium foil and a substrate, these can be laminated together by a lamination process as known in the art, to form an anode layer.

An anode, such as that shown in FIG. 2 and in other embodiments described herein, may include a single-ion conductive material layer 150 as part of a multi-layered structure 122. In some embodiments, the single-ion conductive material is non-polymeric. In certain embodiments, the single-ion conductive material layer is defined in part or in whole by a metal layer that is highly conductive toward lithium and minimally conductive toward electrons. In other words, the single-ion conductive material may be one selected to allow lithium ions, but to impede electrons or other ions, from passing across the layer. The metal layer may comprise a metal alloy layer, e.g., a lithiated metal layer especially in the case where a lithium anode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the single-ion conductive material include, but are not limited to, Al, Zn, Mg, Ag, Pb, Cd, Bi, Ga, In, Ge, Sb, As, and Sn. Sometimes, a combination of metals, such as the ones listed above, may be used in a single-ion conductive material.

In other embodiments, the single-ion conductive material may include a ceramic layer, for example, a single ion conducting glass conductive to lithium ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Single-ion conductive layers may include glassy layers comprising a glassy material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In one embodiment, the single-ion conductive layer comprises a lithium phosphorus oxynitride in the form of an electrolyte.

The thickness of a single-ion conductive material layer (e.g., within a multi-layered structure) may vary over a range from about 1 nm to about 10 microns. For instance, the thickness of the single-ion conductive material layer may be between 1-10 nm thick, between 10-100 nm thick, between 100-1000 nm thick, between 1-5 microns thick, or between 5-10 microns thick. The thickness of a single-ion conductive material layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In some cases, the single-ion conductive layer has the same thickness as a polymer layer in a multi-layered structure.

The single-ion conductive layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, single-ion conducting layers can be treated with a polymer or other material such that pinholes and/or nanopores of the single-ion conducting layers may be filled with the polymer. Such composite structures can impede the diffusion of certain species (e.g., electrolyte and/or polysulfides) towards the anode, e.g., by increasing the distance, and tortuosity, through which such a species would need to pass to penetrate the entire multi-layer arrangement to arrive at the anode.

In one embodiment, a single-ion conductive layer is infiltrated with a monomeric precursor of the transport-inhibiting substance, so that the porous structure is effectively filled with the monomer, the monomer being driven into the nanoporous regions of the porous single-ion conductive layer by the high surface energy present on the single-ion conductive layer's internal surfaces. The single-ion conductive material may be treated with an activation process before treatment with the monomer, so that surface energy within the material becomes unusually high, relative to that achievable in normal atmospheric processes.

In some instances, monomer vapor can be condensed onto the single-ion conductive material layer, whereby it is then able to wick along the internal surfaces of the single-ion conductive material layer, until all, or some useful portion of, such available tortuous by-paths of permeation are filled by the monomer. A subsequent curing step, either photo-initiated techniques, plasma treatment, or an electron beam, can then be introduced for polymerization of the infiltrated monomer. The particular cure method utilized will depend on the specific choice of materials and the layer thickness, amongst other variables.

Suitable material used as the transport-inhibiting substance includes material known to fully or partially inhibit (or determined to inhibit through simple screening) transport of a particular unwanted species through the material. As mentioned, material may also be selected according to physical properties, including properties adding flexibility and/or strength to the overall material with which it is combined. Specific examples of materials include, as noted, polymers described herein for use as layers in the multi-layered structure, and/or other polymeric or other species. Where hydrophobicity is desirably added to the overall arrangement, one way to do so is to use an infiltrating transport-inhibiting substance having some degree of hydrophobic character.

Formation of composite single-ion conductive structures may be accomplished by a variety of means; however, in some embodiments, the structure is formed by vacuum vapor deposition methods and apparatus readily available in prior art manufacturing processes. Accordingly, composite structures may be formed utilizing a variety of prior art vapor sources such as sputtering, evaporation, electron-beam evaporation, chemical vapor deposition (CVD), plasma-assisted CVD, etc. The monomer vapor source may similarly be any suitable monomer vapor source of the prior art, including but not limited to flash evaporation, boat evaporation, Vacuum Monomer Technique (VMT), polymer multilayer (PML) techniques, evaporation from a permeable membrane, or any other source found effective for producing a monomer vapor. For example, the monomer vapor may be created from various permeable metal frits, as previously in the art of monomer deposition. Such methods are taught in U.S. Pat. No. 5,536,323 (Kirlin) and U.S. Pat. No. 5,711,816 (Kirlin), amongst others.

As described herein, a multi-layered structure can include one or more polymer layers. The thickness of a polymer layer (e.g., within a multi-layered structure) may vary over a range from about 0.1 microns to about 10 microns. For instance, the thickness of the polymer layer may be between 0.1-1 microns thick, between 1-5 microns thick, or between 5-10 microns thick. The thickness of a polymer layer may be no greater than, e.g., 10 microns thick, no greater than 5 microns thick, no greater than 2.5 microns thick, no greater than 1 micron thick, no greater than 0.5 microns thick, or no greater than 0.1 microns thick.

In some embodiments including a multi-layered structure having more than one polymer layer, the thicknesses of the polymer layers can vary within the structure. For instance, in some cases, the polymer layer closest to the base electrode material layer (e.g., a Li reservoir) is thicker than the other polymer layers of the structure. This embodiment can, for example, stabilize the anode by allowing lithium ions to plate out more uniformly across the surface of the anode during charge.

In some embodiments, a polymer layer includes a polymer that is conductive to single ions but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Electrically-conductive additives may also be added to polymers to form electrically-conductive polymers. Certain electrically conductive materials may have a conductivity of, e.g., greater than $10^{-2}$ S/cm, greater than $10^{-1}$ S/cm, greater than 1 S/cm, greater than $10^1$ S/cm, greater than $10^2$ S/cm, greater than $10^3$ S/cm, greater than $10^4$ S/cm, or greater than $10^5$ S/cm.

In some embodiments, a polymer layer is conductive to one or more types of ions, but is substantially non-electrically conductive. Examples of ion-conductive species that are substantially non-electrically conductive include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive but substantially non-electrically conductive.

In some embodiments, single-ion conductive materials can also include non-polymeric materials. Certain non-electrically conductive materials may have a resistivity of, e.g., greater than $10^3$ ohm-cm, greater than $10^4$ ohm-cm, greater than $10^5$ ohm-cm, greater than $10^6$ ohm-cm, greater than $10^7$ ohm-cm, or greater than $10^8$ ohm-cm.

In some embodiments, suitable polymer layers for use in a multi-layered structure include polymers that are highly conductive towards lithium and minimally conductive towards electrons. Examples of such polymers include ionically conductive polymers, sulfonated polymers, and hydrocarbon polymers. The selection of the polymer will be dependent upon a number of factors including the properties of electrolyte and cathode used in the cell. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

Polymer layers of a multi-layered structure can also include crosslinked polymer materials formed from the polymerization of monomers such as alkyl acrylates, glycol acrylates, polyglycol acrylates, polyglycol vinyl ethers, polyglycol divinyl ethers, and those described in U.S. Pat. No. 6,183,901 to Ying et al. of the common assignee for protective coating layers for separator layers. For example, one such crosslinked polymer material is polydivinyl poly (ethylene glycol). The crosslinked polymer materials may further comprise salts, for example, lithium salts, to enhance ionic conductivity. In one embodiment, the polymer layer of the multi-layered structure comprises a crosslinked polymer.

Other classes polymers that may be suitable for use in a polymer layer include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexyl-cynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

A polymer layer may be deposited by method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. A method for depositing crosslinked polymer layers includes flash evaporation methods, for example, as described in U.S. Pat. No. 4,954,371 to Yializis. A method for depositing crosslinked polymer layers comprising lithium salts may include flash evaporation methods, for example, as described in U.S. Pat. No. 5,681,615 to Afftnito et al. The technique used for depositing polymer layers may depend on the type of material being deposited, the thickness of the layer, etc.

As noted in the description with respect to FIG. 2 thus far, in one particular embodiment, the protective structure separating base electrode material layer 120 from electrolyte 160 includes a polymer layer adjacent the base electrode material layer or separation layer 130. In other arrangements, a polymer layer need not be the first layer adjacent the base electrode material layer or separation layer. Various arrangements of layers, including various multi-layered structures, are described below in which the first layer adjacent the base electrode material layer may or may not be polymeric. It is to be understood that in all arrangements where any particular arrangement of layers is shown, alternate ordering of layers is within the scope of the invention. Notwithstanding this, one aspect of the invention includes the particular advantages realized by a non-brittle polymer immediately adjacent the base electrode material layer or separation layer.

In some embodiments, multi-layered structures protect the base electrode material layer better than any individual layer that is included in the structure. For instance, each of the layers of a multi-layered structure, e.g., the single-ion conducting layers, the polymer layers, or the separation layer, may possess desirable properties, but at the same time may be most effective when complemented by other components with different properties. For example, single-ion conducting layers, especially vacuum deposited single-ion conducting layers, may be flexible as thin films, but when deposited as thicker layers, may include defects such as pinholes and/or roughness, and may crack when handled. Polymer layers, and especially crosslinked polymer layers, for example, can provide very smooth surfaces, may add strength and flexibility, and may be electron insulating, but may pass certain solvents and/or liquid electrolytes. Accordingly, these are examples of layers that can complement each other in an overall improved protective structure.

A multi-layered electrode stabilization or protection structure may provide many advantages over existing electrode protective structures. In much of the description herein, the structure is referred to as an "anode stabilization" structure, but it is to be understood that the structure can be used for any electrode under suitable conditions as would be understood by those of ordinary skill in the art when taking into consideration the function of a particular electrode. Multi-layered electrode stabilization structures described herein, according to certain embodiments, are designed to minimize defects that might otherwise exist inherently in prior electrode protective structures, or that might exist inherently in electrode protective structures using the same or similar materials as those used in protective structures described herein, but arranged differently. For example, single ion-conductive layers (or other components of a device as described herein) may include pinholes, cracks and/or grain boundary defects. Once these defects are formed, they can grow/propagate through the entire thickness of the film as the film grows and may become worse as the film grows thicker. By separating thin single ion-conductive layers from each other with thin, pinhole free, smooth polymer layers, the defect structure in each single ion-conductive layer can be decoupled from the defect structure in every other single ion-conductive layer by an intervening polymer layer. Thus, at least one or more of the following advantages are realized in such a structure: (1) it is less likely for defects in one layer to be directly aligned with defects in another layer, and typically any defect in one layer is substantially non-aligned with a similar defect in another layer; (2) any defects in one single ion-conductive layer typically are much smaller and/or less detrimental than they would otherwise be in a thicker layer of otherwise similar or identical material. Where alternating single-ion conductive layers and polymer layers are deposited atop each other in a fabrication process, each single-ion conductive layer has a smooth, pinhole free, polymer surface upon which to grow. In contrast, where the single-ion conductive layer to be deposited atop another single-ion conductive layer (or continuously deposited as a single, thicker layer), defects in an underlying layer can serve to instigate defects in growth in a layer deposited atop an underlying layer. That is, whether a protective structure is built with thicker single-ion conductive layers or multiple single-ion conductive layers atop each other, defects can propagate through the thickness, or from layer to layer, as the structure grows, resulting in larger defects, and defects that propagate directly or substantially directly throughout the entire structure. In this and other arrangements, the single ion-conductive layers can also grow with fewer defects than would occur if they were deposited directly onto the rougher Li or electrolyte layers, particularly where the arrangement of FIG. 2 is employed in which the first electrode stabilization layer addressing the electrode is the polymer layer. Accordingly, in this and other arrangements, ion-conductive layers can be made that have overall fewer defects, defects that are not aligned with defects in nearest other ion-conductive layers and, where defects exist, they are typically significantly less detrimental (e.g., smaller) than would otherwise exist in a continuously-grown, thicker structure or layers of the same or similar material deposited on top of each other.

A multi-layered electrode stabilization structure can act as a superior permeation barrier by decreasing the direct flow of species (e.g., electrolyte and polysulfide species) to the base electrode material layer, since these species have a tendency to diffuse through defects or open spaces in the layers. Consequently, dendrite formation, self discharge, and loss of cycle life can be reduced.

Another advantage of a multi-layered structure includes the mechanical properties of the structure. The positioning of a polymer layer adjacent a single-ion conductive layer can decrease the tendency of the single-ion conductive layer to crack, and can increase the barrier properties of the structure. Thus, these laminates may be more robust towards stress due to handling during the manufacturing process than structures without intervening polymer layers. In addition, a multi-layered structure can also have an increased tolerance of the volumetric changes that accompany the migration of lithium back and forth from the base electrode material layer during the cycles of discharge and charge of the cell.

The ability of certain species that can be damaging to the base electrode material layer (e.g., electrolytes and/or polysulfides) to reach the base electrode material layer can also be decreased by providing repeated layers of single-ion conductive layers and polymer layers in a multi-layered structure. When a species encounters a defect-free portion of a single-ion conductive layer, transport of the species towards the base electrode material layer is possible if the species diffuses laterally through a very thin polymer layer to encounter a defect in a second single-ion conductive layer. Since lateral diffusion through ultra-thin layers is very slow, as the number of single-ion conductive/polymer layer pairs increases, the rate of diffusion of species becomes extremely small (e.g., the amount of penetration across the layer decreases). For instance, in one embodiment, permeation of a species through polymer/single-ion conductive/polymer 3-layer structures can be reduced by three orders of magnitude over a single single-ion conductive layer alone (e.g., even though layers alone may have poor barrier properties). In another embodiment, a polymer/single-ion conductive/polymer/single-ion conductive/polymer 5-layer structure may have more than five orders of magnitude reduction of permeation of a species compared to that in a single single-ion conductive layer. By contrast, permeation of the same species through a double-thick single-ion conductive layer may actually increase. These significant reductions in permeation of destructive species through the electrode stabilization layer can increase as the number of layers increases where the thickness of individual layers decreases. That is, in comparison to a two-layer structure of a single-ion conductive layer and polymer layer of a particular, overall thickness, a ten-layer structure of alternating single-ion conductive layers and polymer layers of the same overall thickness can vary significantly decreased permeation of unwanted species through the layer. Because of the significant advantage realized by the electrode stabilization protection structures described herein, overall lower amounts of material can be used in a particular protective structure, as compared to prior art structures. Accordingly, at a particular level of electrode protection needed in a particular battery arrangement, a significantly smaller mass of overall electrode stabilization materials can be employed, significantly reducing overall battery weight.

A multi-layered structure can include various numbers of polymer/single-ion conductive pairs as needed. Generally, a multi-layered structure can have n polymer/single-ion conductive pairs, where n can be determined based on a particular performance criteria for a cell. E.g., n can be an integer equal to or greater than 1, or equal to or greater than 2, 3, 4, 5, 6, 7, 10, 15, 20, 40, 60, 100, or 1000, etc. In some embodiments, a multi-layered structure can include greater than 4, greater than 10, greater than 25, greater than 50, greater than 100, greater than 200, greater than 500, greater than 1000, greater than 2000, greater than 3000, greater than 5000, or greater than 8000 polymer/single-ion conductive pairs. For example, in one particular embodiment, greater than 10,000 polymer/single-ion conductive pairs were fabricated.

Figure 3:
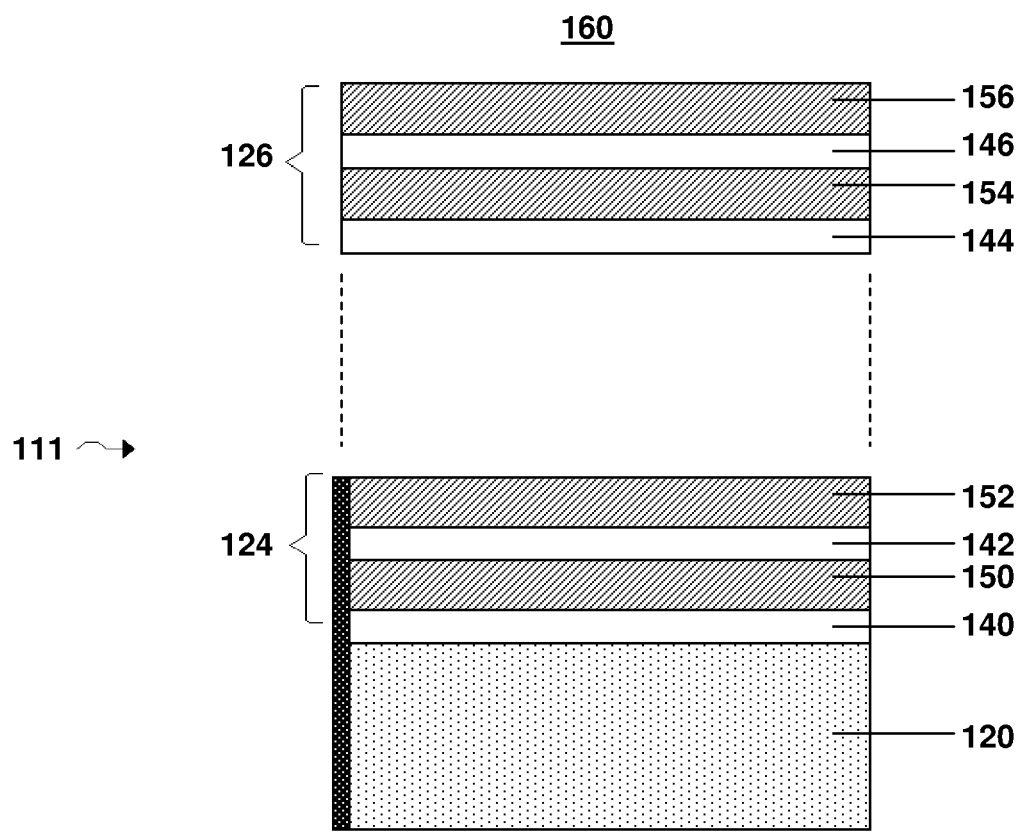
FIG. 3 is a schematic diagram of an anode including multiple multi-layered structures, according to one set of embodiments.

FIG. 3 shows an example of a multi-layered electrode stabilization structure including multiple polymer and single-ion conductive layers. In the embodiment illustrated in FIG. 3, anode 111 includes base electrode material layer 120 (e.g., comprising an electroactive material such as lithium), and multi-layered structure 124 positioned between the base electrode material layer and an electrolyte 160 of the cell. The multi-layered structure comprises at least two first layers each of a single-ion conductive material and at least two second layers each of a polymeric material. For example, multi-layered structure 124 includes polymer layers 140 and 142, and single-ion conductive layers 150 and 152. As shown in FIG. 3, the two layers of polymeric material and two layers of single-ion conductive material are arranged in alternating order with respect to each other. Anode 111 may optionally comprise a separation layer (e.g., a plasma treated layer) between the base electrode material layer and the polymeric layer (not shown in FIG. 3; illustrated in FIG. 2).

Anode 111 can also include additional multi-layered structures such as multi-layered structure 126, comprising polymer layers 144 and 146, and single-ion conductive layers 154 and 156. Multi-layered structures 124 and 126 can be combined to form a single multi-layered, or can be constructed together as one, unitary multi-layered structure, including four layers each of a single-ion conductive material and for layers each of a polymeric material. In other embodiments, structures can include other numbers of alternating single-ion conductive layers and polymer layers. For instance, a multi-layered structure may include n first layers each of a single-ion conductive material and n second layers each of a polymeric material, in alternating arrangement, where n is greater than or equal to 2. E.g., n may equal at least 2, 3, 4, 5, 6, or 7, 10, 15, 20, 40, 60, 100, etc.

In other embodiments, a multi-layered structure may include a greater number of polymer layers than single-ion conductive layers, or a greater number of single-ion conductive layers than polymer layers. For example, a multi-layered structure may include a n polymer layers and n+1 single-ion conductive layers, or n single-ion conductive layers and n+1 polymer layers, where n is greater than or equal to 2. E.g., n may equal 2, 3, 4, 5, 6, or 7, etc. However, as described above, it is immediately adjacent at least one polymer layer and, in at least 50%, 70%, 90%, or 95% of the ion-conductive layers, such layers are immediately adjacent a polymer layer on either side.

As mentioned, multi-layered electrode stabilization structures can provide significant advantage where a particular amount of materials defining the structure are arranged in thinner, and greater numbers of, form. In some embodiments, each layer of the multi-layered structure has a maximum thickness of less than 100 microns, less than 50 microns, less than 25 microns, less than 10 microns, less than 1 micron, less than 100 nanometers, less than 10 nanometers, or less than 1 nanometer. Sometimes, the thickness of a single type of layer may be the same in a multi-layered structure. For instance, polymer layers 140 and 142 of FIG. 3 may have the same thickness in multi-layered structure 124. In other embodiments, the thickness of a single type of layer may be different in a multi-layered structure, e.g., polymer layers 140 and 142 may have different thicknesses in multi-layered structure 124. The thicknesses of different types of layers in a multi-layered structure may be the same in some cases, or different in other cases. For example, the thicknesses of polymer layers 140 and 142 may be different than the thickness of single-ion conductive layers 150 and 152. Those of ordinary skill in the art can select appropriate materials and thicknesses of layers in combination with the description herein.

A multi-layered structure may have various overall thicknesses that can depend on, for example, the electrolyte, the cathode, or the particular use of the electrochemical cell. In some cases, a multi-layered structure can have an overall thickness of less than or equal to 1 cm, less than or equal to 5 mm, less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, or less than or equal to 50 microns. It may also be desirable to have a multi-layered structure having a certain thickness with a certain number of polymer/single-ion conductive material pairs. For instance, in one embodiment, a multi-layered structure may have a thickness of less than 1 mm, and may include greater than 10 polymer/single-ion conductive material pairs. In another embodiment, a multi-layered structure may have a thickness of less than 0.5 mm, and may include greater than 50 polymer/single-ion conductive material pairs. It is to be understood that a variety of embodiments may be provided, each including specific combinations of overall electrode stabilization thickness, thicknesses of individual layers, numbers of individual layers, etc. as described herein.

Figure 4:
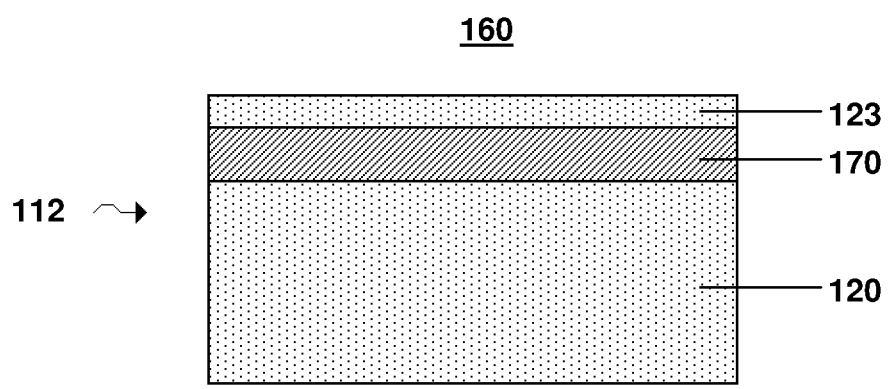
FIG. 4 is a schematic diagram of an anode including multiple base electrode material layers and an embedded layer, according to one set of embodiments.

Another embodiment described herein includes an embedded layer (e.g., of a protective layer such as a single-ion conductive material layer) positioned between two layers of base electrode materials. This is referred to as a "lamanode" structure. FIG. 4 shows an exemplary anode 112 including a first layer of a base electrode material layer 120 (e.g., lithium, also referred to as a Li reservoir), embedded layer 170, and a second layer 123 comprising the base electrode material (a working Li layer). As illustrated in the embodiment shown in FIG. 4, the second layer is positioned between base electrode material layer 120 and electrolyte 160. The second layer may be either in direct contact with the electrolyte, or in indirect contact with the electrolyte through some form of a surface layer (e.g., an electrode stabilization or multi-layered structure such as one described herein). The function of the bi-layer anode structure, with each base electrode material layer separated by an embedded layer 170, will become clearer from the description below. It is noted that although layer 170 is illustrated and described as "embedded" in this description, it is noted that the layer need not be partially or fully embedded. In many or most cases, layer 170 is a substantially thin, two-sided structure coated on each side by base electrode material, but not covered by base electrode material at its edges.

In general, in operation of the arrangement shown in FIG. 4, some or all of second layer 123 of the anode is "lost" from the anode upon discharge (when it is converted to lithium ion which moves into the electrolyte). Upon charge, when lithium ion is plated as lithium metal onto the anode, it is plated as portion 123 (or at least some portion of second layer 123) above layer 170. Those of ordinary skill in the art are aware that in electrochemical cells such as those described herein, there is a small amount of overall lithium loss on each charge/discharge cycle of the cell. In the arrangement illustrated in FIG. 4, the thickness of layer 123 (or the mass of layer 123) can be selected such that most or all of layer 123 is lost upon full discharge of the cell (full "satisfaction" of the cathode; the point at which the cathode can no longer participate in a charging process due to limitations that would be understood by those of ordinary skill in the art).

In certain embodiments, layer 170 is selected to be one that is conductive to lithium ions. The embedded layer can shield the bottom Li layer from damage as the high $Li^+$ flux of the first cycle damages the top Li layer surface. Accordingly, once all of layer 123 is consumed in a particular discharge cycle, further discharge results in oxidation of lithium from layer 120, passage of lithium ion through layer 170, and release of lithium ion into the electrolyte. Of course, layer 123 need not be of a particular mass such that all or nearly all of it is consumed on first discharge. It may take several discharge/charge cycles, and inherent small amount of lithium loss through each cycle, to result in the need to draw lithium from section 120 through layer 170 and into the electrolyte. But once that occurs, then each subsequent charge/discharge cycle will generally progress as follows.

In certain embodiments, through most of a discharge cycle lithium will be removed from section 123 and, at the very end of the discharge cycle, a small amount of lithium may be required to be drawn from section 120 through layer 170 to make up for the amount of lithium lost in the most recent charge/discharge cycle. Upon charge, lithium may be plated upon layer 170 as material 123 in an amount very slightly less than that removed from the anode during discharge. The embedded layer, which may be an electrode stabilization layer, can be made of any suitable material selected, by those of ordinary skill in the art, in accordance with the function described herein. Generally, layer 170 will be made of a material that is single-ion conductive but that will not allow lithium metal itself to pass. In some embodiments the material is non-electrically-conductive, for reasons described below.

The ratio of the thickness of first and second layers of base electrode materials can be calculated based on, e.g., a required "depth of discharge" (amount of lithium metal consumed) of the first discharge. The ratio may be, for instance, between the range of 0.2 to 0.4. The thickness of anode 20 may be, for instance, less than 100 microns, less than 50 microns, less than 25 microns, or less than 10 microns. In some embodiments, anode 20 can have a thickness between 10 and 30 microns.

In some embodiments, embedded layer 170 may have a thickness between 0.01-1 microns, and may depend on, e.g., the type of material used to form the embedded layer and/or the method of depositing the material. For example, the thickness of the embedded layer may be between 0.01-0.1 microns, between 0.1-0.5 microns, or between 0.5-1 micron. In other embodiments, thicker embedded layers are included. For example, the embedded layer can have a thickness between 1-10 microns, between 10-50 microns, or between 50-100 microns. In some cases, the embedded material can be formed of a polymer, e.g., including ones listed above that are lithium ion conductive. The polymer film can be deposited using techniques such as vacuum based PML, VMT or PECVD techniques. In other cases, an embedded layer can comprise a metal or semi-conductor material. Metals and semi-conductors can be, for example, sputtered. Those of ordinary skill in the are can choose suitable materials, thicknesses, and methods of depositing embedded layers based on routine experimentation in combination with disclosure herein.

In one embodiment, layer 170 is an anode stabilization structure of multi-layer form as described herein.

The second layer 123 of base electrode material layer can be used to protect the surface of base electrode material layer 120 (e.g., a Li surface) by limiting the current density-induced surface damage to a thin (e.g., Li) layer above the embedded layer 170. For instance, layer 123 can lithiate the cathode (be removed from the anode in the form of lithium ion) on the first cycle, e.g., under extremely high $Li^+$ flux, instead of causing base electrode material layer 120 to lithiate the cathode, thereby protecting base electrode material layer 120. In each charge/discharge cycle (after the point is reached at which more lithium than is present in layer 123 is removed from the anode during discharge) only a small amount of lithium may be removed from section 120 and, in some embodiments, no lithium is re-plated at layer 120. This can eliminate or reducing the numbers of defects, cracks, pinholes and/or dendrites forming on the surface of base electrode material layer 120 during the cathode lithiation. Anode 112 can improve the cycle life of the cell compared to a cell including an anode without a second layer of Li and/or an embedded layer, as described in further detail below.

As mentioned, layer 170 should be able to pass lithium ions. It can be made of material including ceramic, glass, or polymer layer (or a multi-layered structure, as described below) that is conductive to Li ions and, in some embodiments, it substantially impedes the passage of electrons across the layer. By "substantially impedes", in this context, it is meant that in this embodiment the material allows lithium ion flux at least ten times greater than electron passage. As noted, in other embodiments the material can be electron conductive.

Referring again to FIG. 4, anode 112 can function with any of a variety of current collectors (not shown). Current collectors are well known to those of ordinary skill in the art and can be readily selected from suitable materials based upon this disclosure. In one arrangement, a current collector addresses the bottom surface of layer 120 (the side opposite electrolyte 160). In another arrangement, an edge collector is used, which can be positioned on one or multiple edges, i.e., a side (not shown) including layer 120, material 170, and layer 123. In other arrangements, both a bottom collector and one or more edge collectors can be used. Where only a bottom collector is used, material 170 should be electronically conductive as well as lithium ion conductive. Where an edge collector is used material 170 can be selected to substantially inhibit electron passage.

Figure 5:
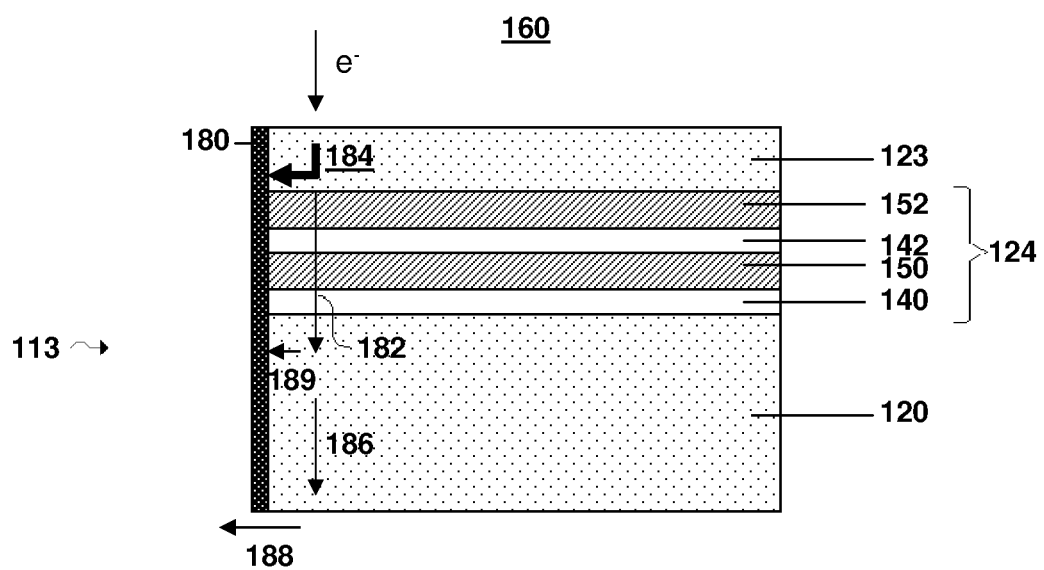
FIG. 5 is a schematic diagram of an anode including multiple base electrode material layers and an embedded multi-layered structure, according to one set of embodiments.

In one particular set of embodiments, an edge collector is used and provides advantages in anode stabilization/protection. One such arrangement is illustrated in FIG. 5, where an embedded stabilization structure 124 (itself analogous to section 170 of FIG. 4), separates anode 113 into one portion of a base electrode material layer 120 (e.g., a Li reservoir), from a second portion of base electrode material layer 123 (e.g., a working Li layer). The embedded layer, e.g., multi-layered structure 124, the Li reservoir, and layer 123 may, in some embodiments, all be electrically connected at the edge current collector 180. In the arrangement illustrated in FIG. 5, a bottom current collector is not used, although a bottom current collector may be used in other embodiments.

During operation of an electrochemical cell as illustrated in FIG. 5, or another cell including an embedded layer between two base electrode material layers and with an edge collector, during discharge, current enters the anode through the working Li/electrolyte interface. However, the embedded layer can substantially block electron current while allowing passage of Li ions. For instance, the flow of electron current, as illustrated by the arrows in FIG. 5, may be substantially impeded through the electrode stabilization layer, to layer 120 of the anode, and to one or more current collectors. Thus, a substantial amount or substantially all of the current can pass through the working Li layer 123 to the edge collector 180, e.g., in the direction of arrow 184, while a much smaller portion (or essentially no electron flow) passes through stabilization material 124 to the Li reservoir 120 to the edge collector, e.g., in the direction of arrows 182 and 189, or to a bottom current collector (not shown) in the direction of arrows 186 and 188. As noted, in some embodiments, the working Li layer, prior to first discharge of the cell, comprises more active electrode species than is depleted upon full discharge of the cell, e.g., as to satisfy the cathode upon cathode lithiation. E.g., the working Li layer may include an amount of Li, prior to first discharge of the cell, such that greater than 50%, greater than 70%, greater than 90%, or greater than 95% of the Li of the working layer 123 is electrochemically dissolved upon the first discharge.

On charging, lithium ion is plated, as lithium metal, at base electrode material layer 123, as described above in connection with FIG. 4. Since the electrolyte/working Li layer 123/edge collector 180 is the lowest resistance path for electron current, most current takes this path once Li ion reaches the working Li layer and is reduced. Current density induced damage/corrosion is significantly minimized since any such processes occur only or primarily at the electrolyte/working Li 123 interface, while base electrode material layer 120 remains undamaged. As noted above in connection with FIG. 4, as the working Li layer gradually loses a small percentage of Li during each cycle, this Li is replaced by a flow of Li ions across the embedded layer 124 and into the electrolyte. This results in more even loss/re-plating of lithium during discharge/charge cycles, therefore minimizing damage/corrosion of the anode and, importantly, the damage/corrosion can be inhibited or made to be essentially zero in Li reservoir 120. As a result, the Li reservoir does not degenerate into isolated Li islands surrounded by corrosion byproducts, as can be the case with use of a single layer Li anode.

A variety of arrangements can be employed to encourage even plating of lithium at layer 123 during charge. For example, although in the embodiment illustrated in FIG. 5 it can be advantageous to form multi-layer structure 124 to be substantially non-electrically conductive overall, one or more layers of the structure can be made to be electrically conductive to define a current collector component. For example, in multi-layer structure 124 one or more of the layers, for example layer 152 closest to base electrode material layer 123 and electrolyte 160, can be made somewhat or significantly electrically conductive. In this way, during charge, even deposition of the first very thin layer of lithium on the anode can be made to occur essentially evenly across structure 124. Once a portion of lithium has been deposited, then the electronic conductivity of lithium itself also facilitates further even deposition of material 123.

Additional arrangements, components, and advantages of multi-layer structures are described in more detail in U.S. patent application Ser. No. 11/400,781, filed Apr. 6, 2006, published as U.S. Pub. No. 2007/0221265, entitled "Rechargeable Lithium/Water, Lithium/Air Batteries", which is incorporated herein by reference in its entirety.

A variety of materials and arrangements can be used in individual assemblies described and illustrated herein, or in all of the assemblies. It is to be understood that where a particular component or arrangement is described in connection with one embodiment or figure, that component or arrangement can be used in connection with any others. One example of such a structure is a separation layer, e.g., a temporary protective material layer or a plasma $CO_2$ treatment layer, positioned between the an anode layer and a polymer layer or a multi-layered structure. For example, in the embodiment shown in FIG. 2, layer 130 is a separation layer. It is to be understood that where a separation layer 130 is used, the first layer adjacent the separation layer opposite the base electrode material layer is described herein at times to be adjacent the base electrode material layer. This is because the separation layer is optional. In all instances in which a layer is described as being adjacent, or immediately adjacent an electrode (for example the polymer layer 140 of FIG. 2), an intervening separation layer can be used but need not be used. Separation layers may improve the compatibility of the base electrode material (e.g., lithium) with layers deposited on top of the base electrode material layer. For example, when a single-ion conductive layer is desired at the lithium interface, it is preferable to deposit this directly on the lithium surface. However, the precursors to, or components of, such an interfacial layer may react with lithium to produce undesirable by-products or result in undesirable changes in the morphology of the layers. By depositing a separation layer on the lithium surface prior to depositing the interfacial layer such as a multi-layer structure 124 (FIG. 3), side reactions at the lithium surface may be eliminated or significantly reduced. For example, when an interfacial film of a lithium phosphorus oxynitride, as described in U.S. Pat. No. 5,314,765 to Bates, is deposited in a nitrogen atmosphere by sputtering of $Li_3PO_4$ onto a lithium surface, the nitrogen gas may react with lithium to form lithium nitride ($LiN_3$) at the anode surface. By depositing a layer of a protective material that can be "temporary", e.g., copper over the lithium surface, the interfacial layer may be formed without the formation of lithium nitride. A "temporary" protective layer is one that ceases to be in existence or identifiable after some time after construction of the device, for example after some period of use of the device. For example, a thin layer of copper as a separation layer 130 positioned over a lithium base electrode material layer 120 may diffuse into an alloy with the lithium base electrode material until, after a particular period of time and/or use of the device, base electrode material layer 120 will be primarily lithium, with a trace of copper, but layer 130 will no longer exist or be identifiable.

A temporary protective material layer may include a material that is capable of forming an alloy with lithium metal, or is capable of diffusing into, dissolving into, and/or blending with lithium metal, e.g., during electrochemical cycling of the cell and/or prior to electrochemical cycling of the cell. The temporary protective material layer can act as a barrier layer to protect the lithium surface during deposition of other layers, such as during the deposition of a multi-layered structure on top of the base electrode material layer. Further, the temporary protective layer may allow transportation of the lithium films from one processing station to the next without undesirable reactions occurring at the lithium surface during assembly of cells, or for solvent coating of layers onto the base electrode material layer.

The thickness of the temporary protective material layer is selected to provide the necessary protection to the layer comprising lithium, for example, during subsequent treatments to deposit other anode or cell layers. In some embodiments, it is desirable to keep the layer thickness as thin as possible while providing the desired degree of protection so as to not add excess amounts of non-active materials to the cell which would increase the weight of the cell and reduce its energy density. In one embodiment, the thickness of the temporary protective layer is between 5 to 500 nanometers, e.g., between 20 to 200 nanometers, between 50 to 200 nanometers, or between 100 to 150 nanometers.

Suitable materials that may be used as temporary protective material layers include metals such as copper, magnesium, aluminum, silver, gold, lead, cadmium, bismuth, indium, gallium, germanium, zinc, tin, and platinum.

In some cases, separation layer 130 can include plasma treated layers such as $CO_2$ or $SO_2$ induced layers. Plasma treated layers can allow nearly the entire surface area of the base electrode material layer to participate in the current carrying process. In other words, plasma treated layers may allow uniform current density across a surface and decreases the amount of pitting on a surface. In some cases, these treatments alone routinely increase cycle life by 15% to 35% because more of the Li is available for use during discharge. The plasma surface treatments can make more of the Li available to be cycled by creating a surface that is substantially homogeneous in topography.

In some embodiments, electrodes described herein include an outer layer, e.g., a layer that is in contact with the electrolyte of the cell. This outer layer can be a layer such as stabilization layers 122, 124, 126, etc. as shown in the figures, or can be an auxiliary outer layer specifically selected to interface directly with the electrolyte. Outer layers may be selected for properties such as Li-ion conduction, electron conduction, protection of underlying layers which may be unstable to components present in the electrolyte, nonporous to prevent penetration by electrolyte solvents, compatible with electrolyte and the underlying layers, and flexible enough to accommodate for volume changes in the layers observed during discharge and charge. The outer layer should further be stable and preferably insoluble in the electrolyte.

Examples of suitable outer layers include, but are not limited to, organic or inorganic solid polymer electrolytes, electrically and ionically conducting polymers, and metals with certain lithium solubility properties. In one embodiment, the polymer of the outer layer is selected from the group consisting of electrically conductive polymers, ionically conductive polymers, sulfonated polymers, and hydrocarbon polymers. Further examples of suitable polymers for use in the outer layer of the electrodes described herein are those described in U.S. Pat. No. 6,183,901 to Ying et al.

The electrodes and cells described herein may further comprise a substrate, as is known in the art, on or adjacent the surface of a base electrode material layer opposite that of a multi-layer structure (if present). Substrates are useful as a support on which to deposit the base electrode material, and may provide additional stability for handling of thin (e.g., lithium) film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of electrodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, the substrate may be selected from non-electrically-conductive materials.

Certain existing methods of fabricating electrodes involve depositing electrode components onto a substrate that is eventually incorporated into an electrochemical cell. The substrate is typically of sufficient thickness and/or formed of a suitable material in order to be compatible with the electrode fabrication process. For example, fabrication of an electrode comprising lithium metal as an electroactive material may involve vacuum deposition of lithium metal at relatively high temperatures and high rates that would cause certain substrates to buckle unless the substrate is made of a certain material or has a sufficient thickness. Some substrates that are suitable for such fabrication steps may, however, end up reducing the performance of the cell if the substrate is incorporated into the cell. For instance, thick substrates may prevent buckling and therefore allow the deposition of a thick layer of an electroactive material, but may reduce the specific energy density of the cell. Furthermore, certain substrates that are incorporated into the electrochemical cell may react adversely with chemical species during cycling. To remedy these issues, certain embodiments described herein may involve methods of fabricating an electrode using a release layer to separate portions of the electrode from a carrier substrate, which can then be removed from the electrode during or after assembly of the electrode into an electrochemical cell. Advantageously, such a method can allow a larger variety of substrates and/or more extreme processing conditions to be used when fabricating electrodes compared to that when the substrate is incorporated into an electrochemical cell. The removal of a substrate from an electrochemical cell can also reduce the number adverse reactions that may occur in the cell during cycling. In some embodiments described herein, an electrode or an electrochemical cell includes one or more release layers. Release layers described herein are constructed and arranged to have one or more of the following features: relatively good adhesion to a first layer (e.g., a current collector, or in other embodiments, a carrier substrate or other layer) but relatively moderate or poor adhesion to a second layer (e.g., a carrier substrate, or in other embodiments, a current collector or other layer); high mechanical stability to facilitate delamination without mechanical disintegration; high thermal stability; ability to withstand the application of a force or pressure applied to the electrochemical cell or a component of the cell during fabrication and/or during cycling of the cell; and compatibility with processing conditions (e.g., deposition of layers on top of the release layer, as well as compatibility with techniques used to form the release layer). Release layers may be thin (e.g., less than about 10 microns) to reduce overall battery weight if the release layer is incorporated into the electrochemical cell. A release layer should also be smooth and uniform in thickness so as to facilitate the formation of uniform layers on top of the release layer. Furthermore, release layers should be stable in the electrolyte and should not interfere with the structural integrity of the electrodes in order for the electrochemical cell to have a high electrochemical "capacity" or energy storage capability (i.e., reduced capacity fade). In some cases, release layers from two electrode portions can be adhered together, optionally using an adhesion promoter as described in more detail below.

Figure 6A:
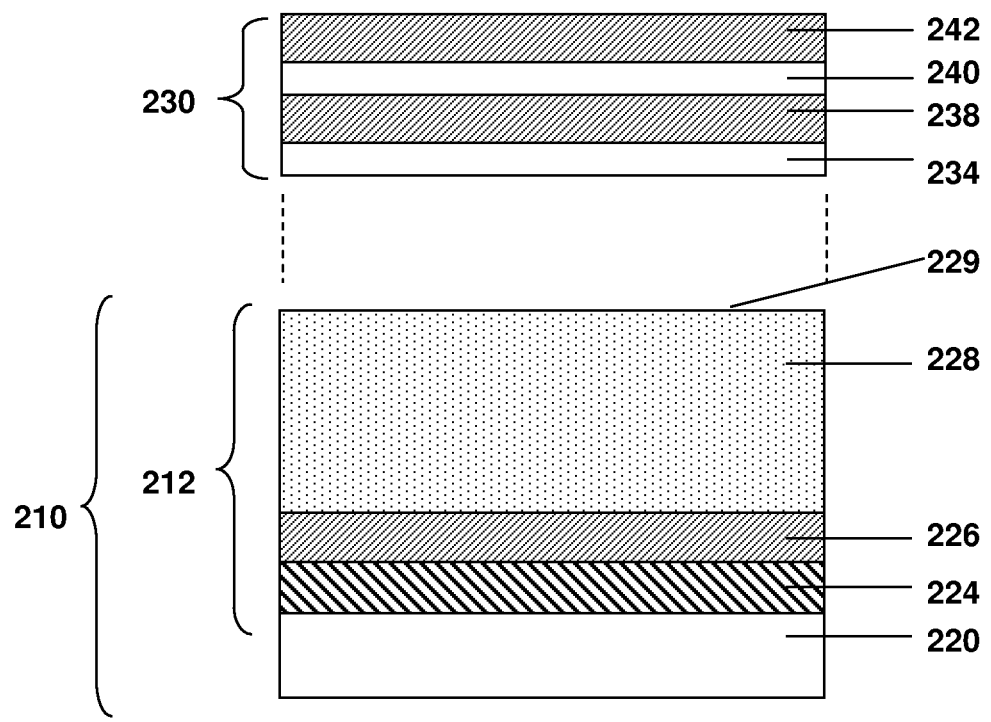
FIGS. 6A and 6B are schematic diagrams showing electrode assemblies including a release layer, according to one set of embodiments.

FIG. 6A shows an exemplary electrode assembly that includes a release layer. As shown in the illustrative embodiment of FIG. 6A, electrode assembly 210 includes several layers that are stacked together to form an electrode 212 (e.g., an anode or a cathode). Electrode 212 can be formed by positioning the layers on a carrier substrate 220. For example, electrode 212 may be formed by first positioning one or more release layers 224 on a surface of carrier substrate 220. As described in more detail below, the release layer serves to subsequently release the electrode from the carrier substrate so that the carrier substrate is not incorporated into the final electrochemical cell. To form the electrode, an electrode component such as a current collector 226 can be positioned adjacent the release layer on the side opposite the carrier substrate. Subsequently, an electroactive material layer 228 may be positioned adjacent current collector 26. Optionally, additional layers can be positioned adjacent base electrode material layer 228 (e.g., comprising an electroactive material such as lithium) as described herein. For example, a multi-layered structure 230 that protects the base electrode material from an electrolyte, may be positioned on a surface 229 of layer 228. The multi-layer structure can include, for example, polymer layers 234 and 240, and single-ion conductive layers 238 and 242.

After electrode assembly 210 has been formed, the carrier substrate 220 may be released from the electrode through the use of release layer 224. Release layer 224 can be either released along with the carrier substrate so that the release layer is not a part of the final electrode structure, or the release layer may remain a part of the final electrode structure as shown illustratively in FIG. 6B. The electrode structure shown in FIG. 6B, or other configurations derived therefrom, may be incorporated into an electrochemical cell described herein, e.g., as anode 15 of FIG. 1.

Figure 6B:
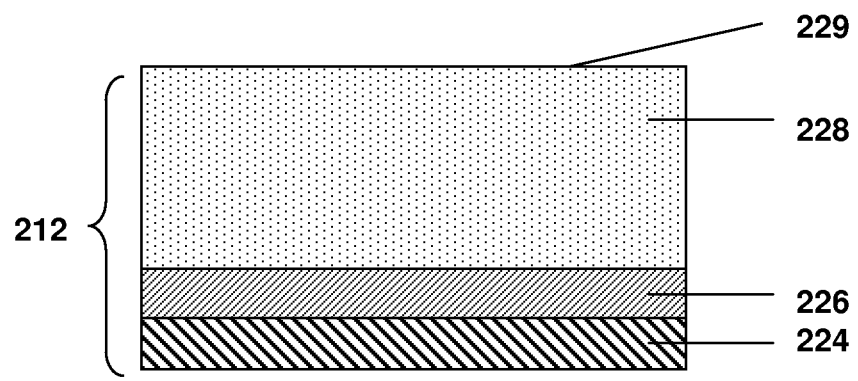

The positioning of the release layer during release of the carrier substrate can be varied by tailoring the chemical and/or physical properties of the release layer. For example, if it is desirable for the release layer to be part of the final electrode structure, as shown in FIG. 6B, the release layer may be tailored to have a greater adhesive affinity to current collector 226 relative to its adhesive affinity to carrier substrate 220. On the other hand, if it is desirable for the release layer to not be part of an electrode structure, the release layer may be designed to have a greater adhesive affinity to carrier substrate 220 relative to its adhesive affinity to current collector 226. In the latter case, when a peeling force is applied to carrier substrate 220 (and/or to the electrode), the release layer is released from current collector 226 and remains on substrate 220.

In certain embodiments, carrier substrate 220 is left intact with electrode 212 as a part of electrode assembly 210 after fabrication of the electrode, but before the electrode is incorporated into an electrochemical cell. For instance, electrode assembly 210 may be packaged and shipped to a manufacturer who may then incorporate electrode 212 into an electrochemical cell. In such embodiments, electrode assembly 210 may be inserted into an air and/or moisture-tight package to prevent or inhibit deterioration and/or contamination of one or more components of the electrode assembly. Allowing carrier substrate 220 to remain attached to electrode 212 can facilitate handling and transportation of the electrode. For instance, carrier substrate 220 may be relatively thick and have a relatively high rigidity or stiffness, which can prevent or inhibit electrode 212 from distorting during handling. In such embodiments, carrier substrate can be removed by the manufacturer before, during, or after assembly of an electrochemical cell.

Although FIG. 6A shows release layer 224 positioned between carrier substrate 220 and current collector 226, in other embodiments the release layer may be positioned between other components of an electrode. For example, the release layer may be positioned adjacent surface 229 of base electrode material layer 228, and the carrier substrate may be positioned on the opposite side of the base electrode material layer (not shown). In some such embodiments, an electrode may be fabricated by first positioning one or more release layers onto a carrier substrate. Then, if any protective layer(s) such as multi-layered structure 230 is to be included, the protective layer(s) can be positioned on the one or more release layers. For example, each layer of a multi-layered structure may be positioned separately onto a release layer, or the multi-layered structure may be pre-fabricated and positioned on a release layer at once. The base electrode material layer may then be positioned on the multi-layered structure. (Of course, if a protective layer such as a multi-layered structure is not included in the electrode, the base electrode material layer can be positioned directly on the release layer.) Afterwards, any other suitable layers such as a current collector may be positioned on the base electrode material layer. To form the electrode, the carrier substrate can be removed from the protective layer(s) (or the base electrode material layer where protective layers are not used) via the release layer. The release layer may remain with the electrode or may be released along with the carrier substrate.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "immediately adjacent", "in contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

It should be understood, therefore, that in the embodiments illustrated in FIGS. 6A and 6B and in other embodiments described herein, one or more additional layers may be positioned between the layers shown in the figures. For example, one or more additional layers may be positioned between current collector 226 and release layer 224, and/or one or more additional layers may be positioned between release layer 224 and carrier substrate 220. Furthermore, one or more layers may be positioned between other components of the cell. For example, one or more primer layers can be positioned between a current collector and a base electrode material layer (e.g., a positive or negative electroactive material) to facilitate adhesion between the layers. Examples of suitable primer layers are described herein and in International Patent Application Serial No. PCT/US2008/012042, published as International Publication No. WO 2009/054987, filed Oct. 23, 2008, and entitled "Primer For Battery Electrode", which is incorporated herein by reference in its entirety. Furthermore, one or more layers such as plasma treatment layers may be deposited on surface 229 of base electrode material layer 228, optionally between the electroactive material layer and multi-layer structure 230.

Although FIGS. 6A and 6B show a single release layer 224 as part of electrode assembly 210, any suitable number of release layers may be used. For example, a release system may include 2, 3, 4 or more layers. The number of layers used in a release system may depend at least in part on whether the release layer(s) is to be incorporated into the final electrochemical cell, or whether the release layer(s) is removed along with the carrier substrate. For example, in some embodiments in which the release layer(s) is to be incorporated into the electrochemical cell, a fewer number of release layer(s) may be desirable (e.g., less than 3, or less than 2 release layers). This is because a fewer number of release layers can reduce the complexity of the fabrication process as well as reduce the weight of the overall electrochemical cell, thereby increasing the specific energy density of the cell.

In other embodiments, however, more than one release layer is used to fabricate a component of an electrochemical cell. For instance, a first release layer may be positioned adjacent a carrier substrate and may have, for example, a relatively high adhesive affinity to the carrier substrate. The first release layer may be chosen because it is compatible with certain processing conditions, but it may have a relatively high adhesive affinity to a second surface (e.g., current collector 226 of FIG. 6A). In such embodiments, the release layer would not allow release of the carrier substrate. Thus, a second release layer may be positioned between the first release layer and the second surface to allow adequate release of the carrier substrate. In one embodiment, the second release layer has a relatively high adhesive affinity to the first release layer, but a relatively low adhesive affinity to the second surface. As such, the application of a force could allow removal of the carrier substrate and both release layers from the second surface. In another embodiment, the second release layer has a relatively low adhesive affinity to the first release layer and relatively high adhesive affinity to the second surface. In such embodiments, the application of a force could allow removal of the carrier substrate and the first release layer, which the second release layer and the second surface remain intact. Other configurations of release layers are also possible.

As shown in FIG. 6B, release layer 224 can be a part of the final electrode and/or electrochemical cell once fabricated. In some embodiments, release layer 224 provides essentially no electrochemical, structural and/or activational feature to the electrochemical cell after being incorporated into the cell. For example, in some embodiments, release layer 224 does not substantially act as a separator, an electroactive material, or a protective layer for an electroactive material, does not substantially contribute to the mechanical stability of the electrochemical cell, and/or does not substantially facilitate the conduction of ions and/or electrons across the release layer. That is, the release layer may be substantially non-ionically conductive and/or non-electrically conductive. In some cases, a release layer, once incorporated into an electrochemical cell, does not act as an activational feature such as maintaining two components of the cell out of contact until the cell is ready for use. As such, the release layer may have essentially no function other than to have release characteristics allowing a first layer or component to be separated from a second layer or component during fabrication of the electrochemical cell. As described herein, such a release layer having essentially no other function other than to act as a release layer may nevertheless be incorporated into the cell because the advantages of facilitating the fabrication process outweighs the potential negative effects of incorporating the release layer into the cell (e.g., by reducing specific energy density of the cell).

In other embodiments, a release layer does have one or more functions once incorporated into an electrochemical cell. For example, the release layer may act as a separator, an electroactive material, or a protective layer for an electroactive material, may contribute to the mechanical stability of the electrochemical cell, and/or may facilitate the conduction of ions and/or electrons across the release layer.

In some particular embodiments, a release layer has an adhesive function of allowing two components of an electrochemical cell to adhere to one another. One such example is shown in the embodiments illustrated in FIGS. 7A and 7B. As shown illustratively in FIG. 7A, a first electrode portion 212A may include one or more release layers 224A, a current collector 226A, and an base electrode material layer 228A. Such an electrode portion may be formed after being released from a carrier substrate, e.g., using the method described above in connection with FIGS. 6A and 6B. Similarly, a second electrode portion 212B may include a release layer 224B, a current collector 226B, and an electroactive material layer 228B. Additional layers (e.g., protective multi-layered structures) can also be deposited onto surfaces 229A and/or 229B of electrode portions 212A and 212B respectively, as described above.

Figure 7A:
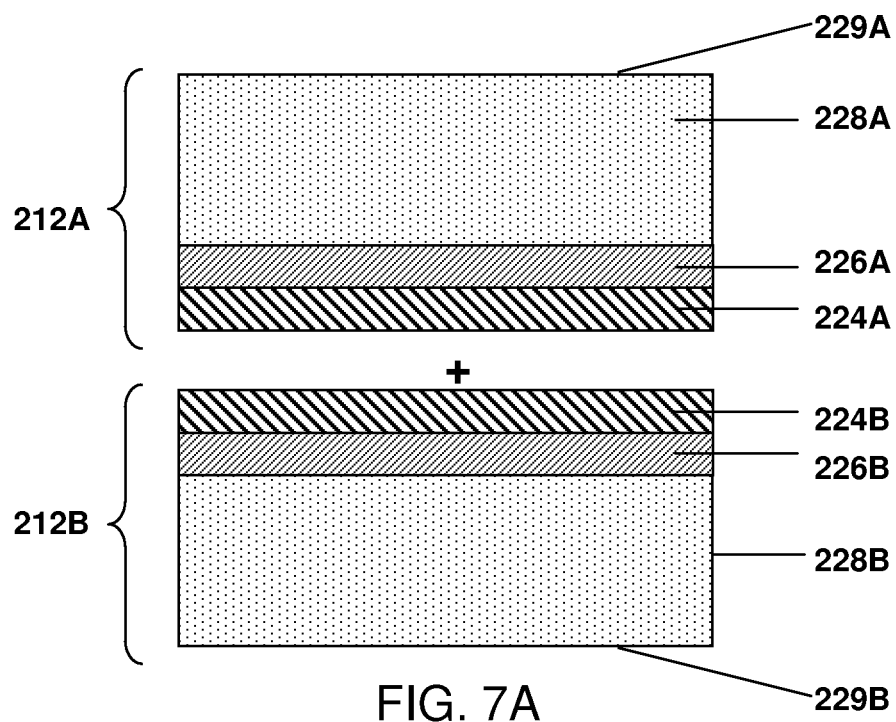
FIGS. 7A and 7B are schematic diagrams showing the joining of two electrodes to form an electrode assembly according to one set of embodiments.
Figure 7B:
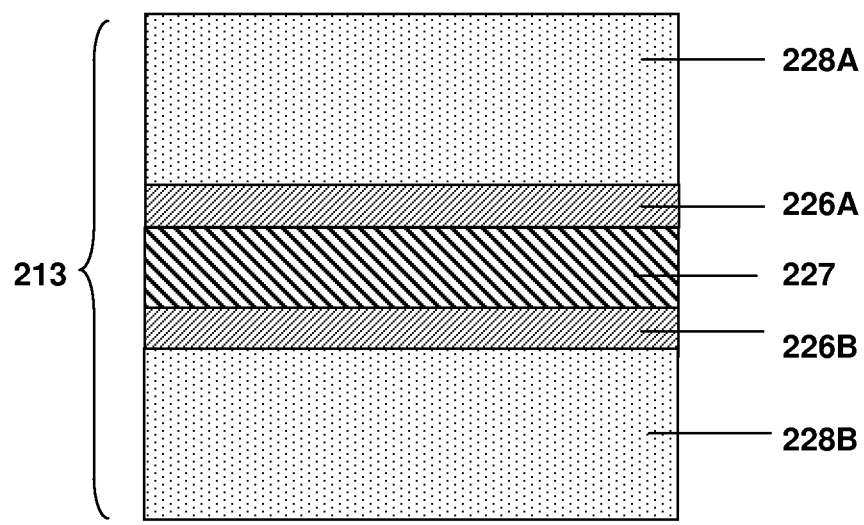

As shown in the embodiment illustrated in FIG. 7B, a back-to-back electrode assembly 213 may be formed by joining electrode portions 212A and 212B, e.g., via release layers 224A and 224B. The electrode portions may be separate, independent units or part of the same unit (e.g., folded over). As illustrated in FIG. 7B, release layers 224A and 224B are facing one another. In other embodiments, however, the electrode portions can be stacked upon one another in series such that release layers 224A and 224B do not face one another in the final configuration.

Any suitable method may be used to join two components of an electrochemical cell via one or more release layers. In some embodiments, release layers 224A and 224B are formed of one or more materials that naturally have a relatively high adhesive affinity to each other, e.g., either inherently or after being activated. In some embodiments, an adhesion promoter may be used to facilitate adhesion of two components. For example, the materials used to form the release layers may be joined by applying an external stimulus such as heat and/or light to activate a surface of a release layer to make it more adhesive. In other embodiments, an adhesion promoter in the form of a chemical such as a crosslinker can be applied to a surface of a release layer to facilitate joining with another layer. Adhesion promoters in the form of solvents and/or adhesives can also be used, as described in more detail below. In yet other embodiments, a release layer may inherently have a high adhesive affinity to a material in which it is to be joined and no adhesion promoter is needed. Pressure may optionally be applied during the joining of two components.

In some embodiments, two components of an electrochemical cell such as electrode portions 212A and 212B of FIG. 7A are joined with one another via a lamination process. A lamination process may involve, for example, applying an adhesion promoter such as a solvent (optionally containing other materials) to a surface of release layers 24A and/or 24B and solvating at least a portion of the release layer(s) to make the release layers more susceptible to adhesion. The release layers can then be brought together to join the release layers. After joining (or, in some embodiments, prior to joining), the solvent can be optionally removed, e.g., by a drying process. In some such embodiments, e.g., when release layers 224A and 224B are formed of the same material, the joining of the release layers can result in a single layer 227, as shown in the embodiment illustrated in FIG. 7B. For instance, where release layers 224A and 224B are formed of a polymeric material, the joining of the release layers (e.g., after solvation) can cause polymer chains at the surface of one release layer to intertwine with polymer chains at the second release layer. In some cases, intertwining of the polymer chains can occur without the application of additional chemicals and/or conditions (e.g., without the use of an adhesion promoter). In other embodiments, intertwining of polymer chain can be facilitated by subjecting the polymer to certain conditions such as cross linking or melting, as described in more detail below.

When first and second release layers are joined together (optionally using an adhesion promoter), the adhesive strength between the two release layers may be greater than the adhesive strength between the first release layer and a layer opposite the second release layer (e.g., between the first release layer and the current collector). In other embodiments, the adhesive strength between the two release layers may be less than the adhesive strength between the first release layer and a layer opposite the second release layer (e.g., between the first release layer and the current collector). Adhesive strengths can be determined by those of ordinary skill in the art in combination with the description provided herein.

As described herein, in some embodiments, lamination may involve applying an adhesion promoter (e.g., in the form of an adhesive or a solvent combination) to a surface of a release layer prior to joining of the two electrodes. For instance, an adhesive (e.g., a polymer or any other suitable material) may be added to a solvent or solvent combination to form an adhesion promoter formulation, which is then applied uniformly to a surface of release layer 224A (and/or 224B). When applying an adhesion promoter to the release layer(s), the adhesion promoter may be applied to only one of the release layers, or to both release layers. The two surfaces to be adhered can then be joined, optionally followed by the application of heat, pressure, light, or other suitable condition to facilitate adhesion.

As described in more detail below, an adhesion promoter may form a discrete layer at the interface between the two release layers to be joined (or between any two components to be joined). The layer of adhesion promoter may, in some cases, be very thin (e.g., between 0.001 and 3 microns thick), as described in more detail below. Advantageously, using a thin layer of adhesion promoter can increase the specific energy density of the cell compared to using a thicker layer of adhesion promoter.

In other embodiments, an adhesion promoter does not form a discrete layer at the interface between the two release layers. In some such embodiments, the adhesion promoter is a solvent or solvent combination that wets the surface(s) of the release layer(s), and does not include a polymer and/or any other non-solvent material. The solvent in the adhesion promoter may solvate, dissolve, and/or activate portions of the release layer surface to promote adhesion of the release layer with another release layer.

In other embodiments in which an adhesion promoter does not form a discrete layer at the interface between the two release layers, the adhesion promoter formulation may include a solvent or solvent combination that wets the surface(s) of the release layer(s) along with a polymer in relatively small amounts (e.g., less than 5%, less than 4%, less than 3%, less than 2%, or less than 1% by weight of the adhesion promoter formulation).

In some cases in which the adhesion promoter includes a polymer (or any other non-solvent material) in its formulation, the type, amount, and molecular weight of the polymer (or other non-solvent material) may be chosen such that a discrete layer is not formed at the interface between two release layers. For instance, even though the adhesion promoter may be applied to the surface of the release layer in the form of a layer or a coating, after joining the release layers, the polymer or other non-solvent material in the adhesion promoter formulation may migrate into the pores or interstices of the release layer(s) or be miscible with the release layer(s) such that a discrete layer of adhesion promoter is not formed. In other embodiments, the polymer or non-solvent material of the adhesion promoter formulation may join with polymer chains of the release layer(s), and the joined polymer chains may rearrange within the release layer(s) such that a discrete layer of adhesion promoter is not formed. In some cases, such rearrangement and/or migration causes at least a portion of the adhesion promoter to be interspersed (e.g., uniformly or non-uniformly) in the first and/or second release layers. In certain embodiments, a substantial portion (e.g., substantially all) of the adhesion promoter is interspersed (e.g., uniformly or non-uniformly) in the first and/or second release layers. In some embodiments, such rearrangement and/or migration occurs upon assembly of the electrode or electrochemical cell. In other embodiments, such rearrangement and/or migration occurs during cycling of the electrochemical cell.

After assembly of the electrode and/or cell, all or portions of the adhesion promoter may be positioned between first and second electroactive materials (e.g., electroactive anode materials), between first and second current collectors, between first and second release layers, interspersed in first and/or second release layers, interspersed in a single release layer, or combinations thereof.

Further description of adhesion promoters are described in more detail below.

Although FIG. 7B shows a single layer 227 formed by the joining of two release layers 224A and 224B of FIG. 7A, it should be understood that other configurations are also possible. For instance, in some cases release layers 224A and 224B are formed of different materials so that the joining of the two release layers results in two different intermediate layers. In yet other embodiments, only one component of an electrochemical cell to be joined includes a release layer, but a second component to be joined does not include a release layer. For example, electrode portion 212A of FIG. 7A may include release layer 224A, but a second electrode portion to be joined with electrode portion 212A does not include a release layer. In some such embodiments, release layer 224A may also have sufficient adhesive characteristics that allow it to be joined directly to a component the second electrode. Such a release layer may be designed to not only have a high adhesive affinity to a surface of the first electrode portion (e.g., current collector 226A) and a relatively low adhesive affinity to a carrier substrate on which the first electrode portion was fabricated, but also a relatively high adhesive affinity to a surface of the second electrode portion. In other embodiments, an adhesion promoter that has a high adhesive affinity to both the release layer and the second electrode portion can be used.

In some embodiments, an electrode assembly including laminated back-to-back electrode portions (e.g., at least two electroactive layers separated by at least a current collector and optionally other components), includes a release layer having a relatively low overall thickness. The release layer in this configuration may be a single layer or a combined layer (e.g., two layers adhered together using an adhesion promoter) formed from the same or different materials as described herein (e.g., layer 27 of FIG. 2B). The total thickness of the release layer in this configuration may be, for example, between 1-10 microns thick, between 1-7 microns thick, between 1-6 microns thick, between 1-5 microns thick, or between 1-3 microns thick. In certain embodiments, the thickness of the release layer in this configuration is about 10 microns or less, about 6 microns or less, about 7 microns or less, about 5 microns or less, or about 3 microns or less.

In another embodiment, two components of an electrochemical cell such as electrode portions 212A and 212B are joined after removal of both release layers 224A and 224B. For example, during fabrication of the electrode, the release layer may be released along with the carrier substrate, leaving behind only current collector 226, base electrode material layer 228, and optionally additional layers adjacent the base electrode material layer. Such an electrode portion can be joined with another electrode portion and/or another component of the electrochemical cell by applying an adhesion promoter such as an adhesive to one or more surfaces to be joined. In other embodiments, the two electrode layers are not joined by any adhesion promoter (e.g., adhesive) or any release layer, but are simply laid against one another, e.g., in a "rolled" configuration, as described herein. Advantageously, in such and other embodiments (e.g., as shown in FIG. 7B), a support for the current collector and base electrode material layer(s) is not needed and the electrochemical cell is self-supporting. This configuration can reduce the weight of the electrochemical cell, thereby increasing the cell's energy density.

In certain embodiments a release layer used to form a component of an electrochemical cell is designed to withstand the application of a force applied to the component during fabrication and/or during cycling of the cell. For example, a release layer described herein may be compatible with the methods and articles described below relating to the application of force to electrochemical cells described herein.

As described herein, the adhesion promoter may include a formulation that can solvate, dissolve portions of, and/or activate a surface of a release layer to which the adhesion promoter formulation comes in contact to promote adhesion between the release layer and another component of the cell. In some embodiments, the adhesion promoter is relatively inert with respect to other components of the cell (e.g., current collector, electroactive material, electrolyte). In certain embodiments, the adhesion promoter may be formulated or applied (e.g., in a certain amount or by a particular method) such that penetration of the adhesion promoter through the release layer is minimized so that the adhesion promoter does not react with one or more components of the cell. The particular adhesion promoter formulation may be designed such that it can be easily applied to a component of the cell, e.g., by techniques such as coating, spraying painting, and other methods described herein and known to those of ordinary skill in the art.

In some embodiments, an adhesion promoter (e.g., an adhesive or a solvent solution) may include one or more of the materials that can be used to form the release layer.

Typically, the adhesion promoter has a different formulation than that of the release layer; however, in some embodiments, the formulations may be substantially similar.

The release layer and/or an adhesion promoter may be formed of or include in its composition, for example, a metal, a ceramic, a polymer, or a combination thereof. As such, the release layer and/or adhesion promoter may be conductive, semi-conductive, or insulating.

In some embodiments, a release layer and/or an adhesion promoter comprises a polymeric material. In some cases, at least a portion of the polymeric material of the release layer and/or an adhesion promoter is crosslinked; in other cases, the polymeric material(s) is substantially uncrosslinked. When included in an adhesion promoter formulation, a polymer may act as an adhesive to promote adhesion between two components of an electrochemical cell.

Examples of polymeric materials are described herein.

In some cases, a release layer and/or an adhesion promoter comprises less than 30% by weight of a crosslinked polymeric material (e.g., as determined after the primer layer has been dried). That is, less than 30% by weight of the individual polymer chains which form the polymeric material of a particular layer may be crosslinked at least one intermediate (e.g., non-terminal) position along the chain with another individual polymer chain within that layer. A release layer and/or an adhesion promoter may include, for example, less than 25% by weight, less than 20% by weight, less than 15% by weight, less than 10% by weight, less than 5% by weight, or less than 2% by weight, or 0% of a crosslinked polymeric material. In certain embodiments, a release layer and/or an adhesion promoter includes less than 30% by weight of a covalently crosslinked polymeric material. For example, a release layer and/or an adhesion promoter may include less than 25% by weight, less than 20% by weight, less than 15% by weight, less than 10% by weight, less than 5% by weight, or less than 2% by weight, or 0% of a covalently crosslinked polymeric material. In one particular embodiment, a release layer and/or an adhesion promoter is essentially free of covalently crosslinked material.

Sometimes, a release layer has a different degree of crosslinking within the layer. For instance, a first surface of a release layer may include a lesser amount of a crosslinked polymer, and a second surface of the release layer may include higher amounts of crosslinked polymer. The amount of crosslinking may be in the form a gradient within the layer. Other arrangements are also possible.

It should be understood that while a release layer and/or an adhesion promoter may include a certain percentage of crosslinked polymeric material (e.g., less than 30% by weight of a crosslinked polymeric material), the total amount of polymeric material (e.g., combined crosslinked and non-crosslinked polymeric material) in the release layer and/or an adhesion promoter may vary, e.g., from 20-100% by weight of the release layer and/or an adhesion promoter (e.g., from 30-90 wt %, from 50-95 wt %, or from 70-100 wt %). The remaining material used to form the release layer and/or an adhesion promoter may include, for example, a filler (e.g., conductive, semi-conductive, or insulating filler), a crosslinking agent, a surfactant, one or more solvents, other materials as described herein, and combinations thereof.

In certain embodiments, a release layer and/or an adhesion promoter includes a UV curable material. For instance, at least 30 wt %, at least 50 wt %, or at least 80 wt % of a release layer or a layer formed by an adhesion promoter may be a UV curable material. In other instances, at least 30 wt %, at least 50 wt %, or at least 80 wt % of a release layer or a layer formed by an adhesion promoter is a non-UV curable material. In one embodiment, substantially all of a release layer and/or a layer formed by an adhesion promoter is non-UV curable.

In some embodiments, a release layer and/or an adhesion promoter described herein comprises a material including pendant hydroxyl functional groups. Hydroxyl groups may provide the release layer with a relatively high adhesive affinity to a first layer but a relatively moderate or poor adhesive affinity to a second layer, or may allow an adhesion promoter to facilitate adhesion between a release layer and another component (e.g., between two release layers). Non-limiting examples of hydroxyl-containing polymers include poly vinyl alcohol (PVOH), polyvinyl butyral, polyvinyl formal, vinyl acetate-vinyl alcohol copolymers, ethylene-vinyl alcohol copolymers, and vinyl alcohol-methyl methacrylate copolymers. The hydroxyl-containing polymer may have varying levels of hydrolysis (thereby including varying amounts of hydroxyl groups). For instance, a polymer (e.g., a vinyl-based polymer) may be greater than 50% hydrolyzed, greater than 60% hydrolyzed, greater than 70% hydrolyzed, greater than 80% hydrolyzed, greater than 90% hydrolyzed, greater than 95% hydrolyzed, or greater than 99% hydrolyzed. A greater degree of hydrolysis may allow, for example, better adhesion of the hydroxyl-containing material to certain materials and, in some cases, may cause the polymer to be less soluble in the electrolyte. In other embodiments, a polymer having hydroxyl groups may be less than 50% hydrolyzed, less than 40% hydrolyzed, less than 30% hydrolyzed, less than 20% hydrolyzed, or less than 10% hydrolyzed with hydroxyl functional groups. In some cases, a release layer and/or an adhesion promoter is water soluble.

In some embodiments, a release layer and/or an adhesion promoter described herein comprises polyvinyl alcohol. The polyvinyl alcohol in a release layer and/or an adhesion promoter may be crosslinked in some instances, and substantially uncrosslinked in other instances. In one particular embodiment, a release layer immediately adjacent a carrier substrate comprises polyvinyl alcohol. In another embodiment, the release layer consists essentially of polyvinyl alcohol. The polyvinyl alcohol in such and other embodiments may be substantially uncrosslinked, or in other cases, less than 30% of the material used to form the first release layer is crosslinked. For instance, a release layer immediately adjacent a carrier substrate and including polyvinyl alcohol may comprise less than 30% by weight, less than 20% by weight, less than 15% by weight, less than 10% by weight, less than 5% by weight, or less than 2% by weight, of crosslinked polyvinyl alcohol. Such a release layer may optionally be adjacent a second release layer, which may have a different material composition than that of the first release layer.

The molecular weight of a polymer may also affect adhesive affinity and can vary in a release layer and/or in an adhesion promoter. For example, the molecular weight of a polymer used in a release layer and/or an adhesion promoter may be between 1,000 g/mol and 5,000 g/mol, 5,000 g/mol and 10,000 g/mol, between 10,000 g/mol and 15,000 g/mol, between, 15,000 g/mol and 20,000 g/mol, between 20,000 g/mol and 30,000 g/mol, between 30,000 g/mol and 50,000 g/mol, between, 50,000 g/mol and 100,000 g/mol, or between 100,000 g/mol and 200,000 g/mol. Other molecular weight ranges are also possible. In some embodiments, the molecular weight of a polymer used in a release layer and/or an adhesion promoter may be greater than about 1,000 g/mol, greater than about 5,000 g/mol, greater than about 10,000 g/mol, greater than about 15,000 g/mol, greater than about 20,000 g/mol, greater than about 25,000 g/mol, greater than about 30,000 g/mol, greater than about 50,000 g/mol, greater than about 100,000 g/mol or greater than about 150,000 g/mol. In other embodiments, the molecular weight of a polymer used in a release layer and/or an adhesion promoter may be less than about 150,000 g/mol, less than about 100,000 g/mol, less than about 50,000 g/mol, less than about 30,000 g/mol, less than about 25,000 g/mol, less than about 20,000 g/mol, less than less than about 10,000 g/mol, about 5,000 g/mol, or less than about 1,000 g/mol.

In other embodiments, a release layer and/or an adhesion promoter comprises a conductive material such as a metal or a conductive polymer. For example, if the release layer also acts as a current collector after being incorporated into the electrochemical cell, the release layer may be formed of a material suitable for use as a current collector, as described in more detail below.

A release layer and/or an adhesion promoter may include one or more solvents, e.g., in its initial formulation when being applied to a component of an electrochemical cell. The particular solvent or solvent combination used may depend on, for example, the type and amounts of any other materials in the formulation, the method of applying the formulation to the cell component, the inertness of the solvent with respect to other components of the electrochemical cell (e.g., current collector, electroactive material, electrolyte). For example, a particular solvent or solvent combination may be chosen based in part on it's ability to solvate or dissolve any other materials (e.g., a polymer, filler, etc.) in the formulation. For adhesion promoter formulations, the particular solvent or solvent combination may be chosen based in part on it's ability to solvate or dissolve portions of a release layer to which the adhesion promoter formulation comes in contact, and/or its ability to activate a surface of the release layer to promote adhesion. In some cases, one or more solvents used can wet (and activate) a surface of a release layer to promote adhesion, but does not penetrate across the release layer. A combination of such and other factors may be taken into consideration when choosing appropriate solvents.

Non-limiting examples of suitable solvents may include aqueous liquids, non-aqueous liquids, and mixtures thereof. In some embodiments, solvents that may be used for a release layer and/or a adhesion promoter include, for example, water, methanol, ethanol, isopropanol, propanol, butanol, tetrahydrofuran, dimethoxyethane, acetone, toluene, xylene, acetonitrile, cyclohexane, and mixtures thereof can be used. Additional examples of non-aqueous liquid solvents include, but are not limited to, N-methyl acetamide, acetonitrile, acetals, ketals, esters, carbonates, sulfones, sulfites, sulfolanes, sulfoxides, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are may also be used. Of course, other suitable solvents can also be used as needed.

In one set of embodiments involving the use of a solvent combination for an adhesion promoter, a first solvent of the solvent combination may be used to solvate, dissolve, and/or activate portions of a release layer to which the adhesion promoter formulation comes in contact, and a second solvent may be used to dilute or decrease the viscosity of the adhesion promoter formulation. For example, in one particular set of embodiments, an adhesion promoter, which may be used to facilitate adhesion between two release layers comprising a polymer including pendant hydroxyl functional groups (e.g., PVOH), may include a first solvent that solvates, dissolves, or activates the pendant hydroxyl functional groups to promote adhesion between the release layers. The first solvent may be, for example, a sulfoxide or any other suitable solvent that can dissolve, solvate, or activate a polymer including pendant hydroxyl functional groups (e.g., PVOH). The adhesion promoter may further include a second solvent that is miscible with the first solvent. The second solvent may, for example, be used to dilute or decrease the viscosity of the adhesion promoter formulation and/or increase the vapor pressure of the adhesion promoter formulation. Additional solvents (e.g., third, fourth solvents) may also be included in the solvent combination. As described herein, one or more of the solvents of the solvent combination may be inert with respect to other components of the cell (e.g., current collector, electroactive material, electrolyte).

A solvent combination including a first solvent that may be used to solvate, dissolve, and/or activate portions of a release layer to which the adhesion promoter formulation comes in contact, and at least a second solvent (such as one having the properties described above), may include an amount of the first solvent of greater than about 1 wt %, greater than about 5 wt %, greater than about 10 wt %, greater than about 20 wt %, greater than about 30 wt %, greater than about 40 wt %, greater than about 50 wt %, greater than about 60 wt %, greater than about 70 wt %, greater than about 80 wt %, or greater than about 90 wt % with respect to the total solvent combination. In other embodiments, the first solvent is present at an amount of less than about 90 wt %, less than about 80 wt %, less than about 70 wt %, less than about 60 wt %, less than about 50 wt %, less than about 40 wt %, less than about 30 wt %, less than about 20 wt %, less than about 10 wt %, less than about 5 wt %, less than about 3 wt %, or less than about 1 wt % with respect to the total solvent combination.

As described herein, an adhesion promoter may include in its formulation one or more solvents that can be used to facilitate adhesion between two components (e.g., release layers) of an electrochemical cell. In some cases, the adhesion promoter includes in its formulation a solvent or solvent combination without any polymer. In other embodiments, the adhesion promoter includes in its formulation a solvent or solvent combination along with a polymer, such as those described herein, that may act as an adhesive. The amount of polymer in the adhesion promoter formulation that is applied to a component of an electrochemical cell may be, for example, less than or equal to about 20 wt %, less than or equal to about 15 wt %, less than or equal to about 10 wt %, less than or equal to about 7 wt %, less than or equal to about 5 wt %, less than or equal to about 4 wt %, less than or equal to about 3 wt %, less than or equal to about 2 wt %, less than or equal to about 1 wt %, less than or equal to about 0.5%, or less than or equal to about 0.1% with respect to the total weight of the adhesion promoter formulation.

The use of a polymer in an adhesion promoter formulation may, in some instances, decrease the time required to promote adhesion between components of the cell compared to using a similar adhesion promoter formulation but without the polymer, all other conditions being equal. For instance, adhesion using an adhesion promoter that includes a polymer may take place at least 2 times, 3 times, 4 times, 5 times, or 10 times faster than adhesion using an adhesion promoter that does not includes the polymer. The use of an adhesion promoter formulation without a polymer, however, may simplify the adhesion process.

The thickness of a release layer and/or a layer formed by an adhesion promoter (if a layer is formed at all) may vary over a range of thicknesses. Typically, the thickness of a release layer is greater than the thickness of a layer formed by an adhesion promoter. The thickness of a release layer may vary, for example, from about 0.1 microns to about 50 microns, and the thickness of a layer formed by an adhesion promoter may vary, for example, from about 0.001 microns to about 50 microns. In some cases, an adhesion promoter is applied but does not result in the formation of a layer having any appreciable thickness.

In some embodiments, the thickness of the release layer and/or adhesion promoter layer may be between 0.001-1 microns thick, between 0.001-3 microns thick, between 0.01-3 microns thick, between 0.01-5 microns thick, between 0.1-1 microns thick, between 0.1 and 2 microns thick, between 0.1 and 3 microns thick, between 1-5 microns thick, between 5-10 microns thick, between 5-20 microns thick, or between 10-50 microns thick. In certain embodiments, the thickness of a release layer and/or a layer formed by an adhesion promoter is, e.g., about 10 microns or less, about 7 microns or less, about 5 microns or less, about 3 microns or less, about 2.5 microns or less, about 2 microns or less, about 1.5 microns or less, about 1 micron or less, or about 0.5 microns or less. As noted above, a relatively thicker release layer may be suitable for applications where the release layer is not incorporated into an electrochemical cell (e.g., it is released along with a carrier substrate), and a relatively thinner release layer may be desirable where the release layer is incorporated into the electrochemical cell.

Additional arrangements, components, and advantages of release layers are described in more detail in Provisional patent Apl. Ser. No. 61/236,322, filed Aug. 24, 2009, entitled "Release System for Electrochemical Cells", which is incorporated herein by reference in its entirety.

In some embodiments, a primer is used to facilitate electrical conduction and/or provide adhesive connection between a base electrode material layer (e.g., as part of an anode or a cathode) and a current collector. For example, primer layer 65 of FIG. 1 may facilitate adhesion between base electrode material layer 55 (e.g., comprising an electroactive material such as sulfur) and current collector 60 of cathode 50.

In some embodiments, primer arrangements described herein include first and second primer layers, which can be of the same or different material. The first primer layer may be designed to provide good adhesion to a conductive support (e.g., a current collector) and may comprise, for example, a crosslinked or substantially uncrosslinked polymer (e.g., a binder) having hydroxyl functional groups, e.g., polyvinyl alcohol. The materials used to form the second primer layer may be chosen such that the second primer layer adheres well to both the first primer layer and an electroactive layer. In certain embodiments including combinations of first and second primer layers, one or both of the first and second primer layers comprises less than 30% by weight of a crosslinked polymeric material. In other embodiments, one or both of the first and second primer layers comprises between 30-60% by weight of a crosslinked polymeric material. A primer including only a single layer of polymeric material is also described.

In certain embodiments, the primer layers described herein are constructed and arranged to have one or more of the following features: good adhesion and electrical conduction between the current collector and the primer layer (e.g., a first primer layer), good adhesion and electrical conduction between the first primer layer and a second primer layer in a multi-layer primer, good adhesion and electrical conduction between the primer layer (e.g., a second primer layer) and a base electrode material layer (which may comprise electroactive materials and other optional additives such as electronically conductive materials), and prevention of possible corrosive effects of the base electrode material layer on the current collector, e.g., during charge and/or discharge. Additionally, batteries described herein comprising primers described herein may have lower area specific resistance than batteries including certain commercial primers.

Primer layer(s) described herein are preferably thin (e.g., less than about 10 microns) to reduce overall battery weight. Furthermore, primer layer(s) should be stable in the electrolyte and should not interfere with the structural integrity of the electrodes in order for the electrochemical cell to have a high electrochemical "capacity" or energy storage capability (i.e., reduced capacity fade).

As described herein, a primer arrangement may include at least a first and a second primer layer. One or both of the first primer layer and second primer layer may be formed of a polymeric material. The polymeric materials used to form the two layers may be the same or different. In some cases, at least a portion of the polymeric material of the first and/or second primer layers is/are crosslinked; in other cases, the polymeric material(s) is/are substantially uncrosslinked.

In some cases, the first and/or second primer layer comprises less than or equal to 40% by weight, or less than or equal to 30% by weight of a crosslinked polymeric material (e.g., as determined after the primer layer has been dried). That is, less than or equal to 40% by weight, or less than or equal to 30% by weight of the individual polymer chains which form the polymeric material of a particular layer may be crosslinked at least one intermediate (e.g., non-terminal) position along the chain with another individual polymer chain within that layer. One or both of the first and second primer layers may comprise less than or equal to 25% by weight, less than or equal to 20% by weight, less than or equal to 15% by weight, less than or equal to 10% by weight, less than or equal to 5% by weight, less than or equal to 2% by weight, or 0% of a crosslinked polymeric material. In certain embodiments, the first and/or second primer layer comprises less than or equal to 40%, or less than or equal to 30% by weight of a covalently crosslinked polymeric material. For example, one or both of the first and second primer layers may comprise less than or equal to 25% by weight, less than or equal to 20% by weight, less than or equal to 15% by weight, less than or equal to 10% by weight, less than or equal to 5% by weight, less than or equal to 2% by weight, or 0% of a covalently crosslinked polymeric material. In one particular embodiment, one or both of the first and second primer layers is essentially free of covalently crosslinked material.

It should be understood that while a primer layer may include, for example, less than or equal to 40%, or less than or equal to 30% by weight of a crosslinked polymeric material, the total amount of polymeric material (e.g., combined crosslinked and non-crosslinked polymeric material) in the primer layer may vary, e.g., from 20-90% by weight of the primer layer, as described in more detail below.

In one particular embodiment, a first primer layer comprises less than 30% by weight of a crosslinked polymeric material (e.g., polyvinyl alcohol) and a second primer layer also includes less than 30% by weight of a crosslinked polymeric material (e.g., polyacrylate, polyvinyl pyrrolidone vinyl acetate copolymer, and polyvinyl butyral). In other embodiments, one of the first and second primer layers comprises less than 30% by weight of a crosslinked polymeric material, and the other of the first and second primer layers comprises greater than 30% by weight of a crosslinked polymeric material. In yet other embodiments, both of the first and second primer layers may include greater than 30% by weight of a crosslinked polymeric material.

Sometimes, an electrode includes first and second primer layers that are formed of the same material, but the first and second primer layers have different degrees of crosslinking. For instance, the first primer layer may comprise substantially uncrosslinked polyvinyl alcohol, and the second primer layer may comprise crosslinked polyvinyl alcohol. Other arrangements are also possible.

In some embodiments, a primer comprises first primer layer separated from second primer layer by intermediate layer, wherein an electroactive material is in electrical communication with the second primer layer. In some embodiments, intermediate layer is a third primer layer. Accordingly, in some embodiments, primers including more than two primer layers may be used as appropriate. In other embodiments, intermediate layer is a conductive support material (e.g., a current collector), a metal layer, a plasma treated layer, an ionic layer, or the like. The composition and thickness of the intermediate layer may be chosen, for example, based on its electrical conductivity, adhesiveness, and/or other mechanical or physical properties. In other embodiments, an intermediate layer is positioned between an electroactive material and a second primer layer, and/or between a first primer layer and a conductive support. In some cases, an electrode includes two or more intermediate layers positioned between various layers of the electrode.

In some embodiments, a primer layer described herein (e.g., as part of a multi-layered primer assembly or a single-layer primer) comprises hydroxyl functional groups. Hydroxyl groups may provide good adhesion to a conductive support such as an aluminum foil and/or an aluminized polyethylene terephthalate (PET) film. Non-limiting examples of hydroxyl-containing polymers include polyvinyl alcohol, polyvinyl butyral, polyvinyl formal, vinyl acetate-vinyl alcohol copolymers, ethylene-vinyl alcohol copolymers, and vinyl alcohol-methyl methacrylate copolymers. The hydroxyl-containing polymer may have varying levels of hydrolysis (thereby including varying amounts of hydroxyl groups). For instance, a vinyl-based polymer may be greater than 50% hydrolyzed, greater than 60% hydrolyzed, greater than 70% hydrolyzed, greater than 80% hydrolyzed, greater than 90% hydrolyzed, greater than 95% hydrolyzed, or greater than 99% hydrolyzed. A greater degree of hydrolysis may allow better adhesion of the hydroxyl-containing material to a conductive support and, in some cases, may cause the polymer to be less soluble in the electrolyte. In other embodiments, a polymer having hydroxyl groups may be less than 50% hydrolyzed, less than 40% hydrolyzed, less than 30% hydrolyzed, less than 20% hydrolyzed, or less than 10% hydrolyzed with hydroxyl functional groups. In one particular embodiment, a first primer layer comprises hydroxyl groups and a second primer layer has a different material composition than that of the first primer layer.

In some embodiments, a primer layer described herein comprises polyvinyl alcohol. The polyvinyl alcohol in a primer layer may be crosslinked in some instances, and substantially uncrosslinked in other instances. In one particular embodiment, a primer layer immediately adjacent a conductive support (e.g., a first primer layer) comprises polyvinyl alcohol. In another embodiment, the primer layer consists essentially of polyvinyl alcohol. The polyvinyl alcohol in such embodiments may be substantially uncrosslinked, or in other cases, less than 30% of the material used to form the first primer layer is crosslinked. For instance, a primer layer immediately adjacent a conductive support and including polyvinyl alcohol may comprise less than 30% by weight, less than 20% by weight, less than 15% by weight, less than 10% by weight, less than 5% by weight, or less than 2% by weight, of crosslinked polyvinyl alcohol. Such a primer layer may optionally be adjacent a second primer layer, which may have a different material composition than that of the first primer layer. In some instances, the second primer layer is crosslinked. The second primer layer may comprise any suitable material that can adhere well to the first primer layer and the electroactive material. Examples of such materials include, but are not limited to, polyvinyl butyral, polyacrylate, polyvinyl pyrrolidone, and polyvinyl acetate, as well as copolymers thereof. Other suitable polymers are described in more detail below. In one particular embodiment, the material used to form the second primer layer is crosslinked so as to provide good adhesion between the first primer layer and a sulfur-containing cathodes.

In certain embodiments, two primer layers of a primer comprise polymers having hydroxyl functional groups. The percentage of hydroxyl functional groups in the polymers of the first and second primer layers may differ. For example, in one embodiment, the first primer layer comprises at least at least 20% more, at least 40% more, at least 60% more, at least 80% more, at least 100% more, at least 150% more, or at least 200% more hydroxyl groups than the second primer layer. One particular example is a first primer layer comprising polyvinyl alcohol and a second primer layer comprising polyvinyl butyral (e.g., where polyvinyl alcohol has been reacted to varying degrees with butanal and/or other compounds).

Primer layers can also include other polymeric materials, such as those described herein.

As mentioned above, a primer layer may include any suitable amount of polymeric material to achieve the desired properties. For example, the total amount of polymeric material (e.g., combined crosslinked and non-crosslinked polymeric material) in a primer layer may be in the range of, for example, 20-90% by weight of the primer layer (e.g., as determined after drying the primer layer). In some instances, a primer layer includes a total amount of a polymeric material in the range of, for example, 20-40%, 30-60%, 40-80%, or 60-80% by weight of the primer layer. The remaining material used to form the primer layer may include a conductive filler, a crosslinking agent, and/or other materials as described herein.

The thickness of a primer layer (e.g., a first and/or a second primer layer) may vary over a range from about 0.1 microns to about 10 microns. For instance, the thickness of the primer layer may be between 0.1-1 microns thick, between 1-5 microns thick, or between 5-10 microns thick. The thickness of a primer layer may be no greater than, e.g., 10 microns thick, no greater than 7 microns thick, no greater than 5 microns thick, no greater than 3 microns thick, no greater than 2.5 microns thick, no greater than 1 micron thick, no greater than 0.5 microns thick, no greater than 0.3 microns thick, or no greater than 0.1 microns thick. In some embodiments including a multi-layer primer, a first primer layer has the same thickness as a second primer layer. In other embodiments, the first primer layer may have a different thickness than the second primer layer.

Additional arrangements, components, and advantages of primer layers are described in more detail in International Patent Apl. Serial No.: PCT/US2008/012042, filed Oct. 23, 2008, entitled "Primer for Battery Electrode", which is incorporated herein by reference in its entirety.

An electrochemical cell may include any suitable current collector. In some instances, the current collector is positioned immediately adjacent a release layer (e.g., on top of a release layer that has been positioned on a carrier substrate) and/or a primer layer, as described herein. The current collector may have good adhesion to a release layer and/or primer layer where the release layer and/or primer layer is designed to be a part of the final electrochemical cell. In other embodiments, the current collector may have poor adhesion to a release layer where the release layer is designed to be released along with a carrier substrate.

A current collector is useful in efficiently collecting the electrical current generated throughout an electrode and in providing an efficient surface for attachment of the electrical contacts leading to the external circuit. A wide range of current collectors are known in the art. Suitable current collectors may include, for example, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein.

In some embodiments, the current collector includes one or more conductive metals such as aluminum, copper, chromium, stainless steel and nickel. For example, a current collector may include a copper metal layer. Optionally, another conductive metal layer, such as titanium may be positioned on the copper layer. The titanium may promote adhesion of the copper layer to another material, such as an electroactive material layer. Other current collectors may include, for example, expanded metals, metal mesh, metal grids, expanded metal grids, metal wool, woven carbon fabric, woven carbon mesh, non-woven carbon mesh, and carbon felt. Furthermore, a current collector may be electrochemically inactive. In other embodiments, however, a current collector may comprise an electroactive material. For example, a current collector may include a material which is used as an electroactive material layer (e.g., as an anode or a cathode such as those described herein).

A current collector may be positioned on a surface (e.g., a surface of a release layer) by any suitable method such as lamination, sputtering, and vapor deposition. In some cases, a current collector is provided as a commercially available sheet that is laminated with one or more electrochemical cell components. In other cases, a current collector is formed during fabrication of the electrode by depositing a conductive material on a suitable surface. Side or edge current collectors, such as current collector 180 shown in FIG. 5, may also be incorporated into electrochemical cells described herein.

A current collector may have any suitable thickness. For instance, the thickness of a current collector may be, for example, between 0.1 and 0.5 microns thick, between 0.1 and 0.3 microns thick, between 0.1 and 2 microns thick, between 1-5 microns thick, between 5-10 microns thick, between 5-20 microns thick, or between 10-50 microns thick. In certain embodiments, the thickness of a current collector is, e.g., about 20 microns or less, about 12 microns or less, about 10 microns or less, about 7 microns or less, about 5 microns or less, about 3 microns or less, about 1 micron or less, about 0.5 micron or less, or about 0.3 micron or less. In some embodiments, the use of a release layer during fabrication of an electrode can allow the formation or use of a very thin current collector, which can reduce the overall weight of the cell, thereby increasing the cell's energy density.

The electrolytes used in electrochemical cells can function as a medium for the storage and transport of ions, and in the special case of solid electrolytes and gel electrolytes, these materials may additionally function as a separator between the anode and the cathode. Any suitable liquid, solid, or gel material capable of storing and transporting ions between the anode and the cathode may be used. The electrolyte may be electronically non-conductive to prevent short circuiting between the anode and the cathode. In one set of embodiments a non-aqueous-based electrolyte is used; in another set of embodiments, an aqueous-based electrolyte is used.

In some embodiments, an electrolyte may be present as a polymer layer 75 and/or 80 (e.g., a gel or solid polymer layer) as shown illustratively in FIG. 1. In some cases, in addition to being able to function as a medium for the storage and trasport of ions, a polymer layer positioned between an anode and cathode can function to screen the anode (e.g., a base electrode layer of the anode) from any cathode roughness under an applied force or pressure, keeping the anode surface smooth under force or pressure, and stabilizing any multi-layered structures of the anode (e.g., ceramic polymer multi-layer) by keeping the multi-layer pressed between the base electrode layer and the smooth polymer layer. In some such embodiments, the polymer layer may be chosen to be compliant and have a smooth surface.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994).

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, specific liquid electrolyte solvents that may be favorable towards the anode as described in more detail below (e.g., have relatively low reactivity towards lithium, good lithium ion conductivity, and/or relatively low polysulfide solubility) include, but are not limited to 1,1-dimethoxyethane (1,1-DME), 1,1-diethoxyethane, 1,2-diethoxyethane, diethoxymethane, dibutyl ether, anisole or methoxybenzene, veratrole or 1,2-dimethoxybenzene, 1,3-dimethoxybenzene, t-butoxyethoxyethane, 2,5-dimethoxytetrahydrofurane, cyclopentanone ethylene ketal, and combinations thereof. Specific liquid electrolyte solvents that may be favorable towards the cathode (e.g., have relatively high polysulfide solubility, and/or can enable high rate capability and/or high sulfur utilization) include, but are not limited to dimethoxyethane (DME, 1,2-dimethoxyethane) or glyme, diglyme, triglyme, tetraglyme, polyglymes, sulfolane, 1,3-dioxolane (DOL), tetrahydrofurane (THF), acetonirile, and combinations thereof.

Specific mixtures of solvents include, but are not limited to 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may vary from about 5 to 95 to 95 to 5. In some embodiments, a solvent mixture comprises dioxolanes (e.g., greater than 40% by weight of dioxolanes).

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

As described herein, additives that may reduce or prevent formation of impurities and/or depletion of electrochemically active materials including electrodes and electrolyte materials, during charge/discharge of the electrochemical cell, may be incorporated into electrochemical cells described herein.

In some cases, an additive such as an organometallic compound may be incorporated into the electrolyte and may reduce or prevent interaction between at least two components or species of the cell to increase the efficiency and/or lifetime of the cell. Typically, electrochemical cells (e.g., rechargeable batteries) undergo a charge/discharge cycle involving deposition of metal (e.g., lithium metal) on the surface of the anode (e.g., a base electrode material) upon charging and reaction of the metal on the anode surface to form metal ions, upon discharging. The metal ions may diffuse from the anode surface into an electrolyte material connecting the cathode with the anode. The efficiency and uniformity of such processes may affect cell performance. For example, lithium metal may interact with one or more species of the electrolyte to substantially irreversibly form lithium-containing impurities, resulting in undesired depletion of one or more active components of the cell (e.g., lithium, electrolyte solvents). The incorporation of certain additives within the electrolyte of the cell have been found, in accordance with certain embodiments described herein, to reduce such interactions and to improve the cycling lifetime and/or performance of the cell.

In some embodiments, additives such as organometallic additives may reduce or prevent formation of impurities, i.e., lithium-containing impurities, or other species that may be formed during charge-discharge cycling of the electrochemical cell. In some cases, formation of the impurities (e.g., depletion products) may advantageously be reduced and/or prevented while the cell is in early stages of operation, for example, when the cell has been charged and discharged less than five times in its lifetime. Incorporation of such additives within electrochemical cells may reduce formation of impurities and/or depletion of the electrodes, electrolyte, and/or other species present within the cell, and may improve overall cell performance. In some embodiments, the cells, devices, and methods described herein may exhibit improved performance including reduced capacity fade, improved morphology of electrodes (e.g., anode, cathode) upon cycling, reduced lithium corrosion with electrolyte components (e.g., polysulfides), reduced cell polarization, reduced depletion of electrolyte solvent, etc.

In some embodiments, the additive may be any suitable species, or salt thereof, capable of reducing or preventing the depletion of active materials (e.g., electrodes, electrolyte) within a cell, for example, by reducing formation of lithium-containing impurities within the cell, which may be formed via reaction between lithium and an electrolyte material. In some embodiments, the additive may be an organic or organometallic compound, a polymer, salts thereof, or combinations thereof. In some embodiments, the additive may be a neutral species. In some embodiments, the additive may be a charged species. Additives described herein may also be soluble with respect to one or more components of the cell (e.g., the electrolyte). In some cases, the additive may be an electrochemically active species. For example, the additive may be a lithium salt which may reduce or prevent depletion of lithium and/or the electrolyte, and may also serve as an electrochemically active lithium salt.

The additive may be present within (e.g., added to) the electrochemical cell in an amount sufficient to inhibit (e.g., reduce or prevent) formation of impurities and/or depletion of the active materials within the cell. "An amount sufficient to inhibit formation of impurities and/or depletion of the active materials within the cell," in this context, means that the additive is present in a large enough amount to affect (e.g., reduce) formation of impurities and/or the depletion of the active materials, relative to an essentially identical cell lacking the additive. For example, trace amounts of an additive may not be sufficient to inhibit depletion of active materials in the cell. Those of ordinary skill in the art may determine whether an additive is present in an amount sufficient to affect depletion of active materials within an electrochemical device. For example, the additive may be incorporated within a component of an electrochemical cell, such as the electrolyte, and the electrochemical cell may be monitored over a number of charge/discharge cycles to observe any changes in the amount, thickness, or morphology of the electrodes or electrolyte, or any changes in cell performance. Determination of the amount of change in the active materials over a number of charge/discharge cycles may determine whether or not the additive is present in an amount sufficient to inhibit formation of impurities and/or depletion of the active materials. In some cases, the additive may be added to the electrochemical cell in an amount sufficient to inhibit formation of impurities and/or depletion of active materials in the cell by at least 50%, 60%, 70%, 80%, 90%, or, in some cases, by 100%, as compared to an essentially identical cell over an essentially identical set of charge/discharge cycles, absent the additive.

Although not wishing to be bound by any theory, the inventors offer the following discussion of the relationship between the presence of the additive and performance characteristics observed. In typical lithium anode batteries, after a few charge/discharge cycles of a battery, adverse changes can occur, such as formation of impurities and/or depletion of active materials. This may be due to interaction of lithium, or a lithium-containing compound, with one or more species in the electrolyte to substantially irreversibly form an impurity, such as a lithium-containing impurity. In some cases, formation of the impurity may comprise interaction between lithium, or a lithium-containing compound, and a solvent present within the electrochemical cell, to produce the impurity. In some cases, lithium or a lithium-containing compound may react with a solvent comprising at least one carbon-heteroatom bond (e.g., C—O, C=O, C—S, C=S, C—N, C=N, etc.) to form the lithium-containing impurity. In some cases, a sulfur-containing material (e.g., sulfur, carbon disulfide, polysulfides, etc.) may interact with a solvent to form the lithium-containing impurity such as an alkyl polysulfide, carbon disulfide, polythiocarbonate, polythiocarboxylate, or the like.

The presence of additives within a cell may reduce and/or substantially inhibit formation of impurities, thereby reducing active material depletion and improving the performance and/or lifetime of the batteries. In some cases, the additive, incorporated within the cell from a source external to the cell, may have the same chemical structure as a compound (e.g., a depletion product) that may be formed as a result of a substantially irreversible reaction between lithium of the anode with one or more species present within the electrolyte, under normal charge and/or discharge of the cell. However, the external additive may not be the product of such a reaction. That is, the additive may have the same chemical structure as a "depletion product" of the cell, although the additive is produced from and/or provided by a source external to the cell. In some cases, the additive may be incorporated within an electrochemical cell prior to use of the cell. In some cases, the additive may be incorporated within an electrochemical cell having been charged and discharged less than five times under set conditions. As used herein, "set conditions" may comprise, for example, application of a particular voltage, temperature, pKa, solvent, chemical reagent, type of atmosphere (e.g., nitrogen, argon, oxygen, etc.), or the like, for a particular period of time.

In some cases, the additive may have the same chemical structure as a product of a reaction between lithium of the anode and a solvent within the electrolyte, such as an ester, ether, acetal, ketal, or the like. Examples of such solvents include, but are not limited to, 1,2-dimethoxyethane and 1,2-dioxolane.

In some cases, the additive may be an organometallic compound, including salts. In some cases, the additive is a lithium compound, such as a lithium salt. The additive (e.g., the external additive) may have the formula LiR or (Li—X)$_n$R', wherein R comprises a heteroalkyl or heteroaryl group, optionally substituted; R' comprises an alkyl or aryl group, optionally substituted; X may be a heteroatom; and n may be an integer equal to or greater than 1. In some cases, R may be —O-alkyl, —O-aryl, —O-heteroaryl, —S-alkyl, —S-aryl, —S-heteroaryl, optionally substituted. In some cases, R may be —O-alkyl, —O-alkoxyalkyl, —S-alkyl, or —S-alkoxyalkyl. In some cases, R may comprise an alcohol or a carboxyl group. Examples of such additives include lithium 2-methoxyethoxide or lithium methoxide. In one set of embodiments, the additive is lithium methoxide.

In some cases, the additives described herein may be associated with a polymer. For example, the additives may be combined with a polymer molecule or may be bonded to a polymer molecule. In some cases, the additive may be a polymer. For example, the additive may have the formula, R'—(O—Li)$_n$, wherein R' is alkyl or alkoxyalkyl.

As described above, some embodiments described herein relate to devices comprising an electrochemical cell having been charged and discharged less than five times under set conditions. The cell may comprise an anode comprising lithium, a cathode, and an electrolyte in electrochemical communication with the anode. The electrolyte may comprise a lithium compound additive, which, under normal charge and/or discharge of the cell, can be produced through a substantially irreversible reaction between the lithium of the anode and at least one other species of the cell during charge and/or discharge of the cell. However, in some cases, the lithium compound additive may be present in the cell in an amount greater than that formed through charge and discharge of the cell five times under the set conditions. That is, the lithium compound additive can be provided to the cell from a source external to the cell, in an amount greater than would be produced internally within the cell through five charge and discharge cycles.

Advantageously, the additive may be present within an electrochemical cell described herein in an amount sufficient to reduce or prevent internal formation of impurities during charge and/or discharge. The additive may be introduced into the cell prior to depletion of active material(s) and/or deterioration of cell performance. In some cases, the additive is advantageously provided prior to use of the cell, or in the early stages of use of the cell (e.g., when the cell has been charged and discharged less than five times under set conditions). For example, the additive may have the same chemical formula as an impurity or depletion product of the electrochemical cell, such that introduction of the additive in an amount sufficient to saturate the electrochemical cell may reduce and/or prevent internal formation of the impurity. That is, the amount of electrolyte, lithium, depletion product, and/or other species present within the cell may affect the equilibrium of a reaction which can generate a depletion product, such that addition of the depletion product, in an amount sufficient to affect the equilibrium of the reaction (e.g., to drive the equilibrium in a direction which reduces formation of the impurity), may reduce or prevent formation of the depletion product.

In some embodiments, an additive is added to an electrochemical cell, wherein the additive is an electrochemically active species. For example, the additive can serve as electrolyte salt and can facilitate one or more processes during charge and/or discharge of the cell. In some cases, the additive may be substantially soluble or miscible with one or more components of the cell. In some cases, the additive may be a salt which is substantially soluble with respect to the electrolyte. The additive may serve to reduce or prevent formation of impurities within the cell and/or depletion of the active materials, as well as facilitate the charge-discharge processes within the cell.

Incorporation of additives described herein may allow for the use of smaller amounts of lithium and/or electrolyte within an electrochemical cell, relative to the amounts used in essentially identical cells lacking the additive. As described above, cells lacking the additives described herein may generate lithium-containing impurities and undergo depletion of active materials (e.g., lithium, electrolyte) during charge-discharge cycles of the cell. In some cases, the reaction which generates the lithium-containing impurity may, after a number of charge-discharge cycles, stabilize and/or begin to self-inhibit such that substantially no additional active material becomes depleted and the cell may function with the remaining active materials. For cells lacking additives as described herein, this "stabilization" is often reached only after a substantial amount of active material has been consumed and cell performance has deteriorated. Therefore, in some cases, a relatively large amount of lithium and/or electrolyte has often been incorporated within cells to accommodate for loss of material during consumption of active materials, in order to preserve cell performance.

Accordingly, incorporation of additives as described herein may reduce and/or prevent depletion of active materials such that the inclusion of large amounts of lithium and/or electrolyte within the electrochemical cell may not be necessary. For example, the additive may be incorporated into a cell prior to use of the cell, or in an early stage in the lifetime of the cell (e.g., less than five charge-discharge cycles), such that little or substantially no depletion of active material may occur upon charging or discharging of the cell.

By reducing and/or eliminating the need accommodate for active material loss during charge-discharge of the cell, relatively small amounts of lithium may be used to fabricate cells and devices as described herein. In some embodiments, devices described herein comprise an electrochemical cell having been charged and discharged less than five times in its lifetime, wherein the cell comprises an anode comprising lithium, a cathode, and an electrolyte, wherein the anode comprises no more than five times the amount of lithium which can be ionized during one full discharge cycle of the cell. In some cases, the anode comprises no more than four, three, or two times the amount of lithium which can be ionized during one full discharge cycle of the cell.

In some cases, devices described herein comprise an electrochemical cell having been charged and discharged less than five times in its lifetime, wherein the cell comprises an anode comprising lithium (e.g., lithium metal), a cathode active material (e.g., sulfur), and an electrolyte, wherein the molar ratio of cathode active material to lithium (e.g., lithium metal) may be at least 0.1. For example, a cell may comprise sulfur and lithium (e.g., lithium metal), wherein the molar ratio S:Li (e.g., lithium metal) is equal to or greater than 0.1. In some cases, the molar ratio of cathode active material to lithium is at least 0.3, at least 0.5, at least 0.7, or greater. In some embodiments, the ratio of cathode active material to lithium (e.g., lithium metal) by weight may be at least 0.46. For example, a cell may comprise sulfur and lithium, wherein the ratio S:Li by weight is equal to or greater than 0.46. In some cases, the ratio of cathode active material to lithium by weight is at least 0.5, at least 0.7, at least 0.9, or greater. In some embodiments, the ratio of cathode active material to electrolyte by weight is at least 0.17. In some cases, the ratio of cathode active material to lithium by weight is at least 0.2, at least 0.5, at least 0.7, or greater. In some embodiments, the cathode active material is a sulfur-containing material (e.g., elemental sulfur). Other examples of cathode active materials are described more fully herein.

The use of smaller amounts of lithium and/or electrolyte materials may advantageously allow for electrochemical cells, or portions thereof, having decreased thickness. In some embodiments, devices described herein comprise an electrochemical cell having been charged and discharged less than five times in its lifetime, wherein the cell comprises an anode comprising lithium, a cathode, and an electrolyte layer, and wherein the anode layer and the electrolyte layer together have a maximum thickness of 500 microns. In some cases, the anode layer and the electrolyte layer together have a maximum thickness of 400 microns, 300 microns, 200 microns, or, in some cases, 100 microns.

It may be advantageous, in some cases, for an electrochemical cell or device to have the ability to react a large amount of lithium metal upon discharge in a reaction that is substantially reversible during normal cell charge and/or discharge, i.e., the cell or device may have a large "depth of discharge." In some embodiments, such substantially reversibly reactions do not include, for example, consumption of lithium metal in a substantially irreversible reaction to form an impurity. In some cases, electrochemical cells, devices, and methods comprising an additive as described herein may have the ability to react a greater amount of lithium metal upon discharge in a substantially reversible reaction, relative to essentially identical cells, devices, and methods lacking the additive, with little or essentially no deterioration of cell performance due to, for example, morphological changes at the electrode.

In some embodiments, in an electrochemical cell having been charged and discharged less than five times in its lifetime, at least 20% of the lithium from the anode is reacted upon discharge in a reaction that is substantially reversible during normal cell charge and/or discharge. In some cases, at least 30%, 50%, 70%, or, in some cases, at least 90%, of the lithium from the anode is reacted upon discharge in a reaction that is substantially reversible during normal cell charge and/or discharge. In some cases, essentially 100% of the lithium from the anode is reacted upon discharge in a reaction that is substantially reversible during normal cell charge and/or discharge. For example, for a particular number of charge-discharge cycles, an essentially identical amount of lithium metal may be depleted from the anode in each discharge cycle, and plated at the anode in each charge cycle.

In some embodiments, when an additive is added into the electrolyte that is added to the electrochemical cell during fabrication, the additive may first be introduced into the cell as a part of other cell components from where it can enter the electrolyte. The additive may be incorporated into liquid, gel or solid polymer electrolytes. In some embodiments, the additive may be incorporated in the cathode formulation or into the separator in the fabrication process, as long as it is included in a manner such that it will enter the electrolyte in sufficient concentrations. Thus during discharge and charge of the cell, the additive incorporated in the cathode formulation or the separator may dissolve in the electrolyte.

In some embodiments, an N—O compound can be used as an additive. N—O compounds for use as additives include, but are not limited to, families such as inorganic nitrates, organic nitrates, inorganic nitrites, organic nitrites, organic nitro compounds, compounds with negatively, neutral and positively charged $NO_x$ groups, and other organic N—O compounds. Examples of inorganic nitrates that may be used include, but are not limited to, lithium nitrate, potassium nitrate, cesium nitrate, barium nitrate, and ammonium nitrate. Examples of organic nitrates that may be used include, but are not limited to, dialkyl imidazolium nitrates, and guanidine nitrate. Examples of inorganic nitrites that may be used include, but are not limited to, lithium nitrite, potassium nitrite, cesium nitrite, and ammonium nitrite. Examples of organic nitrites that may be used include, but are not limited to, ethyl nitrite, propyl nitrite, butyl nitrite, pentyl nitrite, and octyl nitrite. Examples organic nitro compounds that may be used include, but are not limited to, nitromethane, nitropropane, nitrobutanes, nitrobenzene, dinitrobenzene, nitrotoluene, dinitrotoluene, nitropyridine, and dinitropyridine. Examples of other organic N—O compounds that may be used include, but are not limited to, pyridine N-oxide, alkylpyridine N-oxides, and tetramethyl piperidine N-oxyl (TEMPO). These and other additives, which may stabilize lithium/electrolyte reactivity, may increase rate of polysulfide dissolution and/or increase sulfur utilization, are described in more detail in U.S. Pat. No. 7,553,590, entitled "Electrolytes for lithium sulfur cells," which is incorporated herein by reference in its entirety.

Concentrations of the N—O additive in the electrolytes may be from about 0.02 m to about 2.0 m (e.g., from about 0.1 m to about 1.5 m, or from about 0.2 m to about 1.0 m). Concentrations of the ionic N—O additive when used in embodiments that do not include added lithium salts may vary from about 0.2 m to about 2.0 m.

In some embodiments, electrochemical cells described herein are adapted and arranged such that electrolyte compositions are separated to different portions of the cell. Such separation can result in isolation of a particular species from a portion of the electrochemical cell, or at least reduction in level of exposure of that portion to the species, for a variety of purposes, including prevention of deposition of certain solids on or within electrodes of devices of this type.

Separation of electrolyte compositions described herein can be carried out in a variety of manners. In one set of techniques, a polymer (which can be a gel) is positioned at a location in the device where it is desirable for a particular electrolyte solvent, which has relatively high affinity for the polymer, to reside. In another set of techniques, two different polymers are positioned in the device at particular locations where two different electrolyte solvents, each having a relatively greater affinity for one of the polymers, are desirably positioned. Similar arrangements can be constructed using more than two polymers. Relatively immiscible electrolyte solvents can be used, and positioned relative to each other, and to other components of the device, so as to control exposure of at least one component of the device to a particular species, by exploiting the fact that the species may be more highly soluble in one solvent than the other. Techniques described generally above, or other techniques, or any combination, can be used toward this general separation methodology.

As described herein, an electrochemical cell may include an anode having lithium (e.g., lithium metal, a lithium intercalation compound, or a lithium alloy) as the active anode species and a cathode having sulfur as the active cathode species. In these and other embodiments, suitable electrolytes for the lithium batteries can comprise a heterogeneous electrolyte including a first electrolyte solvent (e.g., dioxolane (DOL)) that partitions towards the anode and is favorable towards the anode (referred to herein as an "anode-side electrolyte solvent") and a second electrolyte solvent (e.g., 1,2-dimethoxyethane (DME)) that partitions towards the cathode and is favorable towards the cathode (and referred to herein as an "cathode-side electrolyte solvent"). In some embodiments, the anode-side electrolyte solvent has a relatively lower reactivity towards lithium metal and may be less soluble to polysulfides (e.g., $Li_2S_x$, where x>2) than the cathode-side electrolyte solvent. The cathode-side electrolyte solvent may have a relatively higher solubility towards polysulfides, but may be more reactive towards lithium metal. By separating the electrolyte solvents during operation of the electrochemical cell such that the anode-side electrolyte solvent is present disproportionately at the anode and the cathode-side electrolyte solvent is present disproportionately at the cathode, the electrochemical cell can benefit from desirable characteristics of both electrolyte solvents (e.g., relatively low lithium reactivity of the anode-side electrolyte solvent and relatively high polysulfide solubility of the cathode-side electrolyte solvent). Specifically, anode consumption can be decreased, buildup of insoluble polysulfides (i.e., "slate", lower-order polysulfides such as $Li_2S_x$, where x<3, e.g., $Li_2S_2$ and $Li_2S$) at the cathode can be decreased, and as a result, the electrochemical cell may have a longer cycle life. Furthermore, the batteries described herein may have a high specific energy (e.g., greater than 400 Wh/kg), improved safety, and/or may be operable at a wide range of temperatures (e.g., from −70° C. to +75° C.). Disproportionate presence of one species or solvent, verses another, at a particular location in a cell means that the first species or solvent is present, at that location (e.g., at a surface of a cell electrode) in at least a 2:1 molar or weight ratio, or even a 5:1, 10:1, 50:1, or 100:1 or greater ratio.

As used herein, a "heterogeneous electrolyte" is an electrolyte including at least two different liquid solvents (often-times referred to herein as first and second electrolyte solvents, or anode-side and cathode-side electrolyte solvents). The two different liquid solvents may be miscible or immiscible with one another, although in many aspects of the invention, electrolyte systems include one or more solvents that are immiscible (or can be made immiscible within the cell) to the extent that they will largely separate and at least one can be isolated from at least one component of the cell. A heterogeneous electrolyte may be in the form of a liquid, a gel, or a combination thereof. Specific examples of heterogeneous electrolytes are provided below.

As certain embodiments described herein involve a heterogeneous electrolyte having at least two electrolyte solvents that can partition during operation of the electrochemical cell, one goal may be to prevent or decrease the likelihood of spontaneous solvent mixing, i.e., generation of an emulsion of two immiscible liquids. As described in more detail below, this may be achieved in some embodiments by "immobilizing" at least one electrolyte solvent at an electrode (e.g., an anode) by forming, for example, a polymer gel electrolyte, glassy-state polymer, or a higher viscosity liquid that resides disproportionately at that electrode.

In some embodiments, an anode includes a polymer layer adjacent a multi-layered structure of the anode (e.g., positioned as an outer layer). The polymer layer can, in some instances, be in the form of a polymer gel or a glassy-state polymer. The polymer layer may have an affinity to one electrolyte solvent of a heterogeneous electrolyte such that during operation of the electrochemical cell, a first electrolyte solvent resides disproportionately at the anode, while the a second electrolyte solvent is substantially excluded from the polymer layer and is present disproportionately at the cathode. For example, in the illustrative embodiment of FIG. 1, a first electrolyte solvent may reside predominately at a polymer layer 75 adjacent the anode.

Because the first electrolyte solvent is present closer to the anode, it is generally chosen to have one or more characteristics such as low reactivity to lithium (e.g., enable high lithium cycle-ability), reasonable lithium ion conductivity, and relatively lower polysulfide solubility than the second electrolyte solvent (since polysulfides can react with lithium). The second electrolyte solvent may be present disproportionately at the cathode and, for example, may reside substantially in a separator, a polymer layer adjacent the cathode, and/or in a base electrode material layer of the cathode (e.g., cathode active material layer). For example, in the illustrative embodiment of FIG. 1, a second electrolyte solvent may reside predominately at a polymer layer 80 adjacent the cathode, predominately in the base electrode material layer 55, or in combinations thereof. In some instances, the second electrolyte solvent is essentially free of contact with the anode. The second electrolyte solvent may have characteristics that favor better cathode performance such as high polysulfide solubility, high rate capability, high sulfur utilization, and high lithium ion conductivity, and may have a wide liquid state temperature range. In some cases, the second electrolyte solvent has a higher reactivity to lithium than the first electrolyte solvent. It may be desirable, therefore, to cause the second electrolyte solvent to be present at the cathode (i.e., away from the anode) during operation of the battery, thereby effectively reducing it's concentration, and reactivity, at the anode.

As described above, the first electrolyte solvent of a heterogeneous electrolyte may be present disproportionately at the anode by residing in a polymer layer positioned adjacent a multi-layered structure. Accordingly, the material composition of the polymer layer may be chosen such that the polymer has a relatively higher affinity to (high solubility in) the first electrolyte solvent compared to the second electrolyte solvent. For instance, in some embodiments, the polymer layer is prepared in the form of a gel by mixing a monomer, a first electrolyte solvent, and optionally other components (e.g., a crosslinking agent, lithium salts, etc.) and disposing this mixture on the anode. The monomer can be polymerized by various methods (e.g., using a radical initiator, ultra violet radiation, an electron beam, or catalyst (e.g., an acid, base, or transition metal catalyst)) to form a gel electrolyte. Polymerization may take place either before or after disposing the mixture on the anode. After assembling the other components of the battery, the battery can be filled with the second electrolyte solvent. The second electrolyte solvent may be excluded from the polymer layer (e.g., due to the high affinity of the polymer with the first electrolyte solvent already present in the polymer layer and/or due to immiscibility between the first and second electrolyte solvents). In some instances, the second electrolyte solvent may fill the spaces (e.g., pores) within the separator and/or the cathode. In some embodiments, the cathode can be dried prior to assembly of the battery to facilitate this process. Additionally and/or alternatively, the cathode (e.g., base electrode material layer of the cathode) may include a polymer that has a high affinity for the second electrolyte solvent. The polymer in the base electrode material layer may be in the form of particles. In some cases, the second electrolyte can reside at least partially in a polymer layer positioned adjacent the cathode.

In another embodiment, a polymer layer is formed at the anode and is dried prior to assembly of the battery. The battery can then be filled with a heterogeneous electrolyte including the first and second electrolyte solvents. If the polymer layer is chosen such that it has a higher affinity towards the first electrolyte solvent (and/or the separator and/or cathode may have a higher affinity towards the second electrolyte solvent), at least portions of the first and second electrolyte solvents can partition once they are introduced into the battery. In yet another embodiment, partitioning of the first and second electrolyte solvents can take place after commencement of first discharge of the battery. For example, as heat is produced while operating the battery, the affinity between the polymer layer and the first electrolyte solvent can increase (and/or the affinity between the separator and/or cathode and the second electrolyte solvent can increase). Thus, a greater degree of partitioning of the electrolyte solvents can occur during operation of the battery. Additionally, at lower temperatures, the effect may be irreversible such that the first electrolyte solvent is trapped within the polymer layer, and the second electrolyte solvent is trapped within the pores of the separator and/or cathode. In some cases, the components of the battery (e.g., the polymer layer) may be pretreated (e.g., with heat) prior to use to affect the desired degree of polymer/electrolyte solvent interaction. Other methods of partitioning the electrolyte solvents are also possible.

In another embodiment, the polymer layer is deposited at the anode and the anode (including the polymer layer) is exposed to a first electrolyte solvent. This exposure can cause the first electrolyte solvent to be absorbed in the polymer. The battery can be formed by positioning a cathode adjacent the anode such that the polymer layer is positioned between the anode and cathode. The cathode can then be exposed to a second electrolyte solvent, e.g., such that at least a portion of the second electrolyte solvent is absorbed in the cathode. In other embodiments, the cathode can be exposed to the second electrolyte solvent prior to assembly of the anode and cathode. Optionally, the cathode may include a polymer layer that preferentially absorbs the second electrolyte solvent more than the first electrolyte solvent. In some embodiments, e.g., by choosing appropriate polymer(s) and/or materials used to form the anode and/or cathode, at least portions of the first and second electrolyte solvents can be separated within the battery. For instance, a higher proportion of the first electrolyte solvent may reside at the anode and a higher proportion of the second electrolyte solvent may reside at the cathode.

In yet another embodiment, an electrochemical cell does not include a polymer layer specifically used for partitioning at the anode or the cathode. A separator may include a different composition near the anode side compared to the cathode side of the separator, the anode side having a higher affinity for the first solvent and the cathode side having a higher affinity for the second solvent. Additionally and/or alternatively, the second electrolyte solvent may be present disproportionately at the cathode by, for example, fabricating the cathode such that it contains a component that has a high affinity for the second electrolyte solvent.

In some of the embodiments described herein, a battery may be filled with a heterogeneous electrolyte including first and second electrolyte solvents and partitioning of the electrolyte solvents can occur after commencement of first discharge of the battery, e.g., due to the differential solubility of the polysulfides in the electrolyte solvents. For example, as more polysulfides are generated during operation of the cell, the dissolution of the polysulfides in the more favorable second electrolyte solvent can cause it to become immiscible with the first. Thus, in some embodiments, the first and second electrolyte solvents may be miscible before, but immiscible after, commencement of first discharge of the battery. The second electrolyte solvent containing the dissolved polysulfides may be present disproportionately at the cathode by, for example, embodiments described herein such as having a polymer layer at the anode that preferentially associates with the first electrolyte solvent, and/or a polymer layer at the cathode that preferentially associates with the second electrolyte solvent. In other embodiments, the first and second electrolyte solvents are miscible before commencement of first discharge of the battery, but the electrolyte solvents become immiscible due to heating of the electrolyte solvents during operation of the battery. In yet other embodiments, the first and second electrolyte solvents are immiscible before and after commencement of first discharge of the battery. For instance, the first and second electrolyte solvents may be inherently immiscible at room temperature, as well as during operation of the battery. Advantageously, in some embodiments, two immiscible liquid electrolyte solvents, one present disproportionately and the anode and the other present disproportionately and the cathode, do not cause additional mechanical stress to the battery as a solid membrane may, during electrode volume changes that occur during cell cycling.

As described herein, in some embodiments a polymer that has an affinity for an electrolyte solvent can be dispersed within the cathode (e.g., in a base electrode material layer). For instance, the cathode active material layer may include a polymeric material in powder form incorporated therein. In some cases, the polymeric material is an insoluble component in the cathode layer. For example, the polymeric material may be insoluble in the solvent used to dissolve the cathode active material. The polymer can be obtained, or modified, to have a suitable particle size and dispersed throughout the cathode by incorporation in the cathode slurry. One advantage of incorporating an insoluble polymer with the cathode active material layer is that the polymer can remain as discrete particles that do not coat, adsorb, and/or block the active carbon sites. In other cases, however, the polymeric material can be dissolved, or partially dissolved, as the cathode binder in the cathode layer.

In certain embodiments including one or more polymers dispersed within a layer (e.g., insoluble polymeric particles dispersed in a cathode), the polymers can have any suitable particle size. The average diameter of the polymer particles may be, for example, less than or equal to 100 microns, less than or equal to 70 microns, less than or equal to 50 microns, less than or equal to 30 microns, less than or equal to 15 microns, less than or equal to 10 microns, or less than or equal to 5 microns. Of course, a range of polymer particle sizes may be used. For example, in one embodiment, the polymer particles may have a size of d10=5, d50=12, and d97=55 microns, meaning 10% of the particles were below 5 microns, 50% of the particles below 12 microns, and only 3% of the particles measured above 55 microns.

Suitable polymer materials for partitioning electrolyte solvents may include the polymers described herein, such as those mentioned above regarding suitable polymeric materials for polymer layers (e.g., as part of a multi-layer protective structure).

In some embodiments, a single polymer layer is in contact with an anode or cathode of a battery; however, in other embodiments, more than one polymer layer can be associated with an anode or cathode. For instance, a polymer layer in contact with an anode (or cathode) may be formed of more than one polymer layer coated in sequence. The sequence of polymers may include, for example, a first polymer and a second polymer, the first and second polymers being the same or different. Additional polymers, e.g., fourth, fifth, or sixth polymer layers, can also be used. Each of the polymer layers may optionally include one or more fillers or other components (e.g., crosslinking agents, lithium salts, etc.).

The thickness of a polymer layer may vary, e.g., over a range from about 0.1 microns to about 100 microns. The thickness of the polymer layer may depend on, for example, whether it is positioned adjacent the anode or cathode, whether a separator is also present in the battery, and/or the number of polymer layers in the battery. For instance, the thickness of the polymer layer may be between 0.1-1 microns thick, between 1-5 microns thick, between 5-10 microns thick, between 10-30 microns thick, or between 30-50 microns thick, between 50-70 microns thick, or between 50-100 microns thick. In some embodiments, the thickness of a polymer layer may be no greater than, e.g., 50 microns thick, no greater than 25 microns thick, no greater than 10 microns thick, no greater than 5 microns thick, no greater than 2.5 microns thick, no greater than 1 micron thick, no greater than 0.5 microns thick, or no greater than 0.1 microns thick.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

Suitable cathode active materials for use in the cathode of the electrochemical cells described herein include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments involving Li/S systems, the sulfur-containing material, in its oxidized form, comprises a polysulfide moiety, $S_m$, selected from the group consisting of covalent $-S_m-$ moieties, ionic $-S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In another embodiment, m of the polysulfide moiety, $S_m$, of the sulfur-containing polymer is an integer equal to or greater than 8. In another embodiment, the sulfur-containing material is a sulfur-containing polymer. In another embodiment, the sulfur-containing polymer has a polymer backbone chain and the polysulfide moiety, $S_m$, is covalently bonded by one or both of its terminal sulfur atoms as a side group to the polymer backbone chain. In yet another embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

In other embodiments, an electrochemical cell described herein includes a composite cathode. The composite cathode may include, for example, (a) an electroactive sulfur-containing cathode material, wherein said electroactive sulfur-containing cathode material, in its oxidized state, comprises a polysulfide moiety of the formula $-S_m-$, wherein m is an integer equal to or greater than 3, as described herein; and, (b) an electroactive transition metal chalcogenide composition. The electroactive transition metal chalcogenide composition may encapsulate the electroactive sulfur-containing cathode material. In some cases, it may retard the transport of anionic reduction products of the electroactive sulfur-containing cathode material. The electroactive transition metal chalcogenide composition may comprising an electroactive transition metal chalcogenide having the formula: $M_j Y_k (OR)_l$, wherein M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72. In some embodiments, k and l cannot both be 0.

In order to retard out-diffusion of anionic reduction products from the cathode compartment in the cell, a sulfur-containing cathode material may be effectively separated from the electrolyte or other layers or parts of the cell by a layer of an electroactive transition metal chalcogenide composition. This layer can be dense or porous.

In one embodiment, a cathode includes a mixture of an electroactive sulfur-containing cathode material, an electroactive transition metal chalcogenide, and optionally binders, electrolytes, and conductive additives, which is deposited onto a current collector. In another embodiment, a coating of the electroactive sulfur-containing cathode material is encapsulated or impregnated by a thin coherent film coating of the cation transporting, anionic reduction product transport-retarding, transition metal chalcogenide composition. In yet another embodiment, a cathode includes particulate electroactive sulfur-containing cathode materials individually coated with an encapsulating layer of the cation transporting, anionic reduction product transport-retarding, transition metal chalcogenide composition. Other configurations are also possible.

In one embodiment, a composite cathode includes particulate sulfur-containing cathode materials, generally less than 10 microns in diameter, individually coated with an encapsulating layer of an alkali-metal cation-transporting, yet anionic reduction product transport-retarding electroactive transition metal chalcogenide composition. The particle may have a "core-shell" configuration, e.g., a core of an electroactive sulfur-containing cathode material and an outer shell of a retarding barrier layer comprising an electroactive transition metal chalcogenide. Optionally, the composite cathode may contain fillers comprising various types of binders, electrolytes and conductive materials such as those described herein.

In certain embodiments, the composite cathode is a particulate, porous electroactive transition metal chalcogenide composition, optionally containing non-electroactive metal oxides, such as silica, alumina, and silicates, that is further impregnated with a soluble electroactive sulfur-containing cathode material. This may be beneficial in increasing the energy density and capacity compared with cathodes including electroactive sulfur-containing cathode material (e.g., electroactive organo-sulfur and carbon-sulfur cathode materials) only.

In one set of embodiments, a composite cathode comprises an electroactive sulfur-containing material (e.g., a carbon-sulfur polymer or elemental sulfur); $V_2O_5$; conductive carbon; and a PEO binder.

Additional arrangements, components, and advantages of composite cathodes are described in more detail in U.S. Pub. No.: 2006/0115579, filed Jan. 13, 2006, entitled "Novel composite cathodes, electrochemical cells comprising novel composite cathodes, and processes for fabricating same", which is incorporated herein by reference in its entirety.

Cathodes may further comprise one or more conductive fillers to provide enhanced electronic conductivity. Conductive fillers can increase the electrically conductive properties of a material and may include, for example, conductive carbons such as carbon black (e.g., Vulcan XC72R carbon black, Printex XE2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Other conductive materials known to those of ordinary skill in the art can also be used as conductive fillers. The amount of conductive filler, if present, may be present in the range of 2 to 30% by weight of the cathode active layer. The cathodes may also further comprise other additives including, but not limited to, metal oxides, aluminas, silicas, and transition metal chalcogenides.

Cathodes may also comprise a binder. The choice of binder material may vary widely so long as it is inert with respect to the other materials in the cathode. In some embodiments, the binder material may be a polymeric material. Examples of polymer binder materials include, but are not limited to, polyvinylidene fluoride (PVDF)-based polymers, such as poly(vinylidene fluoride) (PVDF), $PVF_2$ and its co- and terpolymers with hexafluoroethylene, tetrafluoroethylene, chlorotrifluoroethylene, poly(vinyl fluoride), polytetrafluoroethylenes (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene-propylene-diene (EPDM) rubbers, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) and polyethylene oxides (PEO). In one set of embodiments, the binder material is poly(ethylene-co-propylene-co-5-methylene-2-norbornene) (EPMN), which may be chemically neutral (e.g., inert) towards cell components, including polysulfides. UV curable acrylates, UV curable methacrylates, and heat curable divinyl ethers can also be used. The amount of binder, if present, may be present in the range of 2 to 30% by weight of the cathode active layer.

In some embodiments, an electrode described herein comprises a conductive porous support structure and a plurality of particles comprising sulfur (e.g., as an active species) substantially contained within the pores of the support structure. The inventors have unexpectedly discovered that, in some embodiments, the sizes of the pores within the porous support structure and/or the sizes of the particles within the pores can be tailored such that the contact between the electrolyte and the sulfur is enhanced, while the electrical conductivity and structural integrity of the electrode are maintained at sufficiently high levels to allow for effective operation of the cell. Also, the sizes of the pores within the porous support structures and/or the sizes of the particles within the pores can be selected such that any suitable ratio of sulfur to support material can be achieved while maintaining mechanical stability in the electrode. The inventors have also unexpectedly discovered that the use of porous support structures comprising certain materials (e.g., metals such as nickel) can lead to relatively large increases in cell performance. In some embodiments, methods for forming particles comprising electrode active material (e.g., comprising sulfur) within pores of a porous support structure allow for a desired relationship between the particle size and pore size. The sizes of the pores within the porous support structure and/or the sizes of the particles within the pores can also be tailored such that the resulting electrode is able to withstand the application of an anisotropic force, while maintaining the structural integrity of the electrode. Benefits of the application of such forces are described elsewhere herein.

In developing the systems and methods described herein, the inventors have identified several challenges associated with producing electrodes comprising sulfur. First, sulfur possesses a relatively low electrical conductivity (e.g., about $5.0 \times 10^{-14}$ S cm$^{-1}$ for elemental sulfur), which can inhibit the electrical conductivity of the electrode and hence, cell performance. In addition, small particle sulfur, which can be useful in producing uniform thickness and high surface-area electrodes, can be difficult to produce using traditional mechanical milling, as the particles that are produced can quickly re-agglomerate. Moreover, high surface area carbon, which can yield relatively high specific capacity and cycle life, can be difficult to process as a traditional slurry because it possesses a high absorption stiffness resulting in a slurry with a relatively low amount of solids. Finally, traditional slurry processing of sulfur-containing electrode materials can lead to re-distribution of the slurry components, which can produce uneven porosity within the cathode and decreased anode utilization. The inventors have unexpectedly discovered that these traditional disadvantages can be overcome by disposing particles comprising sulfur within the pores of a support material to produce an electrode that includes relatively uniform porosity, particle size, and component distribution.

The porous structures described herein, as well as other components and arrangements described herein, can be used in electrochemical cells for a wide variety of devices, such as, for example, electric vehicles, load-leveling devices (e.g., for solar- or wind-based energy platforms), portable electronic devices, and the like. In some cases, the porous structures described herein may be particularly useful as electrodes in secondary batteries (i.e., rechargeable batteries) such as lithium-sulfur (L-S) batteries.

As used within the context of such porous support structures and the resulting electrodes, a pore is measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g. closed cells) are not considered pores within the context of the set of embodiments dealing with porous support structures. In the context of porous support structure embodiments, it should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores within a porous support structure may comprise any suitable cross-sectional shape such as, for example, circular, elliptical, polygonal (e.g., rectangular, triangular, etc.), irregular, and the like.

A porous support structure can comprise any suitable form. In some instances, the porous support structure can comprise a porous agglomeration of discreet particles, within which the particles can be porous or non-porous. For example, the porous support structure might be formed by mixing porous or non-porous particles with a binder to form a porous agglomeration. Electrode active material might be positioned within the interstices between the particles and/or the pores within the particles (in cases where porous particles are employed) to form the inventive electrodes described herein.

In some embodiments, the porous support structure can be a "porous continuous" structure. A porous continuous structure, as used herein, refers to a continuous solid structure that contains pores within it, with relatively continuous surfaces between regions of the solid that define the pores. Examples of porous continuous structures include, for example, a piece of material that includes pores within its volume (e.g., a porous carbon particle, a metal foam, etc.). One of ordinary skill in the art will be capable of differentiating between a porous continuous structure and, for example, a structure which is not a porous continuous structure but which is a porous agglomeration of discreet particles (where the interstices and/or other voids between the discrete particles would be considered pores) by, for example, comparing SEM images of the two structures.

In certain embodiments, a porous structure is formed, at least in part, by using a sacrificial filler material, as describe in more detail herein.

The porous support structure may be of any suitable shape or size. For example, the support structure can be a porous continuous particle with any suitable maximum cross-sectional dimension (e.g., less than about 10 mm, less than about 1 mm, less than about 500 microns, etc.). In some cases, the porous support structure (porous continuous or otherwise) can have a relatively large maximum cross-sectional dimension (e.g., at least about 500 microns, at least about 1 mm, at least about 10 mm, at least about 10 cm, between about 1 mm and about 50 cm, between about 10 mm and about 50 cm, or between about 10 mm and about 10 cm). In some embodiments, the maximum cross-sectional dimension of a porous support structure within an electrode can be at least about 50%, at least about 75%, at least about 90%, at least about 95%, at least about 98%, or at least about 99% of the maximum cross sectional dimension of the electrode formed using the porous continuous structure.

In some embodiments, the support structure can be an article with one relatively thin dimension relative to the other two, such as, for example, a film. For example, the support structure can be an article with a thickness of less than about 1 mm, less than about 500 microns, less than about 100 microns, between about 1 micron and about 5 mm, between about 1 micron and about 1 mm, between about 10 microns and about 5 mm, or between about 10 microns and about 1 mm, and a width and/or length at least about 100, at least about 1000, or at least about 10,000 times greater. As used herein, the "maximum cross-sectional dimension" of an article (e.g., a porous support structure) refers to the largest distance between two opposed boundaries of an article that may be measured. Porous support structures described herein may also be of any suitable shape. For example, the support structure can be spherical, cylindrical, or prismatic (e.g., a triangular prism, rectangular prism, etc.). In some cases, the morphology of the support structure may be selected such that the support structure can be relatively easily integrated into an electrode for use in, for example, an electrochemical cell. For example, the support structure may comprise a thin film upon which additional components of an electrochemical cell (e.g., an electrolyte, another electrode, etc.) can be formed.

In some cases, porous particles can be used as a porous continuous structure. In some such embodiments, material (e.g., electrode active material) can be deposited within the pores of the particles, and the particles can be used to form an electrode. For example, porous particles containing electrode active material within their pores might be bound together (e.g., using binder or other additives) to form a composite electrode. Exemplary processes for forming such composite electrodes are described, for example, in U.S. Pub. No.: 2006/0115579, filed Jan. 13, 2006, entitled "Novel composite cathodes, electrochemical cells comprising novel composite cathodes, and processes for fabricating same", which is incorporated herein by reference in its entirety.

In some embodiments, the porous support structure might comprise a relatively large-scale porous continuous structure that, unlike the porous particles described above, is sized and shaped to serve as an electrode. Such structures can be formed of a variety of materials such as, for example, metals (e.g., a metal foam), ceramics, and polymers. Examples of such materials are described in more detail below. In some embodiments, the maximum cross-sectional dimension of a porous continuous structure within an electrode can be at least about 50%, at least about 75%, at least about 90%, at least about 95%, at least about 98%, or at least about 99% of the maximum cross sectional dimension of the electrode formed using the porous continuous structure.

The use of such relatively large porous continuous structures can, in some embodiments, ensure that little or no binder is located within the electrode because binder would not be required to hold together small particles to form the porous support structure. In some embodiments, the electrode can include less than about 20 wt %, less than about 10 wt %, less than about 5 wt %, less than about 2 wt %, less than about 1 wt %, or less than about 0.1 wt % binder. In this context, "binder" refers to material that is not an electrode active material and is not included to provide an electrically conductive pathway for the electrode. For example, an electrode might contain binder to facilitate internal cohesion within the cathode.

The porous support structure may comprise any suitable material. In some embodiments, the porous support structure can be used as an electrical conductor within the electrode (e.g., as an electrolyte-accessible conductive material). Accordingly, the porous support structure may comprise an electrically conductive material. Examples of electrically conductive materials that may be suitable for use include, but are not limited to, metals (e.g., nickel, copper, aluminum, iron, or any other suitable metal or combination in pure or alloyed form), carbon (e.g., graphite, carbon black, acetylene black, carbon fibers, carbon nanofibers, hallow carbon tubes, graphene, carbon filaments, etc.), electrically conductive polymers, or any other suitable electrically conductive material. In some embodiments, the bulk of the porous support structure may be formed from an electrically conductive material. In some cases, the porous support structure may comprise an electrically non-conductive material that is at least partially coated (e.g., via solution-based deposition, evaporative deposition, or any other suitable technique) with a conductive material. In some embodiments, the porous support structure may comprise a glass (e.g., silicon dioxide, amorphous silica, etc.), a ceramic (e.g., aluminum oxide, tin oxide, vanadium oxide aerogel, etc.), a semiconductor (e.g., silicon, germanium, gallium arsenide, etc.), non-conductive polymers, and the like.

The porous support structure may comprise pores with a size distribution chosen to enhance the performance of the electrochemical cell. In some cases, the porous support structure may comprise pores than are larger than sub-nanometer scale and single-nanometer scale pores, which can be too small to allow for the passage of electrolyte (e.g., liquid electrolyte) into the pores of the electrode due to, for example, capillary forces. In addition, in some cases, the pores may be smaller than millimeter-scale pores, which may be so large that they render the electrode mechanically unstable. In some embodiments, the porous support structure can comprise a plurality of pores, wherein each pore of the plurality of pores has a pore volume, and the plurality of pores has a total pore volume defined by the sum of each of the individual pore volumes. In some embodiments, at least about 50%, at least about 70%, at least about 80%, at least about 90%, at least about 95%, at least about 99%, or substantially all of the total pore volume is occupied by pores having cross-sectional diameters of between about 0.1 microns and about 20 microns or between about 0.1 microns and about 10 microns. In some embodiments, at least about 50%, at least about 70%, at least about 80%, at least about 90%, at least about 95%, at least about 99%, or substantially all of the total pore volume is occupied by pores having cross-sectional diameters of between about 1 micron and about 10 microns, or between about 1 micron and about 3 microns. Stated another way, in some embodiments, the plurality of pores of the porous support structure together defines a total pore volume, and at least about 50% (or at least about 70%, at least about 80%, at least about 90%, at least about 95%, at least about 99%, or substantially all) of the total pore volume is defined by pores having cross-sectional diameters of between about 0.1 microns and about 10 microns (or between about 0.1 microns and about 20 microns, between about 1 micron and about 10 microns, or between about 1 micron and about 3 microns).

In some embodiments, it may be advantageous to use porous materials wherein the plurality of pores has an average cross-sectional diameter within a designated range. For example, in some cases, the porous support material may comprise a plurality of pores wherein the average cross-sectional diameter of the plurality of pores is between about 0.1 microns and about 20 microns, between about 0.1 microns and about 10 microns, between about 1 micron and about 10 microns, or between about 1 micron and about 3 microns.

As described below, the pore distributions described herein can be achieved, in some cases, while an anisotropic force (e.g., defining a pressure of between about 4.9 Newtons/cm$^2$ and about 198 Newtons/cm$^2$, or any of the force application ranges outlined herein) is applied to the electrochemical cell. This can be accomplished by fabricating the porous support structure from materials (e.g., metals, ceramics, polymers, etc.) capable of maintaining their porosities under applied loads. Fabricating an electrode from a material which resists deformation under an applied load can allow the electrode to maintains its permeability under pressure, and allows the cathode to maintain the enhanced rate capabilities described herein. In some embodiments, the yield strength of the porous support structure (and the resulting electrode produced from the porous support structure) can be at least about 200 Newtons/cm$^2$, at least about 350 Newtons/cm$^2$, or at least about 500 Newtons/cm$^2$. Methods of fabricating such structures are described in more detail below.

As used herein, the "cross-sectional diameter" of a pore refers to a cross-sectional diameter as measured using ASTM Standard Test D4284-07. The cross-sectional diameter can refer to the minimum diameter of the cross-section of the pore. The "average cross-sectional diameter" of a plurality of pores refers to the number average of the cross-sectional diameters of each of the plurality of the pores.

One of ordinary skill in the art would be capable of calculating the distribution of cross-sectional diameters and the average cross-sectional diameter of the pores within a porous structure using mercury intrusion porosimetry as described in ASTM standard D4284-92, which is incorporated herein by reference in its entirety. For example, the methods described in ASTM standard D4284-92 can be used to produce a distribution of pore sizes plotted as the cumulative intruded pore volume as a function of pore diameter. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM standard D4284-92, porosimetry measurements may be supplemented using BET surface analysis, as described, for example, in S. Brunauer, P. H. Emmett, and E. Teller, *J. Am. Chem. Soc.,* 1938, 60, 309, which is incorporated herein by reference in its entirety.

In some embodiments, the porous material may comprise pores with relatively uniform cross-sectional diameters. Not wishing to be bound by any theory, such uniformity may be useful in maintaining relatively consistent structural stability throughout the bulk of the porous material. In addition, the ability to control the pore size to within a relatively narrow range can allow one to incorporate a large number of pores that are large enough to allow for fluid penetration (e.g., electrolyte penetration) while maintaining sufficiently small pores to preserve structural stability of the porous material. In some embodiments, the distribution of the cross-sectional diameters of the pores within the porous material can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

The electrodes described herein can also comprise a material substantially contained within the pores of the porous support structure. A material that is said to be "substantially contained" within a pore is one that at least partially lies within the imaginary volume defined by the outer boundaries of the pore. For example, a material substantially contained within a pore can be fully contained within the pore, or may only have a fraction of its volume contained within the pore, but a substantial portion of the material, overall, is contained within pores. In one set of embodiments, material (e.g., material comprising sulfur) is provided, at least 30% of which by mass is contained within pores of a porous support structure. In other embodiments, at least 50%, 70%, 80%, 85%, 90%, or 95% by mass of the material is contained within the pores of the support structure.

The material within the support structure can comprise, in some cases, particles, which may be substantially solid or porous. In some embodiments, the material substantially contained within the pores may comprise isolated particles or agglomerated particles. In some embodiments, the material may comprise a film (which may be substantially solid or porous) on at least a portion of the pores within the support structure. In some embodiments, the material may substantially fill at least a portion of the pores within the support structure, such that the material assumes the shape and/or size of the portion of the pores.

The material within the support structure may comprise, in some cases, an electrode active material such as those described herein. In some embodiments, the electrodes described herein may comprise a relatively large amount of material comprising electrode active material within the pores of the porous support. For example, in some embodiments, the electrode (e.g., cathode, especially a base electrode material layer of the cathode) may comprise at least about 20 wt %, at least about 35 wt %, at least about 50 wt %, at least about 65 wt %, or at least about 75 wt % material comprising electrode active material, such as the electroactive sulfur-containing materials described herein.

While sulfur, as the active electrode species, is described predominately, it is to be understood that wherever sulfur is described as the active electrode species herein, any suitable electrode active species may be used. Those of ordinary skill in the art will appreciate this and will be able to select species (e.g., from the list described below) for such use.

In embodiments in which the material within the pores comprises particles (e.g., particles of electrode active material), the particles can be of any suitable shape. For example, in some embodiments, the particles may be substantially spherical. In some cases, a particle can be similar in shape to the pore it occupies (e.g., cylindrical, prismatic, etc.).

The size of the particles (e.g., particles of electrode active material) within the pores of the porous support structure can be selected to enhance the performance of the electrochemical cell. In some embodiments, each particle of the plurality of particles within the pores of the porous support structure has a particle volume, and the plurality of particles has a total particle volume defined by the sum of each of the individual particle volumes. In addition, in some embodiments, each particle of the plurality of particles within the pores of the porous support structure has a maximum cross-sectional dimension. In some instances, at least about 50%, at least about 70%, at least about 80%, at least about 90%, at least about 95%, at least about 99%, or substantially all of the total particle volume within the pores of the porous support structure is occupied by particles having maximum cross-sectional dimensions of between about 0.1 microns and about 10 microns. In some embodiments, at least about 50%, at least about 70%, at least about 80%, at least about 90%, at least about 95%, at least about 99%, or substantially all of the total particle volume within the pores of the porous support structure is occupied by particles having maximum cross-sectional dimensions of between about 1 micron and about 10 microns, or between about 1 micron and about 3 microns. Stated another way, in some embodiments, the plurality of particles together defines a total quantity of particulate material, and at least about 50% (or at least about 70%, at least about 80%, at least about 90%, at least about 95%, at least about 99%, or substantially all) of the total quantity of particulate material is made up of particles having maximum cross-sectional dimensions of between about 0.1 microns and about 10 microns (or between about 1 micron and about 10 microns, or between about 1 micron and about 3 microns).

In some embodiments, the particles of material (e.g., electrode active material) within the porous support structure may have an average maximum cross-sectional dimension within a designated range. For example, in some cases, the particles of material (e.g., electrode active material) within the porous support structure can have an average maximum cross-sectional dimension of between about 0.1 microns and about 10 microns, between about 1 micron and about 10 microns, or between about 1 micron and about 3 microns. In some embodiments, the ratio of the average maximum cross-sectional dimension of the particles of material within the porous support structure to the average cross-sectional diameter of the pores within the porous support structure can be between about 0.001:1 and about 1:1, between about 0.01:1 and about 1:1, or between about 0.1:1.

In some embodiments, particles within the pores of the porous support structure can have relatively uniform maximum cross-sectional dimensions. Not wishing to be bound by any theory, such uniformity may be useful in producing relatively consistent performance along a surface of an electrode comprising electrode active material particles. In some embodiments, the distribution of the cross-sectional dimensions of the pores within the porous material can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated, and expressed as a percentage relative to an average, as described above.

In some embodiments, the material (e.g., particles) within the pores of the porous support structure may occupy a relatively large percentage of the pore volume. For example, in some embodiments, the material within the porous support structure (e.g., particles comprising an electrode active material) can occupy at least about 10%, at least about 20%, at least about 35%, at least about 50%, at least about 70%, or more of the accessible pore volume of the porous support structure. As used herein, the "accessible pore volume" is consistent with the above definition of a pore and refers to the percentage of the pore volume that is exposed to the external environment surrounding a porous article, as opposed to pore volume that is completely enclosed by the material forming the porous article. The volume occupied by material within the pores should be understood to include an imaginary volume that surrounds the outer boundaries of the material (e.g., particles) within the pores, which may include material (e.g. particle) void volume in cases where the material within the pores is itself porous. One of ordinary skill in the art is capable of calculating the percentage of accessible pore volume, for example, using mercury intrusion porosimetry measurements according to ASTM Standard Test D4284-07, optionally supplemented by BET surface analysis. The percentage of accessible pore volume within a porous article that is occupied by particles can be calculated, for example, by performing mercury intrusion porosimetry measurements (optionally with BET surface analysis) of the porous article before and after the particles are positioned within the pores. When the material inside the pores of the support structure is itself porous, mercury intrusion porosimetry measurements (with optional BET surface analysis) may be supplemented with visual analysis of SEM micrographs to determine the volume occupied by the material (e.g., particles) within the pores.

The electrodes comprising the porous support structure may comprise a relatively high percentage of electrode active material (e.g., sulfur), in some cases. In some embodiments, the electrodes comprising the porous support structure can comprise, for example, at least about 20 wt %, at least about 30 wt %, at least about 40 wt %, or more electrode active material. It should be understood that, for the purposes of calculating the amount of electrode active material within an electrode, only the weight of the electrode active species is counted. For example, in cases where electroactive sulfur-containing materials such as polysulfides or organic materials comprising sulfur, only the sulfur content of the electroactive sulfur-containing materials is counted in determining the percentage of electrode active material within the electrode. In some embodiments, the electrodes comprising the porous support structure can comprise at least about 20 wt %, at least about 30 wt %, at least about 40 wt %, or more sulfur.

Electrodes described herein may have high sulfur loading, relative to known cells. In some embodiments, the electrode (e.g., a base electrode material layer of an electrode) has a sulfur loading of at least 1.0 mg S/cm$^2$, at least 1.1 mg S/cm$^2$, at least 1.2 mg S/cm$^2$, at least 1.3 mg S/cm$^2$, at least 1.4 mg S/cm$^2$, at least 1.5 mg S/cm$^2$ (e.g., 1.6 mg S/cm$^2$), at least 2.5 mg S/cm$^2$, at least 5.0 mg S/cm$^2$, or, in some cases, greater.

In an illustrative embodiment, the electrode (e.g., a base electrode material layer of an electrode) may have a sulfur loading of 4.3 mg/cm$^2$ and thickness of less than or equal to about 200 microns, less than or equal to about 150 microns, less than or equal to about 100 microns, less than or equal to about 75 microns, less than or equal to about 50 microns, or less than or equal to about 30 microns.

The electrodes described herein can comprise any suitable weight ratio of electrode active material and support material (e.g., any suitable ratio of sulfur to carbon). For example, in some embodiments, the electrode can comprise a weight ratio of sulfur to carbon of at least about 1:1, at least about 2:1, at least about 3:1, at least about 4:1, at least about 5:1, or at least about 6:1. In some embodiments, the electrode can comprise a weight ratio of sulfur to carbon of less than about 6:1, less than about 5:1, less than about 4:1, less than about 3:1, less than about 2:1, or less than about 1:1.

In some cases, the concentration of the electrode active material (e.g., sulfur within a cathode) can be relatively consistent across one or more surfaces of the electrode, or across any cross-section of the electrode. In some embodiments, at least about 50%, at least about 75%, at least about 85%, at least about 90%, at least about 95%, or at least about 98% of the area of the surface of an electrode (e.g., cathode) defines a uniform area that includes a uniform distribution of electrode active material (e.g., sulfur). In some embodiments, at least about 50%, at least about 75%, at least about 85%, at least about 90%, at least about 95%, or at least about 98% of the area of a surface of a cross-section substantially perpendicular to the thickness of an electrode (e.g., a cathode) defines a uniform area that includes a uniform distribution of electrode active material (e.g., sulfur). In this context, a "surface of an electrode" refers to the geometric surface of the electrode, which will be understood by those of ordinary skill in the art to refer to the surface defining the outer boundaries of the electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.). In addition, a "cross-section of an electrode" defines an approximate plane viewed by cutting (actually or theoretically) the electrode to expose the portion one wishes to analyze. After the electrode has been cut to observe the cross-section, the "surface of the cross-section of the electrode" corresponds to the exposed geometric surface. Stated another way, "surface of an electrode" and "surface of the cross-section of the electrode" refer, respectively, to the geometric surface of the electrode and the geometric surface of a cross-section of the electrode.

In some embodiments, an electrode active material (e.g., sulfur) is uniformly distributed when any continuous area that covers about 10%, about 5%, about 2%, or about 1% of the uniform area (described in the preceding paragraphs) includes an average concentration of the electrode active material (e.g., sulfur) that varies by less than about 25%, less than about 10%, less than about 5%, less than about 2%, or less than about 1% relative to the average concentration of the electrode active material (e.g., sulfur) across the entirety of the uniform area. In this context, the "average concentration" of an electrode active material refers to the percentage of the surface area of the electrode (e.g., exposed surface area, surface area of a cross section of the electrode) that is occupied by electrode active material when the electrode is viewed from an angle substantially perpendicularly to the electrode.

One of ordinary skill in the art would be capable of calculating average electrode active material concentrations within a surface or a cross-section of an electrode, and the variance in concentrations, by analyzing, for example, X-ray spectral images of an electrode surface or cross-section. For example, one could obtain an x-ray spectral image of an electrode surface or cross-section (e.g., by physically slicing the electrode to produce the cross-section), such as the images shown in FIG. E6A-E6C. To calculate the average concentration of sulfur over a given area in such an image, one would determine the percentage of the image that is occupied by the color corresponding to sulfur over that area. To determine whether the average concentration within a sub-area varies by more than X % relative to the average concentration within a larger area, one would use the following formula:

$$\text{Variance}(\%) = \left| \frac{C_L - C_{sub}}{C_L} \right| \cdot 100\%$$

wherein $C_L$ is the average concentration within the larger area (expressed as a percentage), $C_{sub}$ is the average concentration within the sub-area (expressed as a percentage). As a specific example, if the average concentration of the electrode active material within a sub-area is 12%, and the average concentration of the electrode active material within a larger area is 20%, the variance would be 40%.

Stated another way, in some embodiments, at least about 50% (or at least about 75%, at least about 85%, at least about 90%, at least about 95%, or at least about 98%) of the area of the surface of the electrode (or of a cross-section of the electrode) defines a first, continuous area of essentially uniform sulfur distribution, the first area having a first average concentration of sulfur. In some cases, any continuous area that covers about 10% (or about 5%, about 2%, or about 1%) of the first, continuous area of the surface of the electrode (or of the cross section of the electrode) includes a second average concentration of sulfur that varies by less than about 25% (or less than about 10%, less than about 5%, less than about 2%, or less than about 1%) relative to the first average concentration of sulfur across the first, continuous area.

Porous support structures (and resulting electrodes) can be fabricated using a variety of methods. For example, in some embodiments, particles can be suspended in a fluid, and the fluid can be subsequently removed (e.g., via heat drying, vacuum drying, filtration, etc) to produce the porous support structure in which the particles are adhered to each other. As mentioned above, in some cases, a binder can be used to adhere particles to form a composite porous support structure.

In some embodiments, porous support structures can be fabricated by heating individual particles of a material until the particles are altered to form a porous support structure (e.g., a porous continuous structure). In some embodiments, particles (e.g., metallic particles, ceramic particles, glass particles, etc.) can be arranged such that they are in contact with each other, with interstices located between the particles. The particles can then be sintered to form a fused structure in which the interstices between the particles constitute the pores in the sintered structure. As used herein, "sintering" is given its normal meaning in the art, and is used to refer to a method for making objects from particles, by heating the particles below their melting point until the particles adhere to each other. The total porosity, size of the pores, and other properties of the final structure could be controlled by selecting appropriate particles sizes and shapes, arranging them to form a desired packing density prior to sintering, and selecting appropriate sintering conditions (e.g., heating time, temperature, etc.).

In some cases, particles (e.g., polymeric particles, metallic particles, glass particles, ceramic particles, etc.) particles arranged such that they are in contact with each other can be heated such that the particles melt to form a porous continuous structure. The interstices of the original structure can form the pores of the porous continuous structure in some such embodiments. The total porosity, size of the pores, and other properties of the final structure could be controlled by selecting appropriate particles sizes and shapes, arranging them to form a desired packing density prior to heating, and selecting appropriate heating conditions (e.g., heating time, temperature, etc.).

In some embodiments, the particles can be controllably arranged prior to melting or sintering. For example, in some cases in which the particles are used to form a porous layer, it can be advantageous to arrange the particles such that they are distributed relatively evenly and relatively flatly against a substrate. This can be achieved, for example, by suspending the particles in a solvent that is volatile (e.g., at room temperature), and pouring the solvent onto the substrate on which the porous structure is to be formed. After the particle solvent is deposited, the volatile solvent can be allowed to evaporate, leaving behind a relatively well-ordered array of particles.

The sintering and/or melting processes described herein can be carried out in a controlled atmosphere, in some cases. For example, the volume in which melting or sintering is performed can be filled with a relatively inter gas (e.g., nitrogen, argon, helium, and the like), in some cases. In some instances, the melting and/or sintering can be carried out in the substantial absence of oxygen, which can reduce or eliminate oxidation and/or combustion of the material used to form the porous support structure. In some embodiments, a reducing atmosphere (e.g., forming gas with the balance nitrogen and/or argon, hydrogen, or the like) can be used to reduce the final oxygen content of the sintered and/or melted article.

The sintering and/or melting temperature can be selected based upon the material being used to form the porous support structure. For example, when melting particles to form the porous support structure, the heating temperature can be selected such that it is above the melting temperature of the material from which the particles are made. One of ordinary skill in the art would be capable of selecting an appropriate sintering temperature, based upon the type of material being sintered. For example, suitable sintering temperatures for nickel might be between about 700° C. and about 950° C.

As mentioned above, the sizes and shapes of the particles used to form the porous support structure can be selected to achieve a desired porosity. In some embodiments, the particles can be substantially spherical, although particles with other cross-sectional shapes (e.g., ellipses, polygons (e.g., rectangles, triangles, squares, etc.), irregular, etc.) can also be used. The particles can be relatively small (e.g., in the form of a powder), in some embodiments. For example, in some cases, at least about 50%, at least about 70%, at least about 80%, at least about 90%, at least about 95%, at least about 99%, or substantially all of the particles have maximum cross-sectional dimensions of between about 0.5 microns and about 20 microns, between about 1 micron and about 5 microns, between about 1 micron and about 3 microns, or between about 3 microns and about 5 microns. Such particle sizes can be useful in producing porous support structures with the advantageous porosity properties described elsewhere in this application.

In some embodiments, the porous support structure can be formed by combining a first material with a second material, and forming the pores of the support structure by removing one of the materials from the mixture. Removing one of the materials from the mixture can leave behind voids which ultimately form the pores of the porous support structure. In some cases, the structure of the non-removed material can be substantially maintained while one or more of the materials within the mixture is removed. For example, in some cases, the support structure material (e.g., a metal, ceramic, glass, polymer, etc. which might be melted) or a precursor to the support structure material (e.g., which might be converted to form the material of the porous support structure via, for example, a reaction (e.g., polymerization, precipitation, etc.)), can be mixed with a plurality of templating entities. The templating entities can be arranged such that they form an interconnected network within the support structure material or precursor. After the templating entities have been arranged within the support structure material, they can be removed from the support structure material to leave behind pores. The support structure material can be hardened before the templating entities are removed and/or during the removal of the templating entities. As used herein, the term "hardened" is used to refer to the process of substantially increasing the viscosity of a material, and is not necessarily limited to solidifying a material (although in one set of embodiments, a porous support structure material is hardened by converting it into a solid). A material can be hardened, for example, by gelling a liquid phase. In some instances, a material can be hardened using polymerization (e.g., IR- or UV-induced polymerization). In some cases, a material can being hardened can go through a phase change (e.g., reducing the temperature of a material below its freezing point or below its glass transition temperature). A material may also be hardened by removing a solvent from a solution, for example, by evaporation of a solvent phase, thereby leaving behind a solid phase material.

The templating entities can be of any suitable phase. In some cases, the templating entities can be solid particles. For example, the templating entities might comprise silica particles, which can be dissolved out of a porous structure using, for example, hydrofluoric acid. As another example, the templating entities might comprise ammonium bicarbonate, which can be removed by dissolving it in water. In some embodiments, the templating entities can comprise fluid (e.g., liquid and/or gas) bubbles.

The templating entities can also have any suitable shape, regular or irregular, including, but not limited to, spheres, cubes, pyramids, or a mixture of these and/or other shapes. The templating entities may also each be formed of any suitable size. In some embodiments, the templating entities may have an average maximum cross-sectional dimension roughly equivalent to the size of the desired pores within the porous support structure.

As a specific example, a metallic porous support structure can be fabricated using metal injection molding. In an exemplary process, a "green" of metal particles, binder, and templating entities can be formed into a suitable structure (e.g., a relatively thin sheet) via injection molding. As the green is heated, the metal particles can be melted or sintered together while the binder and templating entities can be burned off, leaving behind a series of pores.

Porous ceramic structures can also be produced using a templating methods. For example, in some cases, a ceramic foam can be produced by including ceramic particles and templating entities within a polyaphron solution (i.e., a bi-liquid foam). The resulting mixture can be used in a sol gel solution, which can form a stable emulsion with the use of, for example, appropriate surfactants. Once the gel has been hardened, the templating entities can be removed by heat treatment. The size of the polyaphrons can be controlled by varying the type and amount of the surfactants in the bi-liquid foam.

Templating methods can also be used to produce porous polymeric structures. For example, a plurality of solid particles might be dispersed within a monomer solution. After the monomer is polymerized to form a polymer, the solid particles can be selectively dissolved out of the mixture to leave behind a series of pores within the rest of the polymeric structure.

Another method that might be used to produce the porous support structures described herein includes 3D printing. 3D printing is known to those of ordinary skill in the art, and refers to a process by which a three dimensional object is created by shaping successive layers, which are adhered on top of each other to form the final object. 3D printing can be used with a variety of materials, including metals, polymers, ceramics, and others.

A variety of materials (e.g., in particle form, in melt form, or other forms mentioned herein) can be used to form the porous support structure. The material used to form all or part of the porous support structure can include a metal or a metal alloy, in some embodiments. Suitable metals include, but are not limited to, nickel, copper, magnesium, aluminum, titanium, scandium, and alloys and/or combinations of these. In some embodiments, the metal or metal alloy from which the particles are formed can have a density of less than about 9 g/cm$^3$ or less than about 4.5 g/cm$^3$.

In some embodiments, a polymeric material can be used to form all or part of the porous support structure. Suitable polymers for use in forming porous support structures include, but are not limited to, polyvinyl alcohol (PVA), phenolic resins (novolac/resorcinol), lithium polystyrenesulfonate (LiPSS), epoxies, UHMWPE, PTFE, PVDF, PTFE/vinyl copolymers, co-polymers/block co-polymers of the above and others. In some embodiments, two polymers can be used for their unique funcionalities (e.g. PVA for adhesion, and LiPSS for rigidity, or resorcinol for rigidity and an elastomer for flexibility/toughness). The material used to form the porous support structure might include one or more conductive polymers such as, for example, poly(3,4-ethylenedioxythiphene) (PEDOT), poly(methylenedioxythiophene) (PMDOT), other thiophenes, polyaniline (PANI), polypyrrole (PPy). Those of ordinary skill in the art would be capable of selecting a counter ion for a conductive polymer system, which can be selected from a variety of chemical species such as PSS for PEDOT, other well known conductive polymers, and co and block co-polymers as above.

A ceramic material might be used to form all or part of a porous support structure, in some instances. Suitable ceramics include, but are not limited to, oxides, nitrides, and/or oxynitrides of aluminum, silicon, zinc, tin, vanadium, zirconium, magnesium, indium, and/or alloys thereof. In some cases, the porous support structure can include any of the oxides, nitrides, and/or oxynitrides above doped to impart desirable properties, such as electrical conductivity; specific examples of such doped materials include tin oxide doped with indium and zinc oxide doped with aluminum. The material used to form the porous support structure can comprise glass (e.g., quartz, amorphous silica, chalcogenides, and/or other conductive glasses) in some embodiments. The porous support structure can include, in some cases, aerogels and/or xero gels of any of the above materials. In some cases, the porous support structure can include a vitreous ceramic.

In some embodiments in which the bulk of the porous support structure is made of a material that is substantially electrically non-conductive, electrically conductive material can be deposited within the pores of the support structure to impart electrical conductivity. For example, the bulk of the porous support structure might comprise a ceramic (e.g., glass) or an electrically non-conductive polymer, and a metal might be deposited within the pores of the support structure. The electrically conductive material can be deposited, for example, via electrochemical deposition, chemical vapor deposition, or physical vapor deposition. In some cases, after the deposition of the electrically conductive material, an electrode active material can be deposited within the pores of the porous support structure. Suitable materials for placement within the pores of the porous support structure to impart electrical conductivity include, but are not limited to carbon and metals such as nickel and copper, and combinations of these.

The bulk of the porous support structure can be made electrically conductive, in some embodiments, by incorporating one or more electrically conductive materials into the bulk of the porous support structure material. For example, carbon (e.g., carbon black, graphite or graphene, carbon fibers, etc.), metal particles, or other electrically conductive materials might be incorporated into a melt (e.g., a non-conductive polymeric melt, a glass melt, etc.) which is used to form a polymeric porous support structure to impart electrical conductivity to the porous support structure. After the melt is hardened, the electrically conductive material can be included within the bulk of the porous support structure.

The mechanical properties of the porous support structure can also be enhanced by incorporating materials that structurally reinforce the porous support structure into the bulk of the porous support structure. For example, carbon fibers and/or particulate fillers can be incorporated into a melt (e.g., a metallic melt, a glass melt, a polymeric melt, etc.) which is hardened to form a porous support structure. In some cases, carbon fibers and/or particulate fillers can be incorporated into a solution in which the porous support structure is formed (e.g., in some cases in which the porous support structure comprises a polymer).

In some embodiments, the surfaces on or within of the porous support structure may be activated or modified prior to depositing the material, for example, to provide for enhanced attachment of material to the surfaces of the porous support structure. Porous support structures can be activated or modified by exposing the porous material to reactive or unreactive gasses or vapors. In some embodiments, the activation or modification steps can be performed at elevated temperatures (e.g., at least about 50° C., at least about 100° C., at least about 250° C., at least about 500° C., at least about 750° C., or higher) and/or aub-atmospheric pressures (e.g., less than about 760 torr, less than about 250 torr, less than about 100 torr, less than about 10 torr, less than about 1 torr, less than about 0.1 torr, less than about 0.01 torr, or lower).

Electrode active material (e.g., particles, films, or other forms comprising electrode active material) may be deposited within the pores of the porous support structure via a variety of methods. In some embodiments, electrode active material is deposited by suspending or dissolving a particle precursor (e.g., a precursor salt, elemental precursor material such as elemental sulfur, and the like) in a solvent and exposing the porous support structure to the suspension or solution (e.g., via dipping the porous support structure into the solvent, by spraying the solvent into the pores of the porous support structure, and the like). The particle precursor may subsequently form particles within the pores of the support structure. For example, in some cases, the precursor may form crystals within the pores of the support structure. Any suitable solvent or suspension medium may be used in conjunction with such a technique including aqueous liquids, non-aqueous liquids, and mixtures thereof. Examples of suitable solvents or suspension media include, but are not limited to, water, methanol, ethanol, isopropanol, propanol, butanol, tetrahydrofuran, dimethoxyethane, acetone, toluene, xylene, acetonitrile, cyclohexane, and mixtures thereof. Of course, other suitable solvents or suspension media can also be used as needed.

Electrode active material can also be deposited within the pores of the support structure, in some cases, by heating a material above its melting point or boiling point (optionally adjusting the surrounding pressure to, for example, aid in evaporation). The heated material may then be flowed or vaporized into the pores of the support material such that particulate deposits or other solids are formed. As a specific example, elemental sulfur powder can be positioned next to a porous support material and heated above the melting point of sulfur, such that the sulfur flows into the pores of the material (e.g., via sublimation, via liquid flow). The composite can then be cooled such that the sulfur deposits within the pores.

In some embodiments, electrode active material can be deposited within the pores of the support structure via electrochemical deposition, chemical vapor deposition, or physical vapor deposition. For example, metals such as aluminum, nickel, iron, titanium, and the like, can be electrochemically deposited within the pores of a porous support structure. Alternatively, such materials may be deposited, for example, using a physical vapor deposition technique such as, for example, electron beam deposition.

In some embodiments, catalyst may be deposited within the pores of the support structure in addition to the electrode active material (e.g., before or during the deposition of the electrode active material). In some cases, the catalyst may catalyze the electrochemical conversion of the electrode active material (e.g., the conversion of sulfur to $Li_2S$ and/or the conversion of $Li_2S$ to sulfur). Suitable catalyst can include, for example, cobalt phthalocyanine and transition metal salts, complexes, and oxides (e.g., $Mg_{0.6}Ni_{0.4}O$).

In certain embodiments, a porous electrode may be fabricated by using a filler material as a sacrificial material, and removing at least a portion of the filler material. In some cases, incorporation of filler material within a substrate (e.g., a porous carbon material), and subsequent removal of at least some of the filler material to expose portions of the substrate, may provide improved accessibility of the substrate surface area to other components of the cell. For example, the filler material may be used to maintain the porosity of an electrode material such that the electrolyte may contact interior portions of the electrode (e.g., pores) during cell operation. In some cases, use of the filler material during the fabrication of porous electrodes may also enhance the accessibility of the active electrode species during operation of the cell by increasing the amount of active electrode species that is formed on the outer surface of the porous electrode, rather than on the surface of interior pores of the porous electrode.

A wide range of materials may be suitable for use as a filler material, as described herein. In some cases, the filler material may be selected such that it has an affinity for a particular substrate, such as a carbon substrate. In some cases, the filler material be selected such that it may be stable (e.g., does not decompose, delaminate, react, dissolve, etc.) during formation of the electrode material and, upon formation of the electrode material, may readily decompose into one or more gases or vapors, facilitating rapid and complete removal. Those of ordinary skill in the art would be able to identify and select materials that exhibit this behavior by, for example, considering the chemical structure, or solubility, volatility, and/or vapor pressure of the filler material at a given temperature.

The filler material may be either a liquid, solid, or combination thereof. Examples of suitable filler materials include, but are not limited to, organic and inorganic salts, such as ammonium carbonate, ammonium bicarbonate, and azidocarbonamide, sodium bicarbonate, potassium bicarbonate, sodium carbonate and sodium borohydride. In one set of embodiments, the filler material is ammonium carbonate or ammonium bicarbonate. In some embodiments, the filler material is a liquid, such as water or a hydrocarbon (e.g., octane).

In some cases, the filler material may be combined with a fluid carrier to form a filler solution, which may be applied to the porous substrate. Suitable fluid carriers include aqueous fluid carriers, non-aqueous fluid carriers, and combinations thereof.

In some embodiments, fluid carriers suitable for use in the filler solution include halogenated or partially halogenated hydrocarbons, such as methylene chloride, hydrocarbons such as pentane or hexane, aromatic compounds such as benzene, toluene, or xylene, alcohols such as methanol, ethanol, isopropanol, other aqueous solvents such as water, mixtures thereof, and the like.

Additional arrangements, components, and advantages of porous electrodes are described in more detail in International Patent Apl. Serial No. PCT/US2009/000090, published as WO2009/089018, filed Jan. 8, 2009, entitled, "Porous Electrodes and Associated Methods" and U.S. Provisional Apl. Ser. No. 61/237,903, filed Aug. 28, 2009, entitled "Electrochemical Cells Comprising Porous Structures Comprising Sulfur", each of which is incorporated herein by reference in its entirety.

In some embodiments described herein, a force, or forces, is applied to portions of an electrochemical cell. Such application of force may reduce irregularity or roughening of an electrode surface of the cell, thereby improving performance. The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of metal (e.g., lithium metal or other active material as described below) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface, for example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with embodiments described herein, to reduce such behavior and to improve the cycling lifetime and/or performance of the cell.

Referring to FIG. 1, a force may be applied in the direction of arrow 81. Arrow 82 illustrates the component of the force that is normal to an active surface 20' of base electrode material layer 20 (as well as active surface 35' of base electrode material layer 35'). In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to an active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces.

In one set of embodiments, cells described herein are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical cell. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. In some cases, the component of the anisotropic force normal to the anode active surface is may define a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One or ordinary skill in the art will be familiar with kilogram-force-based units, and will understand that 1 kilogram-force is equivalent to about 9.8 Newtons.

As described herein, in some embodiments, the surface of a base electrode layer can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the base electrode material layer. For example, for a base electrode material comprising lithium, the cell may be under an externally-applied anisotropic force with a component defining a pressure of at least about 8 $kg_f/cm^2$, at least about 9 $kg_f/cm^2$, or at least about 10 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, or at least about 10 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode. For instance, in some cases the smoothness of the lithium surface (or surface of other active electrode materials) can be increased, during application of pressure, by the use of a polymer gel layer as described herein.

In some cases, one or more forces applied to the cell have a component that is not normal to an active surface of an anode. For example, in FIG. 1, force 84 is not normal to anode active surface 20'. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

In some embodiments, the cathode and anode have yield stresses, wherein the effective yield stress of one of the cathode and anode is greater than the yield stress of the other, such that an anisotropic force applied normal to the surface of one of the active surface of the anode and the active surface of the cathode causes the surface morphology of one of the cathode and the anode to be affected. In some embodiments, the component of the anisotropic force normal to the anode active surface is between about 20% and about 200% of the yield stress of the anode material, between about 50% and about 120% of the yield stress of the anode material, between about 80% and about 120% of the yield stress of the anode material, between about 80% and about 100% of the yield stress of the anode material, between about 100% and about 300% of the yield stress of the anode material, between about 100% and about 200% of the yield stress of the anode material, or between about 100% and about 120% of the yield stress of the anode material.

The anisotropic force described herein may be applied using any suitable method known in the art. In some embodiments, the force may be applied using compression springs. For example, referring to FIG. 1, electrochemical cell 10 may be situated in an optional enclosed containment structure 90 with one or more compression springs situated between surface 91 and the adjacent wall of the containment structure to produce a force with a component in the direction of arrow 82. In some embodiments, the force may be applied by situating one or more compression springs outside the containment structure such that the spring is located between an outside surface 92 of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, cells may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may comprise a relatively high strength (e.g., at least about 100 MPa, at least about 200 MPa, at least about 500 MPa, or at least about 1 GPa). In addition, the containment structure may comprise a relatively high elastic modulus (e.g., at least about 10 GPa, at least about 25 GPa, at least about 50 GPa, or at least about 100 GPa). The containment structure may comprise, for example, aluminum, titanium, or any other suitable material.

In some cases, any of the forces described herein may be applied to a plurality of electrochemical cells in a stack. As used herein, a "stack" of electrochemical cells is used to refer to a configuration in which multiple cells are arranged in an essentially cell-repetitive pattern, e.g., positioned on top of one another. In some cases, the cells may be positioned such that at least one surface of each cell in the stack is substantially parallel to at least one surface of every other cell in the stack, e.g., where a surface of one particular component (e.g., the anode) of one cell is substantially parallel to the same surface of the same component of every other cell. In some embodiments, the cells may be in direct contact with one another, while in some instances one or more spacers may be positioned between the cells in a stack. The stack of electrochemical cells may comprise any suitable number of cells (e.g., at least 2, at least 3, at least 5, at least 10, at least 25, at least 100 cells, or more).

In some embodiments, a constricting element may surround at least a portion of a cell or a stack of cells. The constricting element may be constructed and arranged, in some cases, to apply an anisotropic force with a component normal to at least one anode active surface within the cell or stack of cells defining a pressure of at least about 4.9, at least about 9.8, at least about 24.5, at least about 49, at least about 98, at least about 117.6, at least about 147, less than about 196, less than about 147, less than about 117.6, less than about 98, less than about 49, less than about 24.5, less than about 9.8, between about 4.9 and about 147, between about 49 and about 117.6, or between about 68.6 and about 98 Newtons per square centimeter.

In some embodiments, the constricting element may comprise a band (e.g., a rubber band, a turnbuckle band, etc.). In some embodiments, a band can be affixed to the cell or stack of cells by, for example adhesive, staples, clamps, a turn-buckle, or any other suitable method.

In some embodiments, the mass density of the elements used to apply a force to a cell or a stack of cells (e.g., a constricting element, an expanding element, etc.) is relatively low. By using elements with relatively low mass densities, the energy density and specific energy of the cell or stack of cells may remain relatively high. In some embodiments the mass density of the article(s) used to apply a force to a cell or a stack of cells is less than about 10 $g/cm^3$, less than about 5 $g/cm^3$, less than about 3 $g/cm^3$, less than about 1 $g/cm^3$, less than about 0.5 $g/cm^3$, less than about 0.1 $g/cm^3$, between about 0.1 $g/cm^3$ and about 10 $g/cm^3$, between about 0.1 $g/cm^3$ and about 5 $g/cm^3$, or between about 0.1 $g/cm^3$ and about 3 $g/cm^3$.

In some embodiments, pressure distribution components may be included between a cell and another cell or between a cell and a constricting element. Such pressure distribution components can allow for a uniform force to be applied throughout the cell or stack of cells. In some cases, the pressure distribution components comprise an end cap. The end caps' shape can be selected so as to convert the linear forces applied by the band to a uniform force across, for example, the active area of an anode.

In some embodiments, the mass density of the end caps may be relatively low. For example, the end caps may have a mass density of less than about 5 $g/cm^3$, less than about 3 $g/cm^3$, less than about 1 $g/cm^3$, less than about 0.5 $g/cm^3$, less than about 0.1 $g/cm^3$, between about 0.1 $g/cm^3$ and about 10 $g/cm^3$, between about 0.1 $g/cm^3$ and about 5 $g/cm^3$, or between about 0.1 $g/cm^3$ and about 3 $g/cm^3$. In addition, the end caps may comprise any suitable stiffness. For example, the stiffness of the end caps may be higher than 50 GPa, in some embodiments.

Another example of a pressure distribution component comprises a spacer positioned between two cells. Inter-cell spacers can serve to reduce stress concentrations that may arise, for example, due to geometrical manufacturing variations of individual cells. For example, the flatness of the cells may vary from cell to cell. As another example, opposing sides of one or more cells may not be perfectly parallel in some cases.

A spacer can also have any suitable thickness. In some cases, a spacer may have an average thickness of less than about 10 mm, less than about 5 mm, less than about 1 mm, less than about 500 microns, or less than about 250 microns. In some embodiments, a spacer can be between about 100 microns and about 10 mm, between about 100 microns and about 1 mm, between about 250 microns and about 10 mm, between about 250 microns and about 1 mm, or between about 500 microns and about 2 mm.

Opposing faces of the spacer(s) may be highly parallel, in some embodiments. For example, in some embodiments, the variation of the distance between a first surface of a spacer in contact with a first cell and a second surface of the spacer in contact with a second cell, as measured substantially parallel to a vector drawn from the center of mass of the first cell to the center of mass of the second cell, across the width of the spacer is less than about 1 mm, less than about 500 microns, less than about 100 microns, less than about 50 microns, less than about 25 microns, less than about 10 microns, or less than about 1 micron.

The mass density of the spacer(s) in a stack of cells can be relatively low, in some instances. For example, the spacers may have a mass density of less than about 5 $g/cm^3$, less than about 2 $g/cm^3$, less than about 1 $g/cm^3$, less than about 0.5 $g/cm^3$, less than about 0.1 $g/cm^3$, between about 0.1 $g/cm^3$ and about 10 $g/cm^3$, between about 0.1 $g/cm^3$ and about 5 $g/cm^3$, or between about 0.1 $g/cm^3$ and about 2 g/cm³. In addition, the end caps may comprise a relatively high stiffness. For example, the stiffness of the spacer(s) may be higher than 10 GPa, in some embodiments.

The use of constriction elements is not limited to flat cell geometries. In some instances, a constriction element may be used to apply a force to a cylindrical electrochemical cell or a prismatic electrochemical cell (e.g., a triangular prism, a rectangular prism, etc.).

Any of the constriction elements described above may be used as constriction elements in cylindrical cells, prismatic cells, or other such cells. For example, in some embodiments, one or more wraps of the same or different winding material may be positioned on the outside surface of the cell. In some embodiments, the winding material comprises relatively high strength. The winding material may also comprise a relatively high elastic modulus. In some cases, shrink wrap tubing such as polyester film and fabric. In some cases, the constriction element comprises an elastic material properly sized to provide required external pressure after it relaxes on the outer surface of the cell.

In some embodiments, the cell may comprise an expanding element (e.g., an expanding mandrel) within an inner volume of the cell. The expanding element can be constructed and arranged to apply a force radiating outward from the inner volume of the electrochemical cell. In some embodiments, the expanding element and the constricting element can be constructed and arranged such that the force (e.g., pressure) at each point within the boundaries of the electrochemical cell deviates by less than about 30%, less than about 20%, less than about 10%, or less than about 5% of the average force (e.g., pressure) within the boundaries electrochemical cell. In some embodiments, such a distribution of forces can be achieved, for example, by selecting constricting and expanding elements such that substantially equal internal and external forces per unit area are applied to the cell.

In some embodiments, rather than applying an internal force to define a pressure, external force application can be combined with complimentary winding mechanics to achieve a radial pressure distribution that is within acceptable bounds. In some embodiments, the total volumes of the pressure distribution elements(s) (e.g., end caps, spacers, etc.) and the element(s) used to apply a force to the cell or stack of cells (e.g., bands, mandrels, etc.) may be relatively low. By employing low volumes, the energy density of the assembly may be kept relatively high. In some cases, the sum of the volumes of the pressure distribution element(s) and the element(s) used to apply a force to a cell or stack of cells comprises less than about 10%, less than about 5%, less than about 2%, less than about 1%, less than about 0.5%, less than about 0.1%, between about 0.1% and about 10%, between about 0.1% and about 5%, between about 0.1% and about 2%, or between about 0.1% and about 1% of the volume of the cell or stack of cells.

In some cases, the cells described herein may change size (e.g., swell) during charge and discharge. When selecting the method of applying the anisotropic force, it may be desirable, in some embodiments, to select methods that produce a relatively constant force as the cell changes shape and/or size during charge and discharge. In some instances, this selection may be analogous to selecting a system with a low effective spring constant (e.g., a "soft" spring). For example, when using a compression spring to apply the anisotropic force, a spring with a relatively low spring constant may produce an anisotropic force that is more constant during cell cycling than the force produced by a spring with a relatively high spring constant. In cases where elastic bands are used, a band with a relatively high elasticity may produce an anisotropic force that is more constant during cell cycling than the force produced by a band with a relatively low elasticity. In some embodiments in which force is applied using a machine screw, the use of soft screws (e.g., brass, polymer, etc.) may be advantageous. In some applications, for example, a machine screw may be selected to cover a desired range of compression, but the screw itself may be soft.

In some embodiments, the electrochemical cells described herein are placed in containment structures, and at least a portion of an anisotropic force with a component normal to the active surface of the anode is produced due to the expansion of the electrochemical cell relative to the containment structure. In some cases, the containment structure is sufficiently rigid such that it does not deform during the expansion of the electrochemical cell, resulting in a force applied on the cell. The electrochemical cell may swell as the result of a variety of phenomena. For example, in some cases, the electrochemical cell may undergo thermal expansion. In some embodiments, the electrochemical cell may swell due to charge and/or discharge of the cell. For example, in some cases, a partially discharged cell may be placed in a containment structure. Upon charging the partially discharged cell, the cell may swell. This expansion may be limited by the dimensions of the containment structure, resulting in the application of an anisotropic force.

In some cases, the cell may swell due to the adsorption of a liquid into porous components of the electrochemical cell. For example, in some embodiments, a dry porous electrochemical cell may be placed within a containment structure. The dry porous electrochemical cell may then be soaked (e.g., with a liquid electrolyte). In some cases, the properties of the electrolyte (e.g., surface tension) and the electrochemical cell (e.g., size of the porous cavities) may be selected such that, when the electrochemical cell is wetted by the electrolyte, a desirable level of capillary pressure is generated. Once wetted, the electrode stack will swell, thus generating an anisotropic force. At equilibrium, the anisotropic force exerted by the containment structure on the electrochemical cell will be equal to the force resulting from the capillary pressure.

Containment structures described herein may comprise a variety of shapes including, but not limited to, cylinders, prisms (e.g., triangular prisms, rectangular prisms, etc.), cubes, or any other shape. In some embodiments, the shape of the containment structure is chosen such that the walls of the containment structure are parallel to the outer surfaces of the electrochemical cell. For example, in some cases, the containment structure may comprise a cylinder, which can be used, for example, to surround and contain a cylindrical electrochemical cell. In other instances, the containment structure may comprise a prism surrounding a similarly shaped prismatic electrochemical cell.

In some embodiments, the application of a force as described herein may allow for the use of smaller amounts of anode active material (e.g., lithium) and/or electrolyte within an electrochemical cell, relative to the amounts used in essentially identical cells in which the force is not applied. In cells lacking the applied force described herein, anode active material (e.g., lithium metal) may be, in some cases, redeposited unevenly on an anode during charge-discharge cycles of the cell, forming a rough surface. In some cases, this may lead to an increase in the rates of one or more undesired reactions involving the anode metal. These undesired reactions may, after a number of charge-discharge cycles, stabilize and/or begin to self-inhibit such that substantially no additional anode active material becomes depleted and the cell may function with the remaining active materials. For cells lacking the applied force as described herein, this "stabilization" is often reached only after a substantial amount of anode active material has been consumed and cell performance has deteriorated. Therefore, in some cases where forces as described herein have not been applied, a relatively large amount of anode active material and/or electrolyte has often been incorporated within cells to accommodate for loss of material during consumption of active materials, in order to preserve cell performance.

Accordingly, the application of force as described herein may reduce and/or prevent depletion of active materials such that the inclusion of large amounts of anode active material and/or electrolyte within the electrochemical cell may not be necessary. For example, the force may be applied to a cell prior to use of the cell, or in an early stage in the lifetime of the cell (e.g., less than five charge-discharge cycles), such that little or substantially no depletion of active material may occur upon charging or discharging of the cell. By reducing and/or eliminating the need to accommodate for active material loss during charge-discharge of the cell, relatively small amounts of anode active material may be used to fabricate cells and devices as described herein. In some embodiments, devices described herein comprise an electrochemical cell having been charged and discharged less than five times in its lifetime, wherein the cell comprises an anode, a cathode, and an electrolyte, wherein the anode comprises no more than five times the amount of anode active material which can be ionized during one full discharge cycle of the cell. In some cases, the anode comprises no more than four, three, two, or 1.5 times the amount of lithium which can be ionized during one full discharge cycle of the cell.

In some embodiments, the application of force, as described herein, may result in improved capacity after repeated cycling of the electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle.

In some embodiments, the use of a cathode that is resistant to compression can enhance the performance of the cell relative to cells in which the cathode is significantly compressible. Not wishing to be bound by any theory, the use of elastic, relatively highly compressible cathodes may result in the evacuation of liquid electrolyte during the application of the anisotropic force. The evacuation of liquid electrolyte from the cathode may result in decreased power output during the operation of the electrochemical cell. For example, in some cases a decrease in power output from the electrochemical cell may be observed even when the anisotropic force is relatively small (e.g., an anisotropic force with a component normal to an active surface of the anode defining a pressure of about 68.6 Newtons/cm$^2$) or when the anisotropic force is of another magnitude, for example, as noted above with reference to limits and ranges of the component of the anisotropic force normal to the anode active surface. The degree of compressibility can be correlated to a change in porosity, i.e., change in void volume of the cathode, during application of a compressive force. In some embodiments, it may be desirable to limit the change in porosity of the cathode during the operation of the cell. For example, in some embodiments of the invention, the porosity of the cathode may be decreased during operation of the cell by less than 10%, less than 6%, less than 4%, less than 2%, less than 1%, less than 0.5%, less than 0.1%, or lower. That is, during use of the cell, a compressive force experienced by the cathode may reduce the total void volume, or total volume otherwise accessible by the electrolyte, by percentages noted above, where the cathode is fabricated to provide suitable resistance to compression.

The stiffness of the cathode (resistance to compressibility) may be enhanced using a variety of methods. In some embodiments, the type of electrolyte and the size of the pores in the cathode may be together selected such that the resulting capillary forces produced by the interaction of the electrolyte and the cathode pores resist the deformation of the cathode. This effect may be particularly useful, for example, in small electrochemical cells. As another example, the stiffness of the cathode may be enhanced by incorporating reinforcement fibers (e.g., to connect carbon particles) into the cathode. In some cases, binder may be incorporated into the cathode to provide rigidity. In other embodiments, an inherently rigid cathode may be produced by infusing active material (e.g., reticulated Ni foam) into a thin and light superstructure.

Additional arrangements, components, and advantages of applying one or more forces to an electrochemical described herein are provided in U.S. patent application Ser. No. 12/535,328, filed Aug. 4, 2009, entitled "Application of Force In Electrochemical Cells", published as U.S. Pub. No. 2010/0035128, which is incorporated herein by reference in its entirety.

Certain cathodes used in lithium metal rechargeable batteries may include a carbon-based component, sulfur, and a binder or other material of some sort to facilitate internal cohesion of the cathode. In some embodiments, application of pressure to a cathode before and/or during use (e.g., cycling) can reduce the need for binder or other adhesive which can increase the overall surface area of carbon available for facilitating both internal electrode conductivity and electrical communication with sulfur, and with electrolyte to which the cathode is exposed. Thus, even if void volume of a cathode is reduced by application of pressure (i.e., reduction of a volume within the cathode which can be taken up by electrolyte), relative to an essentially identical cathode absent application of this pressure, performance of the cathode and an overall device utilizing the cathode can be improved. The cathodes described herein may possess enhanced properties that render them particularly suitable for use in electrochemical cells designed to be charged and/or discharged while a force is applied. The cathodes described herein may retain their mechanical integrity when charged and/or discharged during the application of an anisotropic force (e.g., defining a pressure of about 196 Newtons per square centimeter or greater). In some embodiments, the cathode retains sufficient porosity to charge and discharge effectively when a force is applied to the cell. Cathodes described herein may also comprise relatively high electrolyte-accessible conductive material (e.g., carbon) areas. The cathode may comprise a relatively low ratio of the amount of binder and/or mass of electrolyte to cathode active material (e.g., sulfur) ratio in some instances. In some embodiments, electrochemical cells comprising the cathodes described herein may achieve relatively high specific capacities and/or relatively high discharge current densities. In addition, the cathodes described herein may exhibit relatively high cathode active material (e.g., sulfur) utilization during charge and discharge. In still further cases, the electrical conductivity between conductive material in the cathode (e.g., carbon) may be enhanced during the application of the force.

Cathodes described herein may comprise one or more properties that render them effective in delivering enhanced performance. In some instances, the cathodes may exhibit one or more of the properties outlined below during the application of an anisotropic force, the magnitude of which may lie within any of the ranges described herein.

In certain embodiments, cathodes described herein may exhibit relatively high porosities. In some cases, the porosity of the cathode may be at least about 30%, at least about 40%, at least about 50%, at least about 60%, at least about 70%, at least about 80%, or at least about 90%. Such porosities may be retained, in some cases, while an anisotropic force (e.g., defining a pressure of between about 4.9 and about 196 Newtons per square centimeter, or any of the ranges outlined below) is applied to the electrochemical cell. As used herein, the "porosity" of an electrode (e.g., the cathode) is defined as the void volume of the electrode divided by the volume within the outer boundary of the electrode, and is expressed as a percentage. "Void volume" is used to refer to portions of the cathode that are not occupied by cathode active material (e.g., sulfur), conductive material (e.g., carbon), binder, or other materials that provide structural support. The void volume within the cathode may comprise pores in the cathode as well as interstices between aggregates of the cathode material. Void volume may be occupied by electrolyte, gases, or other non-cathode materials. In some embodiments, the void volume of the cathode may be at least about 1, at least about 2, at least about 4, or at least about 8 $cm^3$ per gram of cathode active material (e.g., sulfur) in the cathode. In some instances, the void volume may comprise pores with relatively large diameters. For example, in some embodiments, pores of a diameter of at least about 200 nm constitute at least about 50% of the void volume in the cathode.

As noted above, in some embodiments, compressing a cathode facilitates cathode integrity, where the cathode has relatively less binder or adhesive than otherwise might be required to maintain integrity, and such compression may improve performance of the cathode and/or a device into which the cathode is incorporated. This improvement can be realized even if void volume of the cathode (and/or the relative amount of electrolyte present in the cathode during use) is reduced. It can also be useful, in combination with embodiments described herein, to select a cathode that is resistant to compression to enhance the performance of the cell relative to cells in which the cathode is significantly compressible. For example, using a compression resistant cathode may help maintain high porosities or void volumes during the application of an anisotropic force to the cell. Not wishing to be bound by any theory, the use of elastic, relatively highly compressible cathodes may result in the evacuation of liquid electrolyte during the application of the anisotropic force. The evacuation of liquid electrolyte from the cathode may result in decreased power output during the operation of the electrochemical cell. The use of compressible cathodes may cause a decrease in power output from the electrochemical cell even when the anisotropic force is relatively small (e.g., an anisotropic force defining a pressure of about 68.6 Newtons per square centimeter) or when the anisotropic force is of another magnitude, for example, as noted below with reference to limits and ranges of the component of the anisotropic force normal to the anode active surface.

The degree of compressibility can be correlated to a change in porosity, i.e., change in void volume of the cathode, during application of a compressive force. In some embodiments, it may be desirable to limit the change in porosity of the cathode during the operation of the cell. For example, in some embodiments of the invention, the porosity of the cathode may be decreased during operation of the cell by less than about 10%, less than about 6%, less than about 4%, less than about 2%, less than about 1%, less than about 0.5%, less than about 0.1%, or lower. That is, during use of the cell, a compressive force experienced by the cathode may reduce the total void volume, or total volume otherwise accessible by the electrolyte, by percentages noted above, where the cathode is fabricated to provide suitable resistance to compression. Electrochemical cells and other devices comprising cathodes described herein may achieve high levels of performance despite having lower porosities during the application of a force than would be observed absent the force.

The stiffness of the cathode (resistance to compressibility) may be enhanced using a variety of methods. In some embodiments, the cathode may comprise one or more binder materials (e.g., polymers, porous silica sol-gel, etc.) which may, among other functions, provide rigidity. Examples of suitable binders for use in cathodes are described herein and may include, for example, polyvinyl alcohol, polyvinylidine fluoride and its derivatives, hydrocarbons, polyethylene, polystyrene, polyethylene oxide and any polymers including hydrocarbon fragments and heteroatoms. The amount of binder within the cathode may be relatively low in some cases. For example, the cathode may contain less than about 20%, less than about 10%, less than about 5%, less than about 2%, or less than about 1% binder by weight in some embodiments. The use of a relatively low amount of binder may allow for improved fluid communication between the electrolyte and the electrode active materials (cathode active material such as sulfur or anode active material such as lithium) and/or between the electrolyte and the electrode conductive material. In addition, the use of a low amount of binder may lead to improved contact between the electrode active material and the electrode conductive material (e.g., carbon) or improved contact within the electrode conductive material itself (e.g., carbon-carbon contact).

In some embodiments, an inherently rigid cathode may be produced by infusing active material (e.g., reticulated Ni foam) into a thin and light superstructure.

The type of electrolyte and the size of the pores in the cathode may be together selected such that the resulting capillary forces produced by the interaction of the electrolyte and the cathode pores resist the deformation of the cathode. This effect may be particularly useful, for example, in small electrochemical cells. As another example, the stiffness of the cathode may be enhanced by incorporating reinforcement fibers (e.g., to connect carbon particles) into the cathode.

In some embodiments, the cathode comprises a relatively large electrolyte accessible conductive material area. As used herein, "electrolyte accessible conductive material area" is used to refer to the total surface area of the conductive material (e.g., carbon) that can be contacted by electrolyte. For example, electrolyte accessible conductive material area may comprise conductive material surface area within the pores of the cathode, conductive material surface area on the external surface of the cathode, etc. In some instances, electrolyte accessible conductive material area is not obstructed by binder or other materials. In addition, in some embodiments, electrolyte accessible conductive material area does not include portions of the conductive material that reside within pores that restrict electrolyte flow due to surface tension effects. In some cases, the cathode comprises an electrolyte accessible conductive material area (e.g., an electrolyte accessible carbon area) of at least about 1 m$^2$, at least about 5 m$^2$, at least about 10 m$^2$, at least about 20 m$^2$, at least about 50 m$^2$, or at least about 100 m$^2$ per gram of cathode active material (e.g., sulfur) in the cathode.

Electrochemical cells described herein may make use of a relatively low mass of electrolyte relative to the mass of the cathode active material. For example, in some instances, the ratio of electrolyte to cathode active material (e.g., sulfur), by mass, within the electrochemical cell is less than about 6:1, less than about 5:1, less than about 4:1, or less than about 3:1.

As mentioned above, some embodiments may include electrochemical devices in which the application of force is used to enhance the performance of the device. Any of the performance metrics outlined herein may be achieved, alone or in combination with each other, while an anisotropic force is applied to the electrochemical cell (e.g., during charge and/or discharge of the cell). The magnitude of the anisotropic force may lie within any of the ranges mentioned below.

In some instances, the cathode structure and/or material and the anisotropic force may be together selected such that the anisotropic force increases the conductivity within the cathode through charge and discharge compared to the conductivity in the absence of the anisotropic force but under otherwise essentially identical conditions.

Additional arrangements, components, and advantages of electrochemical cells including cathodes that are structurally stable under pressure are provided in U.S. patent application Ser. No. 12/727,862, filed Mar. 19, 2010, entitled, "Cathode for Lithium Battery", which is incorporated herein by reference in its entirety.

In some embodiments, an electrochemical cell described herein may exhibit high active electrode species utilization, i.e., the electrode active material may be readily accessible to and may interact with other components or species within the cell during operation, such that cell performance is enhanced. In some cases, the active material capacity may be at least 60%, at least 70%, at least 80%, or, in some cases, at least 90% of the active material theoretical capacity. The "active material theoretical capacity" for a particular material may be calculated using the following formula:

$$Q = 1/3600 * n * F/M,$$

wherein:
Q=theoretical capacity Ah/g (ampere hour per gram),
3600=number of seconds in one hour,
n=number of electrons involved into electrochemical process per one molecule of material,
F=Faraday constant, 96485 C/mol, and
M=material molecular mass, gram.

Those of ordinary skill in the art would be able to calculate the active material theoretical capacity and compare it to the experimental active material capacity for a particular material to determine whether or not the experimental capacity is at least 60%, or greater, of the theoretical capacity.

When elemental sulfur (S) is used as the cathode active material and S$^{2-}$ is the desired reaction product, the theoretical capacity (i.e., active material theoretical capacity) is 1675 mAh/g. That is, a cell is said to utilize 100% of the total sulfur in the cell when it produces 1675 mAh/g of total sulfur in the cell, 90% of the total sulfur in the cell when it produces 1507.5 mAh/g of total sulfur in the cell, 60% of the total sulfur in the cell when it produces 1005 mAh/g of total sulfur in the cell, and 50% of the total sulfur in the cell when it produces 837.5 mAh/g of total sulfur in the cell.

In some embodiments, it is possible for the amount of sulfur (or other active material) in the region of the cell that is enclosed by the cathode and anode ("available" sulfur) to be less than that of the total sulfur in the cell. In some cases the electrolyte may be located both in the region enclosed by the anode and cathode and the region not enclosed by the cathode and anode. For example, during charge/discharge cycles under pressure, it is possible for the un-reacted species in the region enclosed by anode and cathode to move out either by diffusion or by the movement of the electrolyte. The utilization expressed based on this "available" sulfur is the measure of the ability of the cathode structure to facilitate the conversion of the sulfur in the region enclosed between the cathode and anode to desirable reaction product (e.g., S$^{2-}$ in the case of sulfur as the cathode active material). That is, if all the sulfur available in the region enclosed between the cathode and anode is completely converted to desired reaction product, then the cell will be said to utilize 100% of the available sulfur, and will produce 1675 mAh/g of available sulfur.

In some embodiments, the cell can be designed in such a way that either all of the electrolyte is located in between the region enclosed by the anode and cathode or the transport of un-reacted species from the enclosed region to the outside is completely eliminated. For such embodiments, the utilization expressed as mAh/g of available sulfur will be equal to that expressed as mAh/g of total sulfur in the cell.

Sulfur utilization may vary with the discharge current applied to the cell, among other things. In some embodiments, sulfur utilization at low discharge rates may be higher than sulfur utilization at high discharge rates. In some embodiments, the cell is capable of utilizing at least about 60%, at least about 65%, at least about 70%, at least about 75%, at least about 80%, at least about 85%, at least about 90%, or at least about 92% of the total sulfur in the cell over at least one charge and discharge cycle. In some embodiments, the cell is capable of utilizing at least about 60%, at least about 65%, at least about 70%, at least about 75%, at least about 80%, at least about 85%, at least about 90%, or at least about 92% of the available sulfur over at least one charge and discharge cycle.

The electrochemical cells described herein may be operated using relatively high discharge current densities, in some cases. As used herein, the "discharge current density" refers to the discharge current between the electrodes, divided by the area of the electrode over which the discharge occurs, as measured perpendicular to the direction of the current. For the purposes of discharge current density, the area of the electrode does not include the total exposed surface area of the electrode, but rather, refers to an imaginary plane drawn along the electrode surface perpendicular to the direction of the current. In some embodiments, the electrochemical cells may be operated at a discharge current density of at least about 0.1 mA/cm$^2$, at least about 0.2 mA/cm$^2$, at least about 0.4 mA/cm$^2$ of the cathode surface, or higher. The cells described herein may also be operated, in some cases, at a high discharge current per unit mass of active material. For example, the discharge current may be at least about 100, at least about 200, at least about 300, at least about 400, or at least about 500 mA per gram of sulfur in the cathode, or higher.

In some cases, the utilization rates of electrochemical cells described herein may remain relatively high through a relatively large number of charge and discharge cycles. As used herein, a "charge and discharge cycle" refers to the process by which a cell is charged from 0% to 100% state of charge (SOC) and discharged from 100% back to 0% SOC. In some embodiments, the electrochemical cell may be capable of utilizing at least about 60%, at least about 65%, at least about 70%, at least about 75%, at least about 80%, at least about 85%, or at least about 90% of the sulfur (e.g., total sulfur in the cell, available sulfur) through at least a first charge and discharge cycle and at least about 1, 2, 10, 20, 30, 50, 75, 100, 125, or 135 charge and discharge cycles subsequent to the first charge and discharge cycle. In certain embodiments, electrochemical cells described herein may cycle at least 1 time, at least 2 times, at least 10 times, at least 20 times, at least 30 times, at least 50 times, at least 75 times, at least 100 times, at least 125 times, or at least 135 times subsequent to a first charge and discharge cycle with each cycle having a sulfur utilization (measured as a fraction of 1675 mAh/g sulfur (e.g., total sulfur in the cell, available sulfur) output during the discharge phase of the cycle) of at least about 40-50%, at least about 50-60%, at least about 40-60%, at least about 40-80%, at least about 60-70%, at least about 70%, at least about 70-80%, at least about 80%, at least about 80-90%, or at least about 90% when discharged at a moderately high discharge current of at least about 100 mA/g of sulfur (e.g., a discharge current between 100-200 mA/g, between 200-300 mA/g, between 300-400 mA/g, or between 400-500 mA/g).

In some embodiments, the electrochemical cells described herein may have a discharge rate of at least C/30, C/20, C/10, C/5, or C/3.

In some embodiments, electrochemical cells described herein have an area specific resistance of less than 50 ohm·cm$^2$. That is, the area specific resistance of the entire battery assembly including any electrolyte, separator, or other component(s) of the battery is less than 50 ohm·cm$^2$. In certain embodiments, the area specific resistance of an electrochemical cell (e.g., a lithium battery) is less than 40, 30, 20, 10, or 5 ohm·cm$^2$. Such area specific resistances can be achieved, in some cases, by using components that reduce the internal resistance or polarization of the battery, and/or by promoting electronic conduction between components (e.g., between an electrode and a current collector). For example, in one embodiment, a lithium battery includes one or more primer layers positioned between the active cathode species and the cathode current collector that promotes conducutction between these components.

Some of the electrochemical cells described herein may maintain capacity over a relatively large number of charge and discharge cycles. For example, in some cases, the electrochemical cell capacity decreases by less than about 0.2% per charge and discharge cycle over at least about 2, at least about 10, at least about 20, at least about 30, at least about 50, at least about 75, at least about 100, at least about 125, or at least about 135 cycles subsequent to a first charge and discharge cycle.

In some embodiments, the electrochemical cells described herein may achieve relatively high charge efficiencies over a large number of cycles. As used herein, the "charge efficiency" of the Nth cycle is calculated as the discharge capacity of the (N+1)th cycle divided by the charge capacity of the Nth cycle (where N is an integer), and is expressed as a percentage. In some cases, electrochemical cells may achieve charge efficiencies of at least about 60%, at least about 70%, at least about 80%, at least about 90%, at least about 95%, at least about 97%, at least about 98%, at least about 99%, at least about 99.5%, or at least about 99.9% for the first cycle. In some embodiments, charge efficiencies of at least about 60%, at least about 70%, at least about 80%, at least about 90%, at least about 97%, at least about 98%, at least about 99%, at least about 99.5%, or at least about 99.9% may be achieved for the 10th, 20th, 30th, 50th, 75th, 100$^{th}$, 125th, or 135th cycles subsequent to a first charge and discharge cycle.

Certain electrochemical cells and electrodes described herein may have high energy densities, for example, at least 200 Wh/kg, at least 250 Wh/kg, at least 300 Wh/kg, at least 350 Wh/kg, at least 400 Wh/kg, at least 450 Wh/kg, or at least 500 Wh/kg. Additionally, the cell or electrode may be designed according to embodiments described herein such that it can be cycled at least 100, at least 150, at least 200, at least 250, at least 300, at least 350, at least 400, at least 450, or at least 500 times during its life.

Some inventive electrochemical cell configurations include an electrically non-conductive material (e.g., as part of the electrolyte) that is configured to wrap around the edge of an electrode to prevent short circuiting of the electrochemical cell. In some embodiments, the electrically non-conductive material layer can be arranged such that it includes first and second portions (one on either side of an electrode) as well as a third portion adjacent the edge of the electrode that directly connects (and, in some cases, is substantially continuous with) the first and second portions. The electrically non-conductive material layer can be relatively thin while maintaining relatively high electrical insulation between the anode and the cathode, allowing one to produce an electrochemical cell with a relatively low mass and/or volume. The arrangements described above can be formed, for example, by forming a multi-layer cell structure comprising an electrode and an electrically non-conductive material layer (e.g., as a coating), and folding the multi-layer cell structure such that the electrically non-conductive material covers the convex surface portion of the resulting crease.

The inventors have discovered that, in some embodiments, it can be particularly advantageous to form the electrically non-conductive material layer over an electrode (e.g., via casting, evaporative deposition, spin-coating, or another process) to form the multi-layer cell structure. Producing a multi-layer cell structure via this method can be relatively easy, fast, and inexpensive relative to methods in which, for example, the electrically non-conductive material layer and electrode are formed as separate materials and joined together to form the multi-layer cell structure, which might require complicated alignment of the electrode and the electrically non-conductive material. In addition, forming the electrically non-conductive material layer over the electrode can be relatively easy, fast, and inexpensive relative to systems in which multiple, individual electrodes are place or formed on an electrically non-conductive material, which can also require careful alignment during both electrode attachment and during folding. Moreover, forming the electrically non-conductive material layer over an electrode can also allow for control of the thickness of the electrically non-conductive material. The formation of relatively thin layers of electrically non-conductive material can reduce the volume and/or mass of the multi-layer cell structure, thereby increasing the specific energy and energy density of the resulting electrochemical cell.

The inventors have also discovered that short circuiting between the anode and the cathode can be more prevalent when pressure is applied to the electrochemical cell, as a reduction in the distance between the anode and the cathode can increase the possibility of a short circuit within the cell. In one aspect, the use of particular arrangements of electrically non-conductive materials can allow for the application of a force to an electrochemical cell without producing short circuits between the anode and the cathode. In addition, the configurations of electrically non-conductive materials described herein can reduce the probability of a short circuit within the cell after repeated charging and discharging cycles (e.g., due to dissolution and re-plating of electrode materials).

Figure 8A:
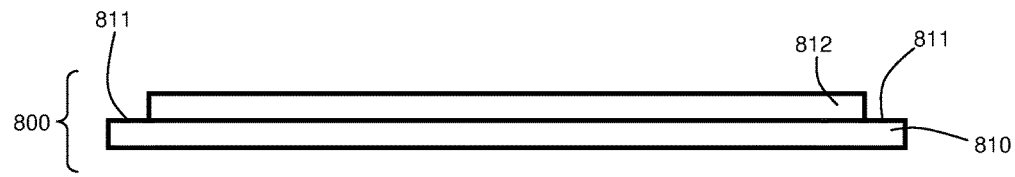
FIGS. 8A-8D include exemplary cross-sectional schematic illustrations outlining the fabrication of an electrochemical cell, according to one set of embodiments.

FIGS. 8A-8D include exemplary cross-sectional schematic diagrams illustrating a method of arranging an electrically non-conductive material layer, according to one set of embodiments. In FIG. 8A, multi-layer cell structure 800 comprises substrate 810 and electrode 812 positioned adjacent each other. In some embodiments, electrode 812 can be formed over substrate 810. For example, electrode 812 might be deposited (e.g., via vacuum deposition of a metal, mixture of metals, or other suitable material), onto substrate 810. As another example, electrode 812 might be formed on substrate 810 by a casting process (e.g., by depositing and drying a slurry comprising electrode active material on a substrate). In other embodiments, electrode 812 and substrate 810 might be formed as separate entities and adhered or otherwise joined together to form the structure illustrated in FIG. 8A. In still other embodiments, substrate 810 and electrode 812 might be provided as a pre-assembled multi-layer cell structure.

In some embodiments, such as the set of embodiments illustrated in FIG. 8A, electrode 812 does not completely cover substrate 810, but rather, edge portions 811 of substrate 810 are left exposed. Such arrangements can be useful in forming electrical contacts, for example, when the substrate supports or is used as a current collector in the assembled electrochemical cell. It should be understood, however, that in other embodiments, electrode 812 can be arranged to substantially completely cover substrate 810.

Figure 8B:
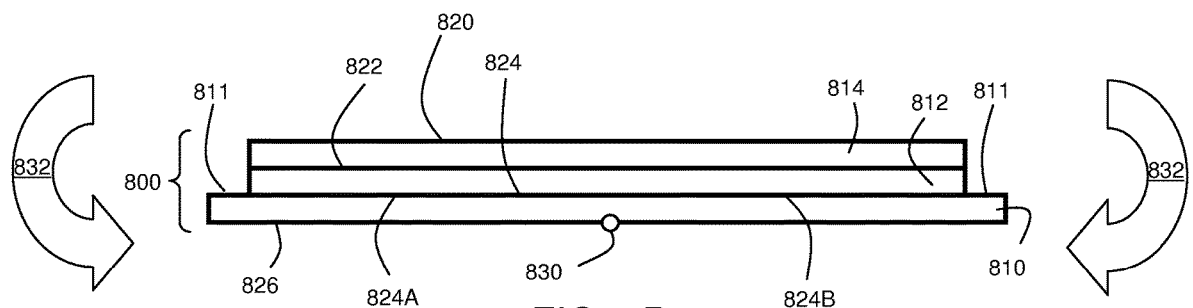

In FIG. 8B, multi-layer cell structure 800 further comprises electrically non-conductive material layer 814 positioned adjacent electrode 812, such that electrode 812 is between electrically non-conductive material layer 814 and substrate 810. As described in more detail below, the electrically non-conductive material layer 814 can form all or part of the electrolyte of the electrochemical cell formed from multi-layer cell structure 800, in some cases. In some embodiments, electrically non-conductive material layer 814 is adhered to electrode 812. In some instances, at least a portion of electrically non-conductive material layer 814 is covalently bonded to electrode 812.

In some embodiments, electrically non-conductive material layer 814 can be formed over electrode 812. For example, electrically non-conductive material layer 814 might be applied over electrode 812 and formed in place, for example using a casting process (e.g., by depositing and drying a slurry comprising electrode active material on a substrate). Exemplary methods for performing such a deposition are described, for example, in PCT Publication No. WO 99/33125 to Carlson et al. and in U.S. Pat. No. 5,194,341 to Bagley et al., each of which is incorporated by reference in its entirety for all purposes. In some embodiments, the electrically non-conductive material layer can be deposited by methods such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The electrically non-conductive material layer may also be deposited by spin-coating techniques. A method for depositing, for example, crosslinked polymer layers includes flash evaporation methods, for example, as described in U.S. Pat. No. 4,954,371 to Yializis. A method for depositing, for example, crosslinked polymer layers comprising lithium salts may include flash evaporation methods, for example, as described in U.S. Pat. No. 5,681,615 to Affinito et al. The technique used for depositing the electrically non-conductive material layer may depend on the type of material being deposited, the thickness of the layer, etc. Depositing the electrically non-conductive material layer on an electrode can be advantageous, in some embodiments, because they can allow for the deposition of relatively thin layers of electrically non-conductive material, which can reduce the size and weight of the final electrochemical cell.

In other embodiments, electrically non-conductive material layer 814, substrate 810, and electrode 812 can be formed as separate entities and adhered or otherwise joined to the rest of the multi-layer cell structure. In still other embodiments, substrate 810, electrode 812, and electrically non-conductive material layer 814 might be provided as a pre-assembled multi-layer cell structure.

The substrate 810, electrode 812 and/or the electrically non-conductive material layer 814 (or other layers of the multi-layer cell structure) can be a substantially continuous layer, in some embodiments. "Substantially continuous," as used to describe a relationship between two sections or layers of a structure, means that any region of the structure between the sections or layers is essentially identical to the sections or layers. E.g., a substantially continuous sheet of material, folded upon itself or folded around a different material, can define two or more sections that remain part of the substantially continuous sheet.

In some embodiments, the substrate 810, electrode 812, electrically non-conductive material layer 814, and/or other material layers described herein can be substantially free of macroscopic discontinuities. A layer that is "substantially free of macroscopic discontinuities" is one that includes no region with a maximum cross-sectional dimension measured substantially parallel to the layer that is greater than the thickness of the layer, made up of a material (or mixture of materials) that is different than the composition of the rest of the layer. As specific examples, a layer with substantially no voids can be substantially free of macroscopic discontinuities. In addition, a porous material layer can be substantially free of macroscopic discontinuities if the maximum cross-sectional dimension of the pores within the layer is less than the thickness of the layer. A porous material with pore sizes greater than the thickness of the layer of porous material, however, would not be substantially free of macroscopic discontinuities. In addition, a material that includes a bulk material and an island of a second material with a maximum cross-sectional dimension greater than the thickness of the material within the bulk material would not be substantially free of macroscopic discontinuities.

As shown in FIG. 8B, electrically non-conductive material layer 814 includes a first substantially planar surface 820 facing away from electrode 812 and substrate 810 and a second substantially planar surface (at interface 822) facing electrode 812 and substrate 810. In addition, electrode 812 includes a first substantially planar surface (at interface 822) facing electrically non-conductive material layer 814 and facing away from substrate 810 as well as a second substantially planar surface (at interface 824) facing substrate 810 and facing away from electrically non-conductive material layer 814. Substrate 810 includes a first substantially planar surface (at interface 824) facing electrode 812 and electrically non-conductive material layer 814 and a second substantially planar surface 826 facing away from electrode 812 and electrically non-conductive material layer 814.

Within the context of the multi-layer cell structure configurations described, for example, in FIGS. 8A-8D, a surface (or surface portion) is said to be "facing" an object when the surface and the object are substantially parallel, and a line extending normal to and away from the bulk of the material comprising the surface intersects the object. For example, a first surface (or first surface portion) and a second surface (or second surface portion) can be facing each other if a line normal to the first surface and extending away from the bulk of the material comprising the first surface intersects the second surface. A surface and a layer can be facing each other if a line normal to the surface and extending away from the bulk of the material comprising the surface intersects the layer. A surface can be facing another object when it is in contact with the other object, or when one or more intermediate materials are positioned between the surface and the other object. For example, two surfaces that are facing each other can be in contact or can include one or more intermediate materials between them.

Within the context of the multi-layer cell structure configurations described, for example, in FIGS. 8A-8D, a surface (or surface portion) is said to be "facing away from" an object when the surface and the object are substantially parallel, and no line extending normal to and away from the bulk of the material comprising the surface intersects the object. For example, a first surface (or first surface portion) and a second surface (or second surface portion) can be facing away from each other if no line normal to the first surface and extending away from the bulk of the material comprising the first surface intersects the second surface. A surface and a layer can be facing away from each other if a line normal to the surface and extending away from the bulk of the material comprising the surface intersects the layer. In some embodiments, a surface and another object (e.g., another surface, a layer, etc.) can be substantially parallel if the maximum angle defined by the surface and the object is less than about 10°, less than about 5°, less than about 2°, or less than about 1°.

Figure 8C:
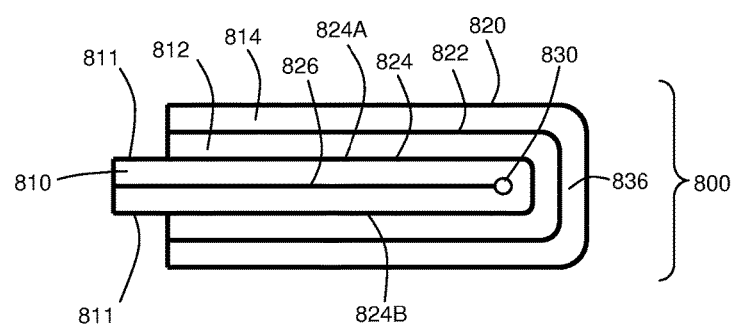

The multi-layer cell structure can be folded along an axis to form a folded structure. In some embodiments, the multi-layer cell structure can be folded such that first and second portions of a surface of the electrode (e.g., first and second portions of a surface that faces away from the electrically non-conductive material layer) face each other. For example, in the set of embodiments illustrated in FIGS. 8B-8C, multi-layer cell structure 800 in FIG. 8B is folded along axis 830 (which extends into and out of the page) in the direction of arrows 832 to form the multi-layer cell structure illustrated in FIG. 8C. Surface portions 824A and 824B of electrode 812, originally both facing away from electrically non-conductive material layer 814 in FIG. 8B, have been reoriented in the structure of FIG. 8C such that they are facing each other. As shown in FIG. 8C, surface portions 824A and 824B include an intermediate material (substrate 810) between them. However, in other embodiments, surface portions 824A and 824B can be in contact.

By folding the multi-layer cell structure in this way, a portion 836 of the electrically non-conductive material layer is arranged such that it is oriented over the convex surface portion of the folded edge of electrode 812. In some cases, the electrically non-conductive material layer can substantially cover the edge of electrode 812. Having a portion (such as portion 836) of the electrically non-conductive material over the folded edge of electrode 812 can be useful in preventing short circuiting between electrode 812 and subsequent electrodes positioned over electrically non-conductive material layer 814.

Additional electrodes can also be included in the multi-layer cell structure. In the set of embodiments illustrated in FIG. 8D, electrodes 840 and 842 are positioned adjacent electrically non-conductive material layer 814. When arranged in this fashion, the electrically non-conductive material layer includes a first portion 846 between electrodes 812 and 840 and a second portion 848 between electrodes 812 and 842. In addition, first and second portions 846 and 848, respectively, are directly connected by portion 836. Within the context of the multi-layer cell structure configurations described, for example, in FIGS. 8A-8D, two components or portions of a component are said to be "directly connected" or in "direct contact" when a line can be drawn connecting the two portions or components without passing through a region with a substantially different composition. In the set of embodiments illustrated in FIG. 8D, first and second portions 846 and 848 are also substantially continuous, although they need not be in all embodiments.

Figure 8D:
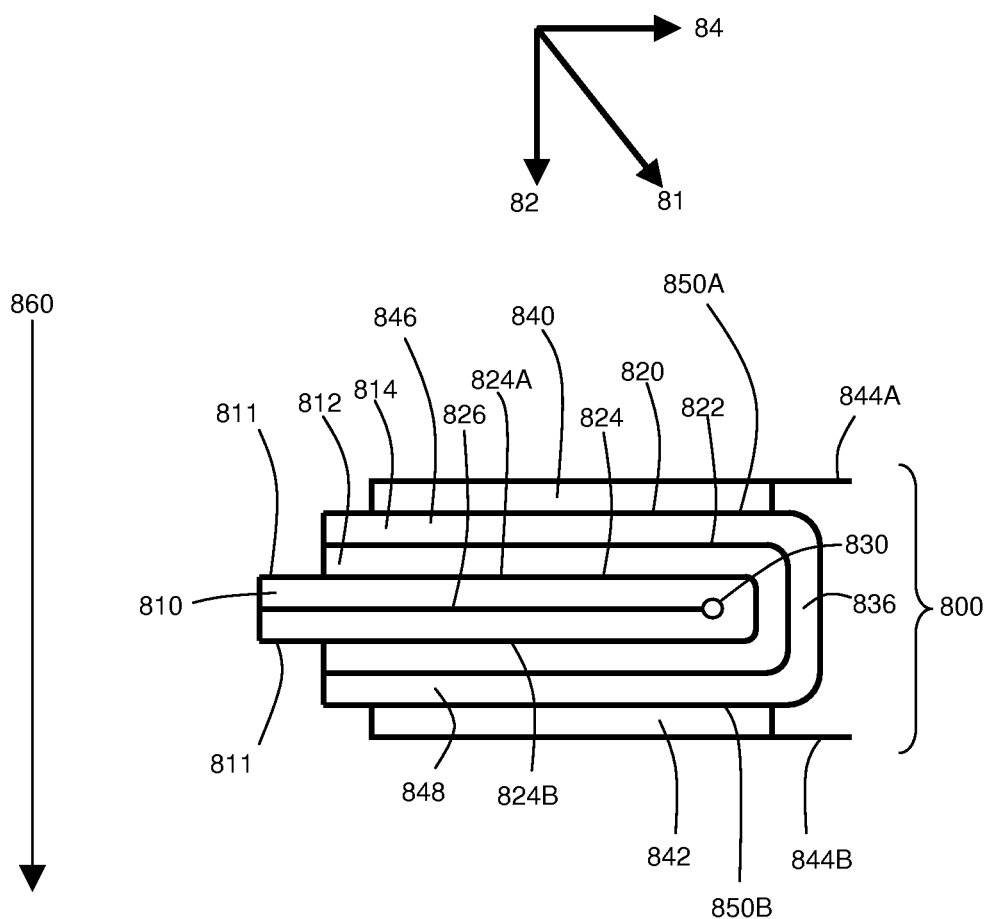

One or both of electrodes 840 and 842 can be formed over electrically non-conductive material layer 814. For example, electrode 840 and/or 842 might be deposited (e.g., via vacuum deposition) or cast (e.g., as a dried slurry), onto material layer 814. In other embodiments, electrode 840 and/or 842 can be formed as separate entities and adhered or otherwise joined to the multi-layer cell structure. While two additional electrodes 840 and 842 are illustrated in FIG. 8D, it should be understood that, in other embodiments, only one additional electrode (e.g., only electrode 840) can be included in the multi-layer cell structure.

In some embodiments, electrode 840 and/or electrode 842 are adhered to electrically non-conductive material layer 814. In some instances, at least a portion of electrode 840 and/or electrode 842 is covalently bonded to electrically non-conductive material layer 814.

The polarities of the electrodes can be selected to produce an electrochemical cell. In some embodiments, electrode 812 can be of a first polarity while electrode 840 (and 842, if present) can be of a second, opposite polarity. Generally, two electrodes are of opposite polarities if one is an anode and the other is a cathode. For example, electrode 812 can be an anode while electrode 840 (and 842, if present) can be a cathode. In other cases, electrode 812 can be a cathode while electrode 840 (and 842, if present) can be an anode.

Electrical contact can be made with the electrodes using any suitable technique. In the set of embodiments illustrated in FIG. 8D, electrical contact can be made with electrode 812 by using an electrically conductive substrate 810. Substrate 810 can include an electrically conductive bulk material or an electrically non-conductive bulk material coated with an electrically conductive material. Electrical contact can be made with electrodes 840 and/or 842 by incorporating current collectors 844A and 844B, respectively, into the multi-layer cell structure.

In the embodiments illustrated in FIGS. 8A-8D, and in other embodiments described herein, one or more additional layers may be positioned between the layers shown in the figures. For example, one or more additional layers may be positioned between substrate 810 and electrode 812 such as, for example, a release layer, which can be used to remove the substrate prior to folding multi-layer cell structure 800.

In addition, one or more additional layers may be positioned between the release layer and the substrate. Furthermore, one or more layers may be positioned between other components of the multi-layer cell structure. For example, one or more primer layers can be positioned between a current collector and an electrode layer to facilitate adhesion between the layers. Examples of suitable primer layers are described in International Patent Application Serial No. PCT/US2008/012042, published as International Publication No. WO 2009/054987, filed Oct. 23, 2008, and entitled "Primer For Battery Electrode", which is incorporated herein by reference in its entirety. In addition, one or more layers can be placed between an electrode and the electrically non-conductive material layer. For example, one or more layers can be positioned between electrode 812 and electrically non-conductive material layer 814, between electrode 840 and electrically non-conductive material layer 814, and/or between electrode 842 and electrically non-conductive material layer 814. Of course, in other embodiments, substrate 810 and electrode 812 can be in contact, electrode 812 and electrically non-conductive material layer 814 can be in contact, electrically non-conductive material layer 814 and electrode 840 can in contact, and/or electrically non-conductive material layer 814 and electrode 842 can be in contact. In addition, in some cases electrode 840 and/or 842 can be in contact with a current collector 844A and 844B, respectively, while in other cases, one or more materials can be positioned between electrode 840 and its current collector and/or electrode 842 and its current collector.

Some embodiments of the invention relate to the relative positions of the components (or portions thereof) described herein. In some embodiments, the multi-layer cell structure (or an electrochemical cell containing the multi-layer cell structure) can include the following layers positioned in the order described (e.g., traced along arrow 860 in FIG. 8D), optionally with any number of other layers of the same or different material intervening the described layers: a first electrode layer portion having a first polarity (e.g., a portion of electrode 840 in FIG. 8D), a second electrode layer portion having a second polarity (e.g., a portion of electrode 812 above substrate 810 in FIG. 8D), a third electrode layer portion having the second polarity (e.g., a portion of electrode 812 below substrate 810 in FIG. 8D), and a fourth electrode layer portion having the first polarity (e.g., a portion of electrode 842 in FIG. 8D). In some cases, as in the embodiments illustrated in FIG. 8D, the second and third electrode layer portions are portions of a single, substantially continuous electrode. In addition, in some cases, no electrode portion having the first polarity is positioned intervening the second and third electrode layer portions. In FIG. 8D, for example, only substrate 810 (which is not an electrode) is positioned between the second electrode layer portion (e.g., a portion of electrode 812 above substrate 810 in FIG. 8D) and the third electrode layer portion (e.g., a portion of electrode 812 below substrate 810 in FIG. 8D).

In some embodiments, a multi-layer cell structure (or an electrochemical cell containing the multi-layer cell structure can include a substrate with a first substrate surface portion (e.g., a substrate surface portion adjacent surface portion 824A of electrode 812) and a second substrate surface portion facing away from the first substrate surface portion (e.g., a substrate surface portion adjacent surface portion 824B of electrode 812). The multi-layer cell structure can also comprise a first electrode with a first portion adjacent the first substrate surface portion (e.g., the portion of electrode 812 above the substrate in FIG. 8D) and a second portion adjacent the second substrate surface portion (e.g., the portion of electrode 812 below the substrate in FIG. 8D). In addition, the multi-layer cell structure can include a second electrode (e.g., electrode 840 in FIG. 8D, although electrode 842 could also be included, in addition to of in place of electrode 840) with a first surface portion facing the first portion of the first electrode (e.g., the surface of electrode 840 at interface 850A) and a second surface portion facing away from the first surface portion of the second electrode (e.g., the surfaces of electrode 840 facing top current collector 844A). In addition, the multi-layer cell structure can include a substantially continuous, electrically non-conductive material layer (e.g., layer 814 in FIG. 8D) having a first portion between the first portion of the first electrode and the first surface portion of the second electrode (e.g., portion 846 of electrically non-conductive material layer 814), a second portion adjacent the second surface portion of the first electrode (e.g., portion 848 of electrically non-conductive material layer 814), and a third portion in direct contact with the first and second portions (e.g., portion 836 of electrically non-conductive material layer 814).

The electrically non-conductive material layer can have any suitable thickness. In some embodiments, a relatively thin electrically non-conductive material layer can be employed, which can reduce the volume and/or weight of the multi-layer cell structure, thereby increasing the specific energy and energy density of an electrochemical cell fabricated using the multi-layer cell structure. In some embodiments, the electrically non-conductive material layer can have an average thickness of less than about 100 microns, less than about 50 microns, less than about 20 microns; less than about 10 microns; less than about 5 microns; less than about 1 micron; at least about 0.1 microns and less than about 100, 50, 20, 10, 5, or 1 micron; at least about 0.5 microns and less than about 100, 50, 20, 10, 5, or 1 micron; or at least about 1 micron and less than about 100, 50, 20, 10, or 5 microns. In some cases, the average distance between the outermost surface of electrode 812 (e.g., at interface 822 in FIGS. 8C and 8D) and the innermost surface of electrode 840 and/or electrode 842 (e.g., at interfaces 850A and 850B, respectively, in FIG. 8D) can be less than about 100 microns, less than about 50 microns, less than about 20 microns; less than about 10 microns; less than about 5 microns; less than about 1 micron; at least about 0.1 microns and less than about 100, 50, 20, 10, 5, or 1 micron; at least about 0.5 microns and less than about 100, 50, 20, 10, 5, or 1 micron; or at least about 1 micron and less than about 100, 50, 20, 10, or 5 microns.

In some embodiments, the electrodes and the electrically non-conductive material layer can be constructed and arranged such that, when a voltage is applied to the electrodes and across the dry electrically non-conductive material layer (i.e., prior to the addition of any fluid such as a liquid electrolyte), a relatively high electrical resistance is maintained. In some cases, the electrical resistance between an anode and a cathode within the dry multi-layer cell structure is at least about 100 Ohms, at least about 1000 Ohms, at least about 10 kiloOhms, at least about 100 kiloOhms, at least about 1 megaOhm, or at least about 10 megaOhms when a voltage of at least about 1 volts is applied across the anode and the cathode. One of ordinary skill in the art would be capable of making such a measurement by applying a voltage drop across the material between the anode and the cathode within the multi-layer cell structure and measuring the resulting resistance using a multimeter.

In some cases, the electrical resistance through the thickness of the dry electrically non-conductive material layer (i.e., prior to the addition of any fluid such as a liquid electrolyte) is at least about 100 Ohms, at least about 1000 Ohms, at least about 10 kiloOhms, at least about 100 kiloOhms, at least about 1 megaOhm, or at least about 10 megaOhms when a voltage of at least about 1 volts is applied across the anode and the cathode. One of ordinary skill in the art would be capable of making such a measurement by applying a voltage drop through the thickness of the non-electrically conductive material layer (e.g., by attaching electrodes to surfaces of the non-electrically conductive material layer that are facing away from each other) and measuring the resulting resistance using a multimeter.

The electrically non-conductive material layer can comprise any material capable of separating or insulating the anode and the cathode from each other to prevent short circuiting, while being constructed and arranged to permit the transport of ions between the anode and the cathode. In some embodiments, all or part of the electrically non-conductive material layer can be formed of a material with a bulk resistivity of at least about $10^4$, at least about $10^5$, at least about $10^{10}$, at least about $10^{15}$, or at least about $10^{20}$ Ohm meters.

In some embodiments, the electrically non-conductive material layer can be the electrolyte of the electrochemical cell formed from the multi-layer cell structure. In other cases, the electrically non-conductive material layer can be a layer separate from the electrolyte of the electrochemical cell formed from the multi-layer cell structure (i.e., the electrochemical cell can include an electrolyte layer separate from the electrically non-conductive material layer).

All or part of the electrically non-conductive material layer can be formed of a solid electrolyte, in some embodiments. In addition to electrically insulating the anode from the cathode, the solid electrolyte can be ionically conductive, thereby allowing for the transfer of ions between the anode and the cathode. Examples of useful solid polymer electrolytes include, but are not limited to those described elsewhere herein.

In some embodiments, all or part of the electrically non-conductive material layer can be formed of a gel. As used herein, the term "gel" refers to a three-dimensional network comprising a liquid and a binder component, in which the liquid is entrained by and not allowed to flow through the binder. Gels can be formed when liquids are entrained within a three-dimensional network of solids upon applying the liquid to the solid network. In some cases, the three-dimensional network within a gel can comprise a liquid entrained within a polymer (e.g., a cross-linked polymer). One of ordinary skill in the art would be capable of determining the difference between a gel and other combinations of a solid and a fluid (e.g., a porous separator and a liquid solvent) by measuring, for example, the absorption stiffness of the gel via a dibutyl phthalate (DBP) uptake test. Generally, upon exposure of the binder component of a gel to a liquid, the weight of the gel will increase, while the weight of a porous separator will not substantially increase. In some embodiments, the binder component of the gel is able to take up liquid in the substantial absence of pores greater than about 10 microns or greater than about 1 micron. The binder component of a gel can be substantially free of pores in some cases. Examples of useful gel polymers for use in electrically non-conductive material layers include the gel polymers described elsewhere herein, among others.

In some embodiments, at least part of the electrically non-conductive material can be formed of a solid, electrically non-conductive material that is partially or substantially filled with a liquid electrolyte. In some such embodiments, the solid material that is partially or substantially filled with a liquid electrolyte can serve as the electrolyte for the electrochemical cell. The solid, electrically non-conductive material can, in some embodiments, be substantially ionically non-conductive. In other cases, the solid, electrically non-conductive might be ionically conductive, and the liquid electrolyte can be used to produce a combined structure with an enhanced ionic conductivity (relative to that of the solid portion of the combination). A variety of solid, electrically non-conductive separator materials are known in the art. and are described elsewhere herein.

As in other embodiments described elsewhere herein, substrate 810 can be removed prior to finishing the assembly of the electrochemical cell, in some embodiments. In the set of embodiments illustrated in FIGS. 8A-8D, substrate 810 can be removed prior to or after folding the multi-layer cell stack. Of course, in other embodiments, such as those illustrated in FIG. 8D, substrate 810 can be incorporated within the final assembled structure.

In the compounds and compositions of the invention, the term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted with additional groups, as described further below. In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., $C_1$-$C_{12}$ for straight chain, $C_3$-$C_{12}$ for branched chain), 6 or fewer, or, 4 or fewer. In some embodiments, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclochexyl, and the like.

The term "heteroalkyl" refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, amino, thioester, and the like.

The terms "alkene" and "alkyne" refer to unsaturated aliphatic groups analogous in length and possible substitution to the alkyls described above, but that contain at least one double or triple bond respectively.

The terms "heteroalkenyl" and "heteroalkynyl" refer to unsaturated aliphatic groups analogous in length and possible substitution to the heteroalkyls described above, but that contain at least one double or triple bond respectively.

As used herein, the term "halogen" or "halide" designates —F, —Cl, —Br or —I.

The term "methyl" refers to the monovalent radical —$CH_3$, and the term "methoxy" refers to the monovalent radical —$OCH_3$.

The term "aromatic" is given its ordinary meaning in the art and refers to cyclic groups comprising a conjugated pi electron system.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" refers to aryl groups comprising at least one heteroatom as a ring atom.

The term "heterocycle" refers to cyclic groups containing at least one heteroatom as a ring atom, in some cases, 1 to 3 heteroatoms as ring atoms, with the remainder of the ring atoms being carbon atoms. Suitable heteroatoms include oxygen, sulfur, nitrogen, phosphorus, and the like. In some cases, the heterocycle may be 3- to 10-membered ring structures, or 3- to 7-membered rings, whose ring structures include one to four heteroatoms. The term "heterocycle" may include heteroaryl groups, saturated heterocycles (e.g., cycloheteroalkyl) groups, or combinations thereof. The heterocycle may be a saturated molecule, or may comprise one or more double bonds. In some case, the heterocycle is a nitrogen heterocycle, wherein at least one ring comprises at least one nitrogen ring atom. The heterocycles may be fused to other rings to form a polycylic heterocycle. The heterocycle may also be fused to a spirocyclic group. In some cases, the heterocycle may be attached to a molecule (e.g., a polymer) via a nitrogen or a carbon atom in the ring.

Heterocycles include, for example, thiophene, benzothiophene, thianthrene, furan, tetrahydrofuran, pyran, isobenzofuran, chromene, xanthene, phenoxathiin, pyrrole, dihydropyrrole, pyrrolidine, imidazole, pyrazole, pyrazine, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, triazole, tetrazole, oxazole, isoxazole, thiazole, isothiazole, phenanthridine, acridine, pyrimidine, phenanthroline, phenazine, phenarsazine, phenothiazine, furazan, phenoxazine, pyrrolidine, oxolane, thiolane, oxazole, oxazine, piperidine, homopiperidine (hexamethyleneimine), piperazine (e.g., N-methyl piperazine), morpholine, lactones, lactams such as azetidinones and pyrrolidinones, sultams, sultones, other saturated and/or unsaturated derivatives thereof, and the like. The heterocyclic ring can be optionally substituted at one or more positions with such substituents as described herein.

The term "alkoxy" refers to the group, O-alkyl.

The term "alkoxyalkyl" refers to an alkyl group substituted with an alkoxy group. For example, "—CH$_2$CH$_2$—OCH$_3$" is an alkoxyalkyl group.

The terms "amine" and "amino" are art-recognized and refer to both unsubstituted and substituted amines, e.g., a moiety that can be represented by the general formula: N(R')(R")(R''') wherein R', R", and R''' each independently represent a group permitted by the rules of valence.

The terms "ortho" (or "o-"), "meta" (or "m-") and "para" (or "p-") apply to 1,2-, 1,3- and 1,4-disubstituted benzenes, respectively. For example, the names 1,2-dimethylbenzene, ortho-dimethylbenzene, and o-dimethylbenzene are synonymous.

As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen atom with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and can not be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821, 576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U. S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12,471,095, filed May 22, 2009, entitled "Hermetic Sample Holder and Method for Performing Microanalysis Under Controlled Atmosphere Environment"; U.S. patent application Ser. No. 12/862,581, filed on Aug. 24, 2010, entitled "Release System for Electrochemical cells (which claims priority to Provisional patent Apl. Ser. No. 61/236,322, filed Aug. 24, 2009, entitled "Release System for Electrochemical Cells"); U.S. Provisional Patent Application Ser. No. 61/376,554, filed on Aug. 24, 2010, entitled "Electrically Non-Conductive Materials for Electrochemical Cells;" and U.S. patent application Ser. Nos. 12/862,563; 12/862,551; 12/862,576; and Ser. No. 12/862,581, each of which was filed on Aug. 24, 2010, each entitled "Electrochemical Cells Comprising Porous Structures Comprising Sulfur" (and each of which claim priority to U.S. Provisional Application No. 61/237,903, filed Aug. 28, 2009, entitled "Electrochemical Cells Comprising Porous Structures Comprising Sulfur" to Scordilis-Kelley et al). All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A final electrochemical cell, comprising:
   a first electrode comprising:
      a first base electrode material layer comprising a first active electrode species, wherein the first active electrode species comprises lithium; and
      at least one protective layer adjacent the first base electrode material layer;
   a release layer, wherein the release layer has a greater adhesive affinity to a surface of the first electrode relative to its adhesive affinity to a carrier substrate on which the first electrode was formed;
   a second electrode comprising a second active electrode species; and
   an electrolyte,
   wherein an anisotropic force is applied to the final electrochemical cell during at least one period of time during charge and/or discharge of the final electrochemical cell, wherein the anisotropic force comprises a component normal to a surface of the first electrode, and wherein the component defines a pressure of at least about 4.9 N/cm$^2$ and causes a surface morphology of at least one of the first electrode or the second electrode to be affected.

2. The final electrochemical cell of claim 1, wherein the first electrode is an anode and the second electrode is a cathode.

3. The final electrochemical cell of claim 2, comprising a primer layer positioned adjacent the cathode.

4. The final electrochemical cell of claim 2, wherein the final electrochemical cell is capable of achieving a discharge current density of at least about 0.4 mA per square centimeter of the cathode surface.

5. The final electrochemical cell of claim 2, wherein the second electrode of the cathode comprises a sulfur in an amount of at least 1.0 mg/cm$^2$.

6. The final electrochemical cell of claim 2, wherein the cathode has a porosity of at least about 30% during discharge of the final electrochemical cell.

7. The final electrochemical cell of claim 2, wherein the cathode contains less than about 20% binder by weight.

8. The final electrochemical cell of claim 1, wherein the first active electrode species comprises lithium metal.

9. The final electrochemical cell of claim 1, wherein the protective layer is a single-ion conductive layer.

10. The final electrochemical cell of claim 1, wherein the protective layer is a polymer layer.

11. The final electrochemical cell of claim 1, wherein the electrolyte comprises an external additive having the formula LiR or $(Li-X)_nR'$, wherein
R comprises a heteroalkyl or heteroaryl group, optionally substituted;
R' comprises an alkyl or aryl group, optionally substituted;
X is a heteroatom; and
n is an integer equal to or greater than 1.

12. The final electrochemical cell of claim 1, wherein the electrolyte comprises a lithium compound additive that can be produced through reaction between the lithium of the anode and at least one other species of the final electrochemical cell during charge and/or discharge of the final electrochemical cell, and wherein the reaction is substantially irreversible under normal charge and/or discharge of the final electrochemical cell.

13. The final electrochemical cell of claim 1, wherein the first electrode and the electrolyte together have a maximum thickness of 500 microns or less.

14. The final electrochemical cell of claim 1, wherein the electrolyte comprises one or more N—O additives.

15. The final electrochemical cell of claim 1, wherein the electrolyte comprises one or more N—O additives, the one or more N—O additives comprising one or more of inorganic nitrates, organic nitrates, organic nitrites, and organic nitro compounds.

16. The final electrochemical cell of claim 15, wherein the electrolyte comprises lithium nitrate.

17. The final electrochemical cell of claim 1, wherein the electrolyte comprises a solvent comprising one or more of an acyclic ether, a cyclic ether, a polyether, and a sulfone.

18. The final electrochemical cell of claim 1, wherein the electrolyte comprises one or more lithium salts.

19. The final electrochemical cell of claim 18, wherein the electrolyte comprises one or more of LiSCN, $LiCF_3SO_3$, and $LiN(CF_3SO_2)_2$.

20. The final electrochemical cell of claim 1, wherein the second electrode comprises a sulfur-containing material as the second active electrode species, and the final electrochemical cell exhibits utilization of the sulfur-containing material of at least 60% and a charge-discharge efficiency of at least 80% over at least 10 cycles at a discharge current density of about 0.4 $mA/cm^2$.

21. The final electrochemical cell of claim 1, wherein the electrolyte comprises a first electrolyte solvent and a second electrolyte solvent, wherein, in use, the first electrolyte solvent is present disproportionately at the first electrode, and the second electrolyte solvent is present disproportionately at the second electrode, wherein the second electrolyte solvent includes at least one species which reacts adversely with the first electrode.

22. The final electrochemical cell of claim 21, wherein the first active electrode species comprises lithium metal, and wherein the second solvent includes at least one species which interacts with the lithium metal to substantially irreversibly form a lithium-containing impurity.

23. The final electrochemical cell of claim 1, wherein the electrolyte comprises a first electrolyte solvent and a second electrolyte solvent, wherein, in use, the first electrolyte solvent is present disproportionately at the first electrode, and the second electrolyte solvent is present disproportionately at the second electrode, wherein a polymer gel layer is in contact with at least one of the first and second electrodes, the polymer gel layer disproportionately containing one of the first and second electrolyte solvents.

24. The final electrochemical cell of claim 1, wherein the second active electrode species comprises sulfur in the form of at least one of elemental sulfur, a sulfide of the first active electrode species, and a polysulfide of the first active electrode species.

25. The final electrochemical cell of claim 24, wherein the second electrode comprises sulfur, and wherein the final electrochemical cell is capable of utilizing at least about 65% of the sulfur in the final electrochemical cell, and wherein 100% utilization corresponds to 1675 mAh per gram of sulfur in the final electrochemical cell.

26. The final electrochemical cell of claim 24, wherein the second electrode is a cathode comprising sulfur, and wherein the final electrochemical cell is capable of achieving a current density of at least about 100 mA per gram of sulfur in the cathode during charge or discharge.

27. The final electrochemical cell of claim 24, wherein the second electrode is a cathode comprising sulfur, and wherein the second electrode has an electrolyte accessible conductive area of at least about 1 $m^2$ per gram of sulfur in the cathode.

28. The final electrochemical cell of claim 24, wherein the second electrode is a cathode comprising sulfur, and wherein the ratio of the mass of electrolyte in the final electrochemical cell to the mass of sulfur in the cathode is less than about 6:1.

29. The final electrochemical cell of claim 1, wherein the second electrode comprises a conductive carbon-containing material.

30. The final electrochemical cell of claim 1, wherein the second electrode comprises particles having a maximum diameter of between about 0.1 microns and about 10 microns, and wherein the particles comprise a sulfur-containing material.

31. The final electrochemical cell of claim 1, wherein the second electrode comprises a porous structure comprising a plurality of pores having a total pore volume defined by the total of each of the individual pores volumes, and at least about 50% of the total pore volume is occupied by particles having a maximum diameter of between about 0.1 microns and about 10 microns.

32. The final electrochemical cell of claim 31, wherein the porous structure comprises at least one of carbon, a metal, a polymer, and a ceramic.

33. The final electrochemical cell of claim 31, wherein the pressure defined by the component of the anisotropic force is at least about 98 $N/cm^2$, and wherein the second electrode comprises a porous structure having a porosity of at least about 30% during the application of the anisotropic force.

34. The final electrochemical cell of claim 1, wherein the pressure defined by the component of the anisotropic force is at least about 78 Newtons/$cm^2$.

35. The final electrochemical cell of claim 1, wherein the second electrode comprises sulfur, and wherein the second electrode comprises a porous structure having a void volume of at least about 1 $cm^3$ per gram of sulfur.

36. The final electrochemical cell of claim 1, wherein the final electrochemical cell has an area specific resistance of less than 50 ohm-$cm^2$.

37. The final electrochemical cell of claim 1, wherein the final electrochemical cell capacity decreases by less than about 0.2% per charge and discharge cycle over at least 10 cycles subsequent to the first charge and discharge cycle.

38. The final electrochemical cell of claim 1, wherein the second electrode comprises a porous structure having a yield strength of at least 200 N/cm².

39. The final electrochemical cell of claim 1, wherein the first electrode comprises no more than four times the amount of lithium which can be ionized during one full discharge cycle of the cell.

40. The final electrochemical cell of claim 1, wherein the pressure defined by the component of the anisotropic force is at least about 4.9 N/cm² and less than about 250 N/cm².

41. The final electrochemical cell of claim 1, wherein the pressure defined by the component of the anisotropic force is at least about 78 N/cm² and less than about 250 N/cm².

42. The final electrochemical cell of claim 1, further comprising a second base electrode material layer comprising the first active electrode species.

43. The final electrochemical cell of claim 42, wherein the second base electrode material layer is positioned so as to reside between the first base electrode material layer and the electrolyte, the second base electrode material layer comprising sufficient active electrode species to participate in a full discharge of the final electrochemical cell.

44. The final electrochemical cell of claim 42, wherein the second base electrode material layer is positioned so as to reside between the first base electrode material layer and the electrolyte, the second base electrode material layer consisting essentially of lithium metal.

45. The final electrochemical cell of claim 42, wherein at least one of the first base electrode material layer or the second base electrode material layer comprises a Li—Z alloy, where Z is a metal or semiconductor and is present in an amount greater than 100 ppm but less than or equal to 10 wt % of the alloy.

46. The final electrochemical cell of claim 45 wherein Z is substantially uniformly dispersed throughout a bulk portion of the anode prior to $10^{th}$ discharge of the final electrochemical cell.

47. The final electrochemical cell of claim 42, comprising a plurality of protective layers separating the first base electrode material layer and the second base electrode material layer of the first electrode.

48. The final electrochemical cell of claim 47 wherein the plurality of protective layers comprises a single-ion conductive layer and a polymer layer.

49. The final electrochemical cell of claim 42, wherein the first electrode comprises a second protective layer adjacent the second base electrode material layer on a side opposite the at least one protective layer that is positioned between the first and second base electrode material layers, wherein the second protective layer is an inorganic ion conductive layer or a polymer layer.

50. The final electrochemical cell of claim 42, wherein the at least one protective layer is positioned between the first base electrode material layer and the second base electrode material layer.

51. The final electrochemical cell of claim 1, further comprising a current collector.

52. The final electrochemical cell of claim 51, wherein the current collector is positioned between the release layer and the first base electrode material layer.

53. The final electrochemical cell of claim 51, comprising a primer layer positioned adjacent the current collector, the primer layer comprising less than 30% by weight of a crosslinked polymeric material.

54. The final electrochemical cell of claim 53, wherein the primer layer comprises hydroxyl functional groups.

55. The final electrochemical cell of claim 1, wherein the release layer comprises a polymer and a solvent, and wherein the solvent solvates, dissolves, or activates at least a portion of the polymer of the release layer.

56. The final electrochemical cell of claim 1, wherein the first electrode is an anode comprising an anode active surface, wherein the anisotropic force affects surface morphology of the anode active surface to inhibit an increase in anode active surface area through charge and discharge, and wherein, in the absence of the anisotropic force but under otherwise essentially identical conditions, the anode active surface area is increased to a greater extent through charge and discharge cycles.

57. The final electrochemical cell of claim 1, wherein the release layer is configured to act as a separator.

58. The final electrochemical cell of claim 1, wherein the release layer comprises pores.

* * * * *